United States Patent [19]

Nishio et al.

[11] Patent Number: 5,592,332
[45] Date of Patent: Jan. 7, 1997

[54] RENTICULAR LENS, SURFACE LIGHT SOURCE, AND LIQUID CRYSTAL DISPLAY APPARATUS

[75] Inventors: Toshikazu Nishio; Yoshiyuki Yamashita; Hiroyuki Amemiya; Michiko Takeuchi; Nobu Masubuchi, all of Tokyo, Japan

[73] Assignee: Dai Nippon Printing Co., Ltd., Japan

[21] Appl. No.: 173,118

[22] Filed: Dec. 27, 1993

[30] Foreign Application Priority Data

Dec. 25, 1992 [JP] Japan .................................. 4-358319
Apr. 16, 1993 [JP] Japan .................................. 5-112397
Jun. 16, 1993 [JP] Japan .................................. 5-168376

[51] Int. Cl.⁶ .......................... G02B 27/10; G02B 17/00; G03B 21/60
[52] U.S. Cl. .......................... 359/619; 359/591; 359/621; 359/455
[58] Field of Search .................................. 359/455, 456, 359/615, 619, 591, 625, 639, 640, 707, 620, 621, 622, 626, 627, 628, 454, 459, 592, 597

[56] References Cited

U.S. PATENT DOCUMENTS 4,432,010  2/1984  Oguino .................................. 348/786
4,573,764  3/1986  Bradley .................................. 348/786
4,730,897  3/1988  McKechnie .................................. 359/452
4,919,518  4/1990  Ogino .................................. 359/457

*Primary Examiner*—Georgia Y. Epps
*Assistant Examiner*—Ricky Mack
*Attorney, Agent, or Firm*—Parkhurst, Wendel & Burr, L.L.P.

[57] ABSTRACT

A lenticular lens has a light transmitting substrate and a plurality of lens elements formed on the light transmitting substrate. The lens elements are defined in such a way that ridges thereof are aligned in parallel with each other, wherein $30° \leq \theta_{10\%} \leq 100°$ and $R \leq 20\%$, where $\theta_{10\%}$ is a diffusing angle range with respect to normal of the one surface in the case that when light is entered from the opposite surface and transmitted from the one surface, the intensity of the light transmitted is equal to or more than 10% of the intensity of the light transmitted in a peak direction of a main lobe; and R is the ratio of side lobes to main lobe. The intensity of side lobes which causes light loss and light stray can be remarkably reduced. Light can be equally and isotropically focused on in a predetermined diffusing angle range.

62 Claims, 47 Drawing Sheets

$$\beta = \gamma = \frac{180° - \alpha}{2}$$

$$L_1 = L_2$$

$$\beta \neq \gamma, \quad \alpha + \beta + \gamma = 180°$$

$$L_1 \neq L_2$$

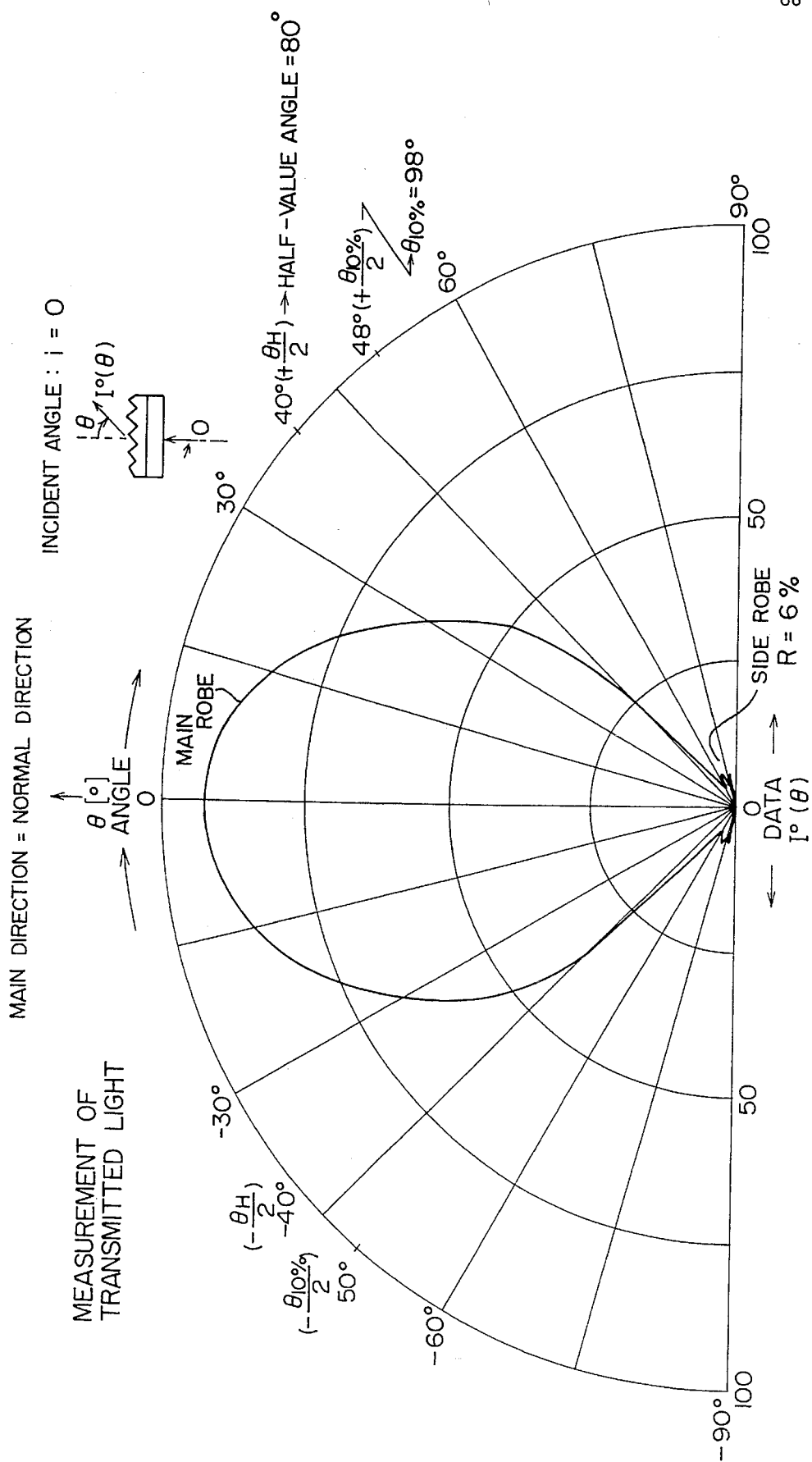
F I G. 15

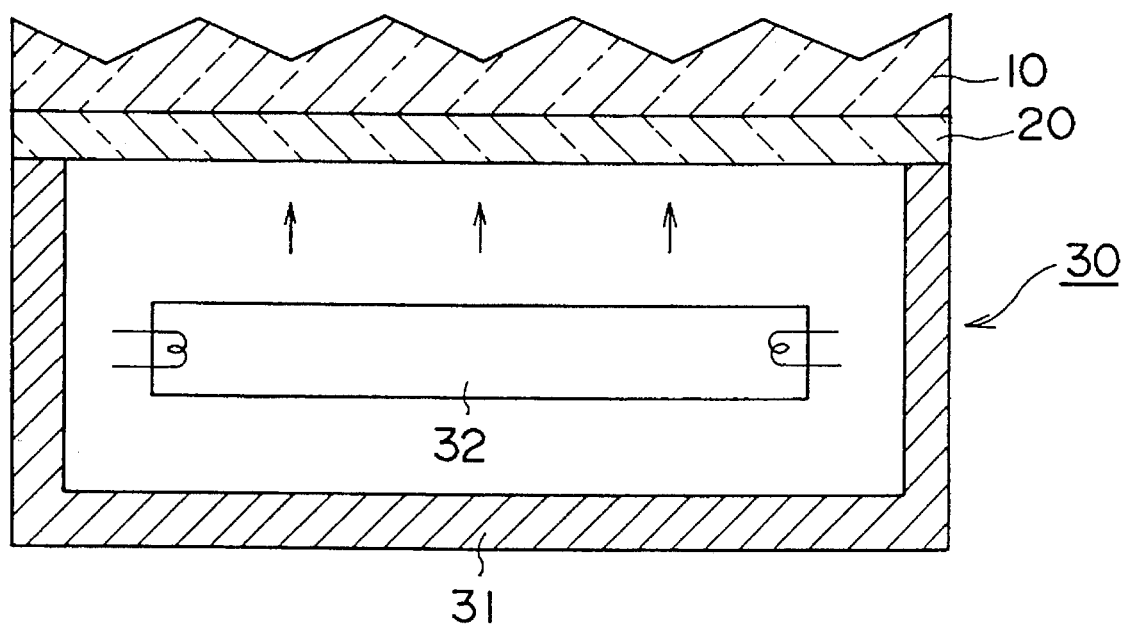
F I G. 18

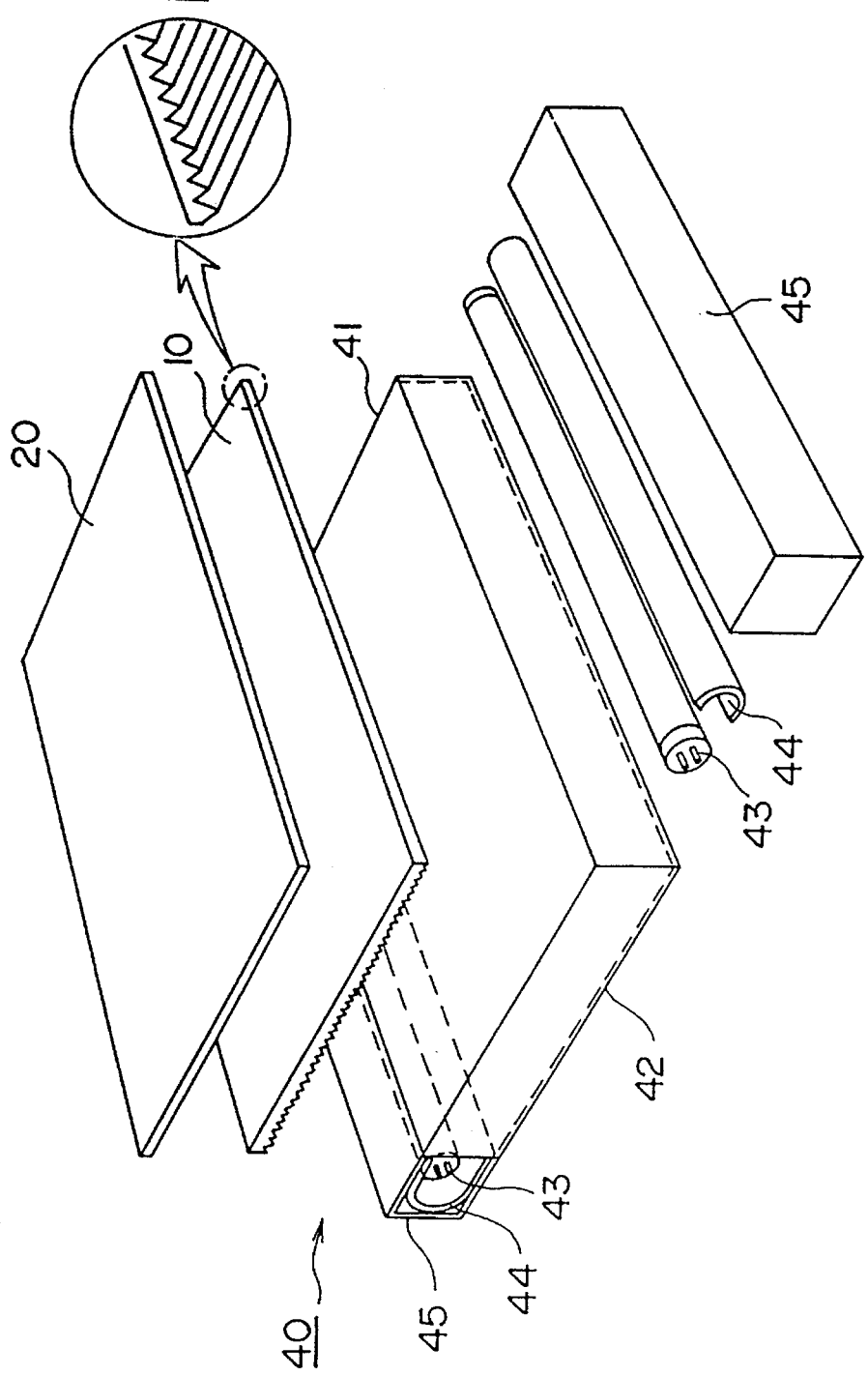

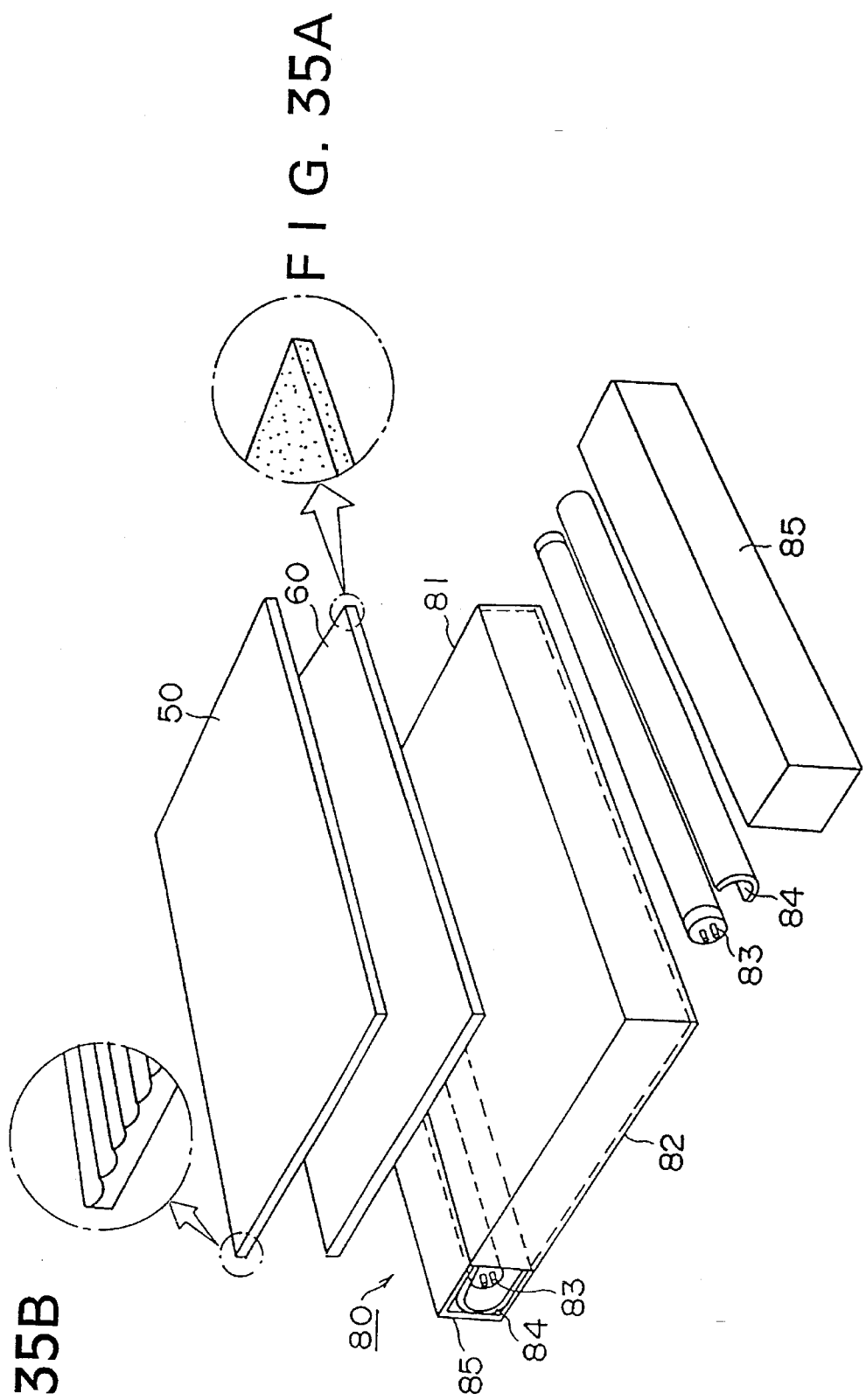

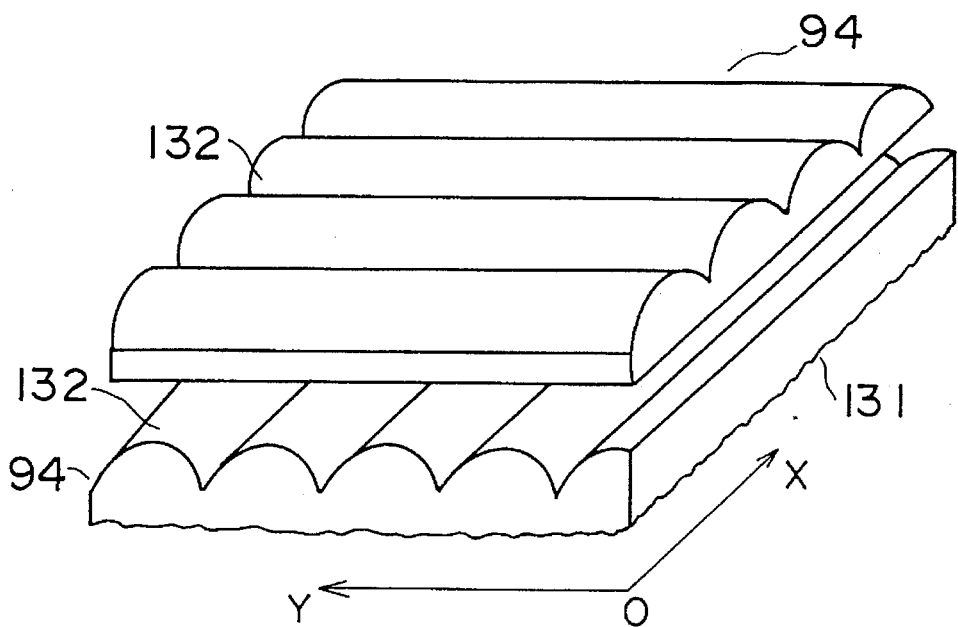
F I G . 42A
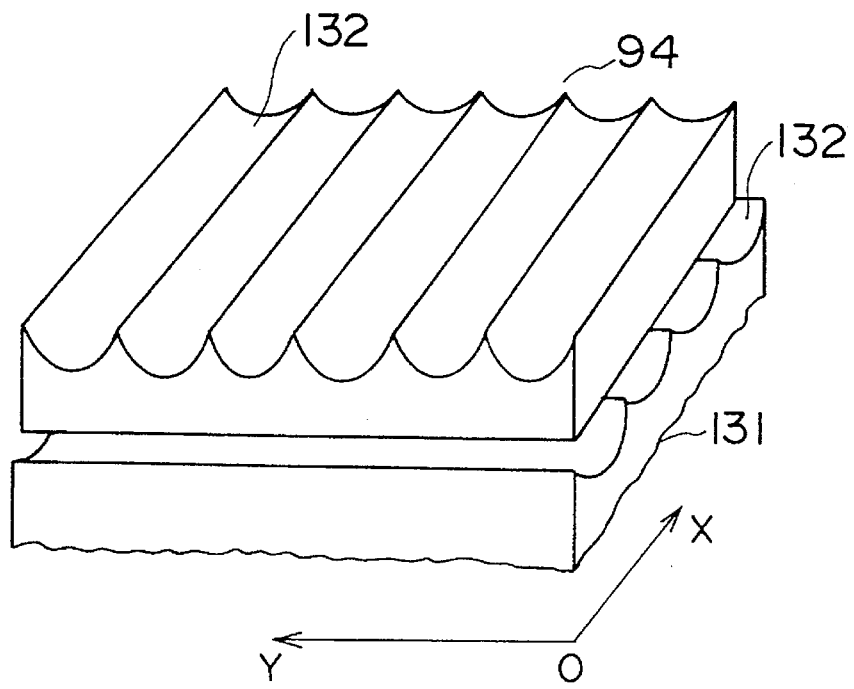
F I G . 42B

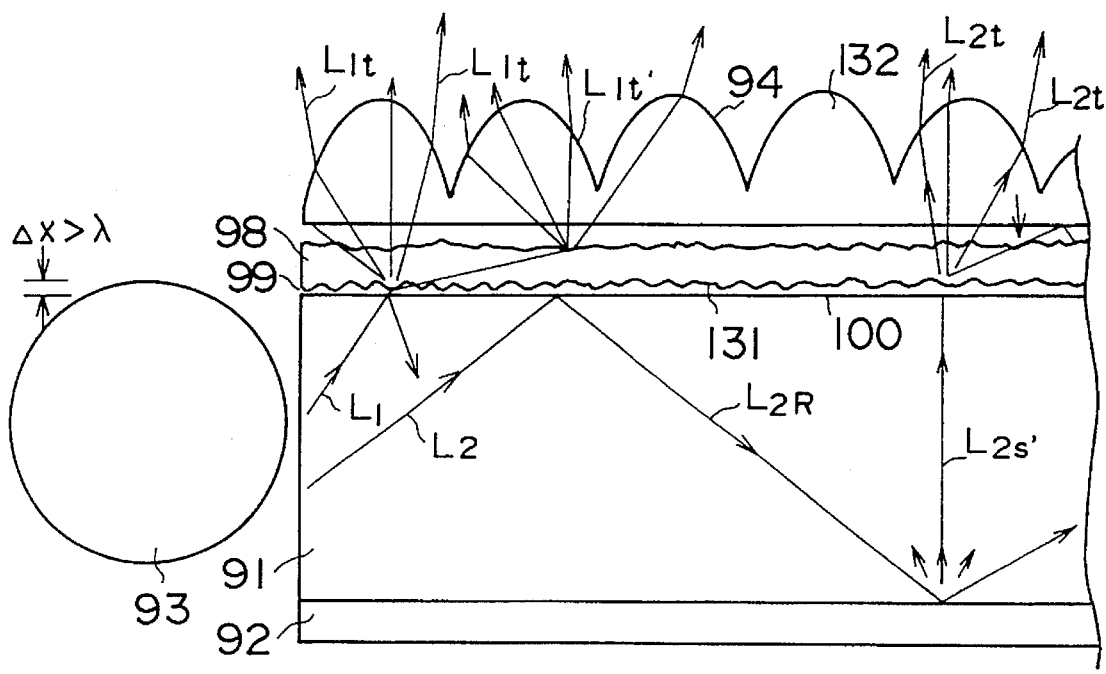
F I G. 46
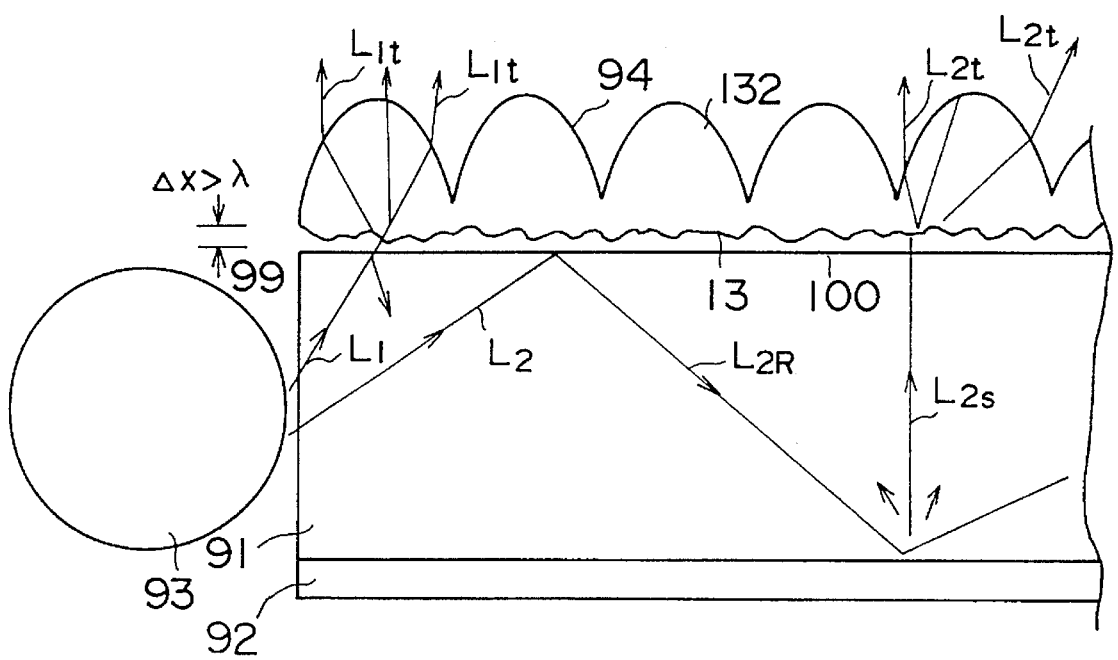
F I G. 47

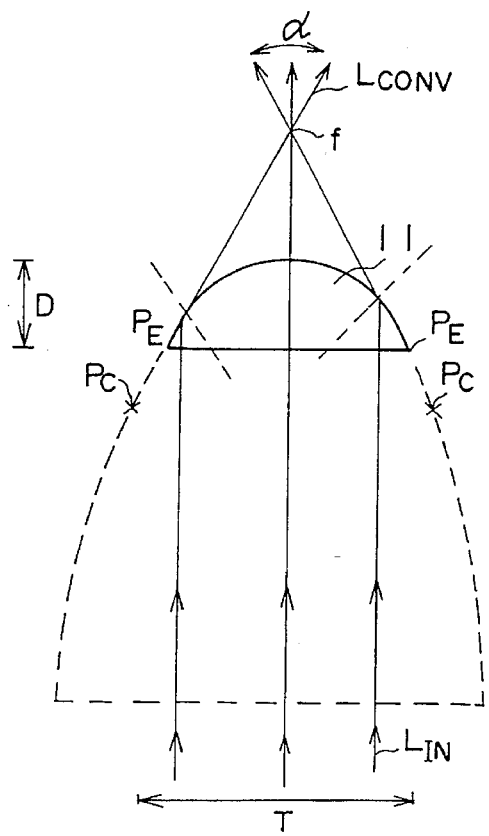
FIG. 56A
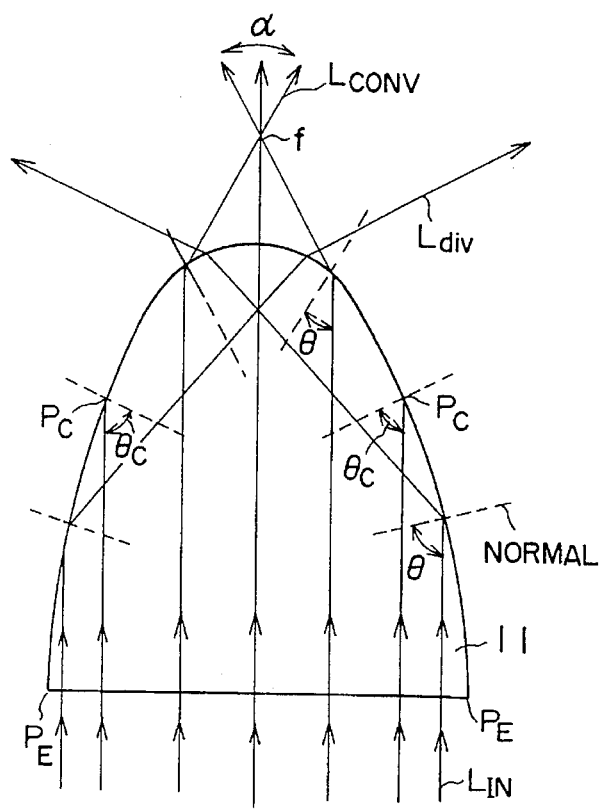
FIG. 56B
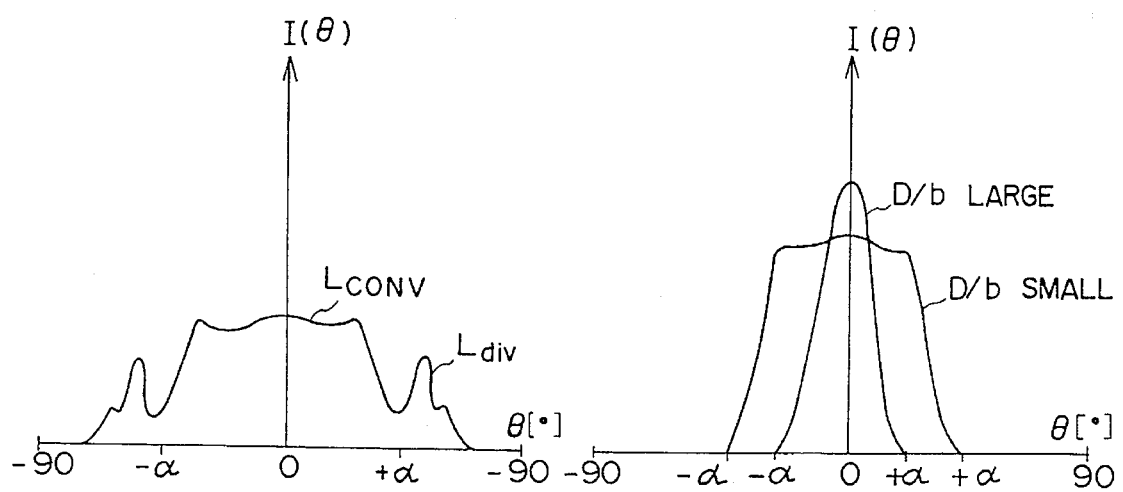
FIG. 56D
FIG. 56C 5,592,332

RENTICULAR LENS, SURFACE LIGHT SOURCE, AND LIQUID CRYSTAL DISPLAY APPARATUS

BACKGROUND OF THE INVENTION

1. Field of the Invention

The present invention relates to a lenticular lens having a large number of lens elements defined so that their ridges are aligned in parallel with each other. The present invention also relates to a surface light source having the lenticular lens, and a liquid crystal display apparatus having the surface, light source as a back-light thereof.

2. Information of the Related Art

As disclosed in Japanese Patent Laid-Open Publication No. 2-284102 and 63-318003, and Japanese Utility Model Laid-Open Publication No. 3-92601, and the like, liquid crystal display apparatuses having a back-light type diffusing surface light source or edge-light type diffusing surface light source are known. Such surface light sources have a lenticular lens formed of a large number of triangular prism shaped lens elements which are defined in such a way that their edges are aligned in parallel. The lenticular lens equally and isotopically diffuses emitted light in a desired angle range.

When a lenticular lens is used along with a delustered transparent diffusing plate (delustered transparent sheet), light energy of the light source is more sharply distributed in a predetermined angle range than when the delustered transparent diffusing plate is used alone. In addition, the light is equally and isotopically diffused in the predetermined angle range.

However, since the vertical angles α of the lens elements of the lenticular lenses are 60° or 90°, a part of rays of light deviate from the predetermined angle range. In other words, side lobes take place in an angle distribution of the intensity of transmitted light.

Thus, such lenticular lenses are not suitable for liquid crystal display apparatuses. Although the lenticular lenses have an advantage of low power consumption, they display clear images especially in color with difficulty.

If the output of the light source were increased so as to solve such a problem, the temperature of the liquid crystal device would adversely rise. The light which leaks out of the predetermined angle range would become noise (stray light), which would disturb the viewing of the user.

SUMMARY OF THE INVENTION

An object of the present invention is to provide a lenticular lens for equally focusing light in a predetermined angle range without the need to increase power consumption and heat generation so as to emit bright surface light. Another object of the present invention is to provide a surface light source having the lenticular lens, and a liquid crystal display apparatus having the surface light source.

According to the present invention, there is provided a lenticular lens, comprising:

a light transmitting substrate having one surface and opposite surface; and a plurality of lens elements elongated on the one surface of said light transmitting substrate, having concave or convex shaped cross-sections, and defined in such a way that ridges thereof are aligned in parallel with each other, wherein $30° \leq \partial_{10\%} \leq 100°$ and $R \leq 20\%$, where $\theta_{10\%}$ is a diffusing angle range with respect to normal of the one surface in the case that when light is entered from the opposite surface or one surface and transmitted from the one surface or opposite surface, the intensity of the light transmitted is equal to or more than 10% of the intensity of the light transmitted in a peak direction of a main lobe; and R is the ratio of side lobes to main lobe.

According to the present invention, the intensity of side lobes which causes light loss and light stray (light noise) can be remarkably reduced. In addition, light can be equally and isotopically focused in a predetermined diffusing angle range $(30° \leq \theta_{10\%} \leq 100°)$.

Thus, when the lenticular lens according to the present invention is used as a surface light source, bright surface light can be obtained without the need to increase the power consumption and heat generation. In addition, the light diffusing angle range and the equality and isotopic characteristics of light intensity thereof is almost the same as those of the related art references.

These and other objects, features and advantages of the present invention will become more apparent in light of the following detailed description of a best mode embodiment thereof, as illustrated in the accompanying drawings.

BRIEF DESCRIPTION OF DRAWINGS

FIG. 15 is a schematic diagram showing a measurement result of transmitted light (for a composition of a lenticular lens with a vertical angle of 110° and a light isotopic diffusing layer);

FIG. 18 is a sectional view showing a first embodiment of a light source (back-light type) according to the first invention;

FIG. 20 is a sectional view showing a second embodiment (edge-light type) of the light source according to the first invention;

FIG. 20A is a detailed drawing of the lenticular lens of the light source of FIG. 20;

FIG. 35 is an exploded perspective view showing a second embodiment (edge-light type) of the surface light source according to the second invention;

FIG. 35A is a detailed drawing of the isotopic diffusing layer of the surface light source of FIG. 35;

FIG. 35B is a detailed drawing of the lenticular lens of the surface light source of FIG. 35.

FIG. 42A is a perspective view showing another embodiment of the lens sheet according to the third invention, two convex elliptic cylinder lenticular lenses being layered in such a way that the longitudinal axis of the first lens is perpendicular to that of the second lens;

FIG. 42B is a perspective view showing another embodiment of the lens sheet according to the third invention, two concave elliptic cylinder lenticular lenses being layered in such a way that the longitudinal axis of the first lens is perpendicular to that of the second lens;

FIG. 46 is a sectional view showing an embodiment of an edge-light type surface light source according to the third invention, a light diffusing layer having two fine mat surfaces being disposed at the interface between a light guiding plate and a lens sheet, two cavities (layers) being defined between the light diffusing layer and the light guiding plate and between the light diffusing layer and the lens sheet;

FIG. 47 is a sectional view showing another embodiment of the edge-light type surface light source according to the third invention, a lens sheet having a fine mat surface as the rear surface, one cavity (layer) being disposed between a light guiding plate and the lens sheet;

FIG. 56A and FIG. 56C are a schematic diagram showing the position of total reflection critical point Pc and optical paths of rays of light of a lenticular lens according to the fourth invention and a characteristic graph relating to FIG. 56A, respectively;

FIG. 56B and FIG. 56D are a schematic diagram showing the optical paths of rays of light of a lenticular lens with a large cutting depth D and a total reflection critical point Pc and a characteristic graph relating to FIG. 56B, respectively;

DETAILED DESCRIPTION OF THE INVENTIONS (Integrated lenticular lens according to first invention)

Figure 1:
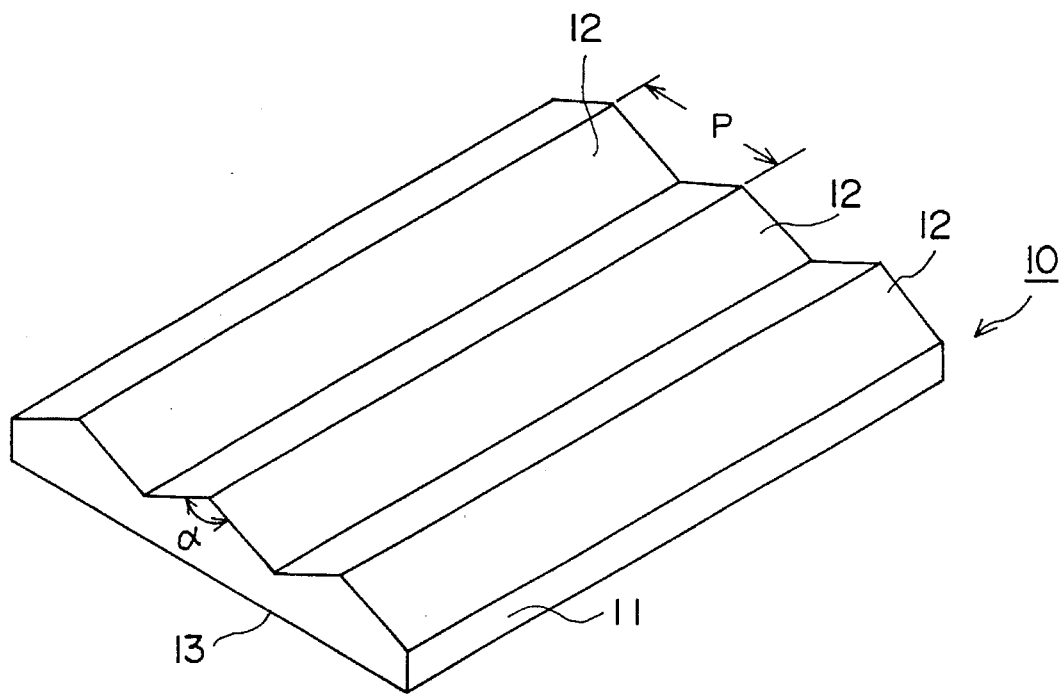
FIG. 1 is a perspective view showing a first embodiment of a lenticular lens according to a first invention.

FIG. 1 is a perspective view showing a first embodiment of an integrated lenticular lens according to a first invention. With reference to FIG. 1, the lenticular lens 10 has a plurality of lens elements 12 on one surface of a light transmitting substrate 11. Each of the lens elements 12 has a triangular prism construction. The lens elements are defined in such a way that their ridges are aligned in parallel. The other surfaces of the light transmitting substrate 11 are plane surfaces 13.

The vertical angle $\alpha$ of each of the lens elements 12 on the main cross section is set in the range of $95° \leq \alpha \leq 110°$.

The light transmitting substrate 11 is a sheet member or a plate member which is plane or curved. The light transmitting substrate 11 is composed of an acrylic ester (such as polymethyl methacrylate or polymethyl acrylate), a methacrylate ester or its copolymer, a polyester (such as polyethylene terephthalate or polybutylene terephthalate), a transparent resin (such as polycarbonate or polystyrene), a transparent glass, a transparent ceramic, or the like. When the light transmitting substrate 11 is used for a back-light source, it is preferably plane and its thickness is preferably 20 to 1000 μm. Although the pitch of the lens elements 12 varies depending on its application, it is preferably 10 to 500 μm.

The prism shape is formed by a known method such as a heat press method disclosed in Japanese Patent Laid-Open Publication No. 56-157310 or another method disclosed in Japanese Patent Laid-Open Publication No. 61-156273. In the latter method, a ultraviolet-ray-setting thermoplastic resin film is embossed by a roll-emboss plate. Thereafter, the film is hardened by ultraviolet rays.

The transmittance required for the light transmitting substrate 11 should be selected so that the light transmitting substrate 11 transmits at least diffused light without adversely affecting the application thereof. The light transmitting substrate 11 may be colored transparent or delustered transparent.

The delustered transparent is a characteristic where light is almost equally and isotopically diffused and transmitted in all directions of a semi-solid angle. The delustered transparent is used as a synonym of light isotopic diffusion. In other words, the delustered transparent means that when parallel rays of light are entered from the rear surface of the light transmitting substrate 11 (with an incident angle i=0), the angle distribution $I^0$ of the intensity of the transmitted light has a cosine distribution given by the following equation or a similar distribution.

$$I^0(\theta) = I^0_{mp} \cos\theta, \quad -90° \leq \theta \leq 90°$$

where θ is the angle to the normal N of the light transmitting substrate 11; and $I^0_{mp}$ is the intensity of the transmitted light in normal direction ($I^i(\theta)$ will be defined later).

(Lamination type lenticular lens according to the first invention)

Figure 2:
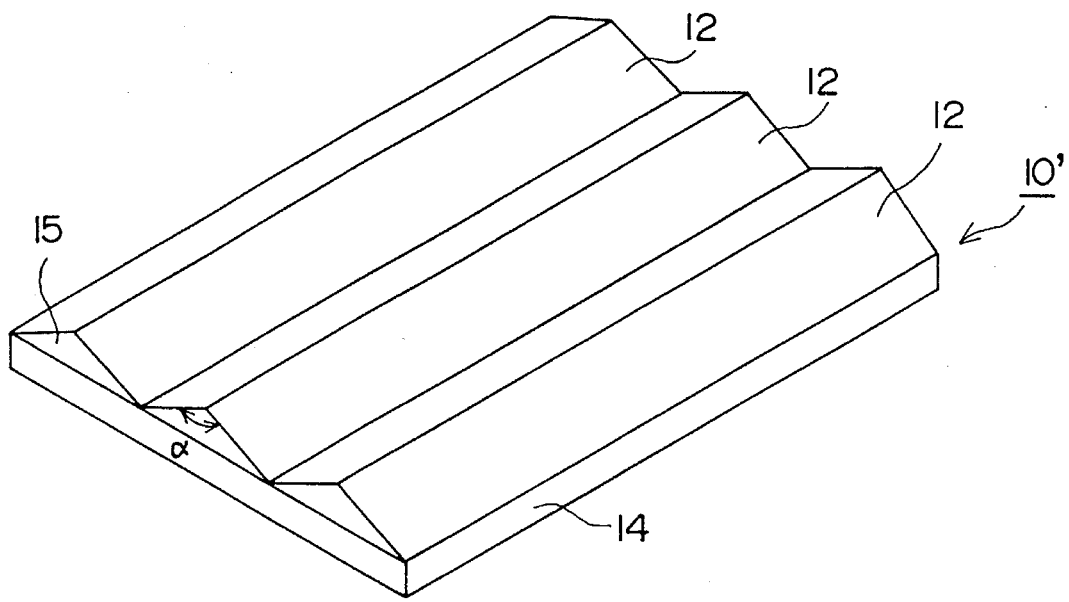
FIG. 2 is a perspective view showing a second embodiment of the lenticular lens according to the first invention.

FIG. 2 is a perspective view showing a second embodiment of a lamination type lenticular lens according to the first invention.

In the first embodiment, the lenticular lens 10 is formed only of the light transmitting substrate 11. However, in the second embodiment, a lenticular lens 10' is formed by layering a lens layer 15 over a plane light transmitting substrate 14. The lens layer 15 has a large number of lens elements 12 which have prism-shaped triangular cylinder construction. The lens layer 15 is composed of a light transmitting material. In the second embodiment, the vertical angle α of each of the lens elements is set in the range of 95°≦α≦110°.

(Measurements of transmitted light)

The inventors of the present inventions conducted various measurements of transmitted light for the lenticular lens 10. FIGS. 11 to 17 are graphs showing the results of the measurements. The following measurement results will be used in the description that follows.

Figure 11:
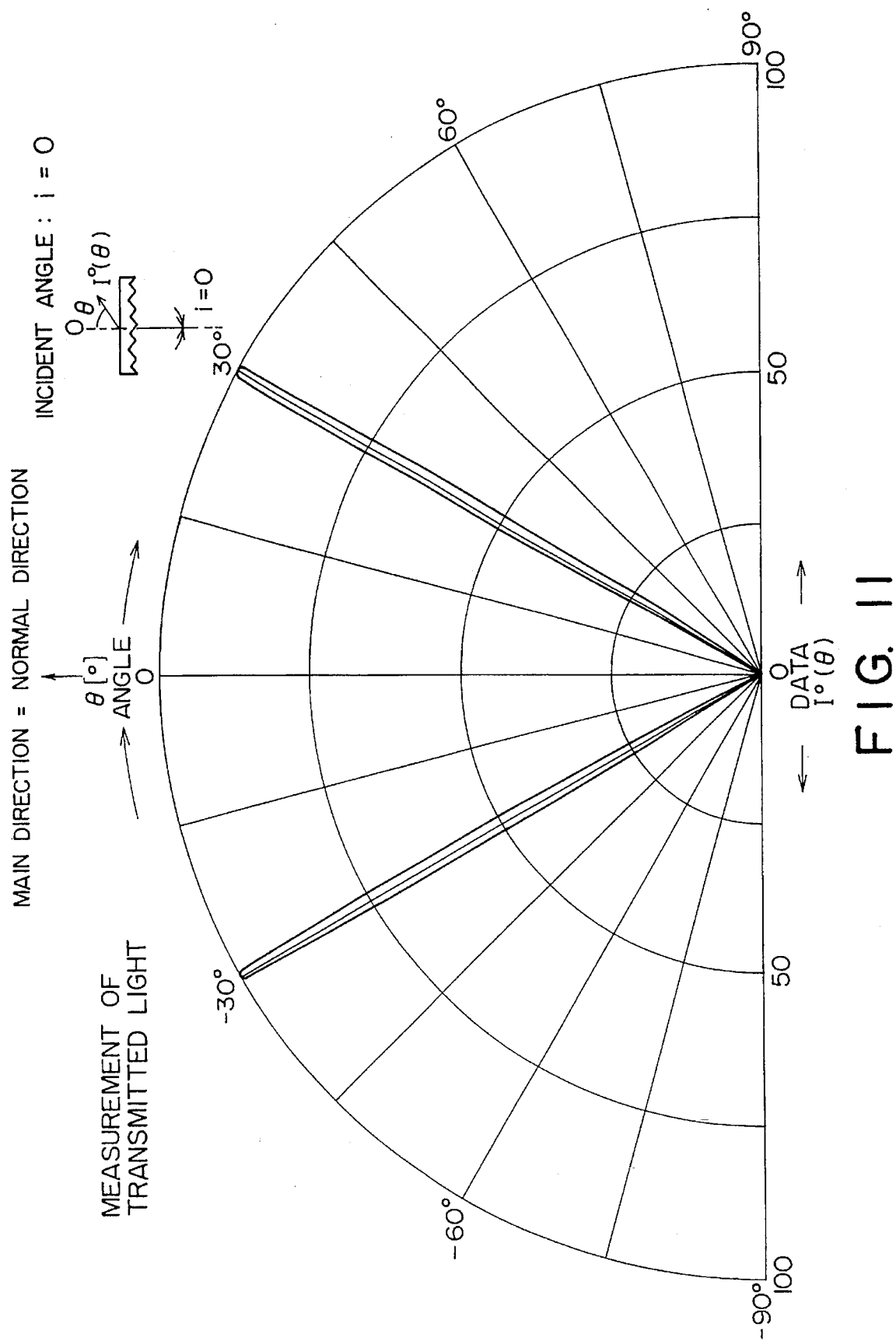
FIG. 11 is a schematic diagram showing a measurement result of transmitted light (for a lenticular lens with a vertical angle of 90°)

Measurement of transmitted light (1): FIG. 11
    Lenticular lens with a vertical angle α=90° (The lens portion is disposed on light source side.)
    Incident angle i=0°

Figure 12:
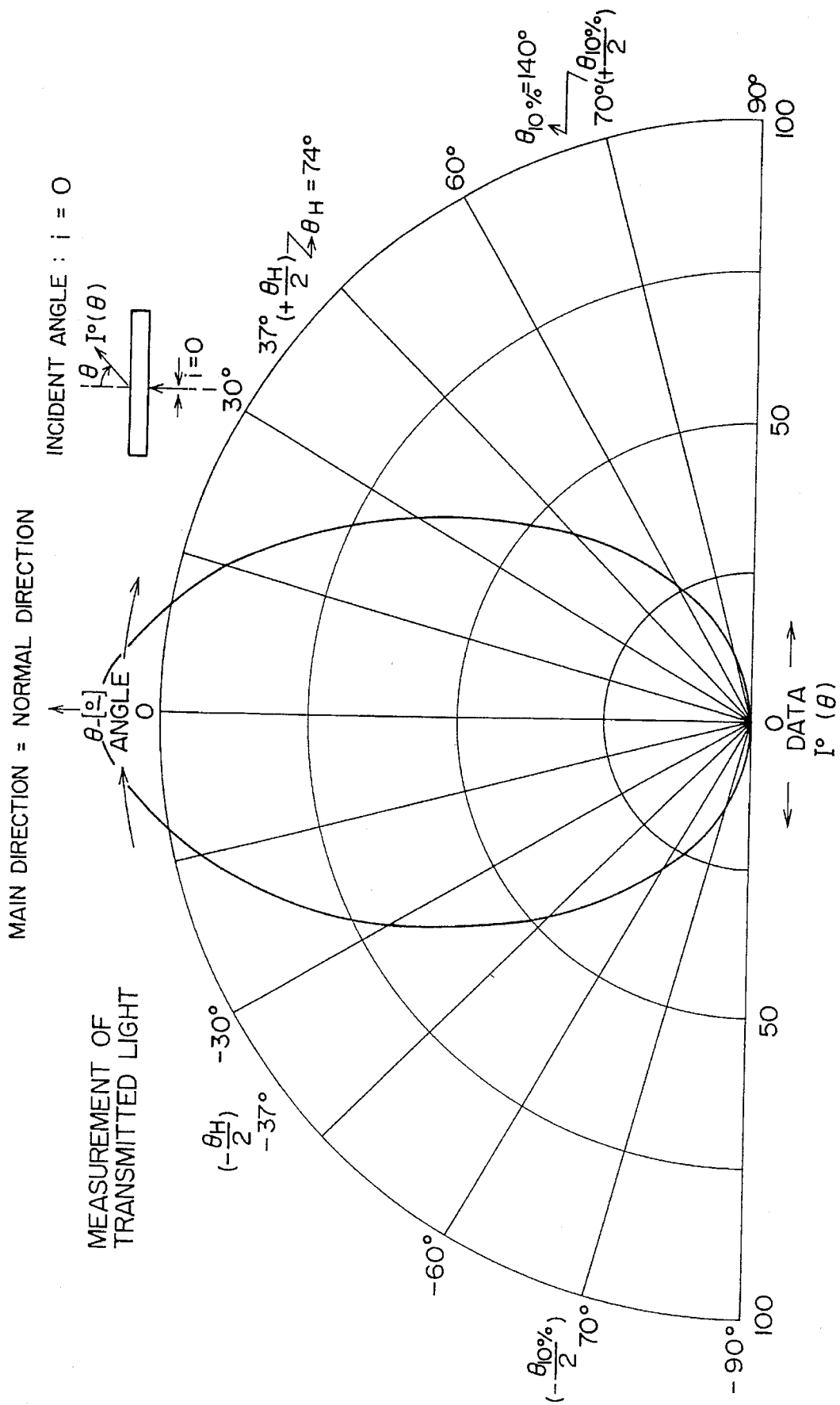
FIG. 12 is a schematic diagram showing a measurement result of transmitted light (for a light isotopic diffusing layer)

Measurement of transmitted light (2): FIG. 12
    Delustered transparent sheet (light isotopic diffusing layer)
    Incident angle i=0°

Figure 13:
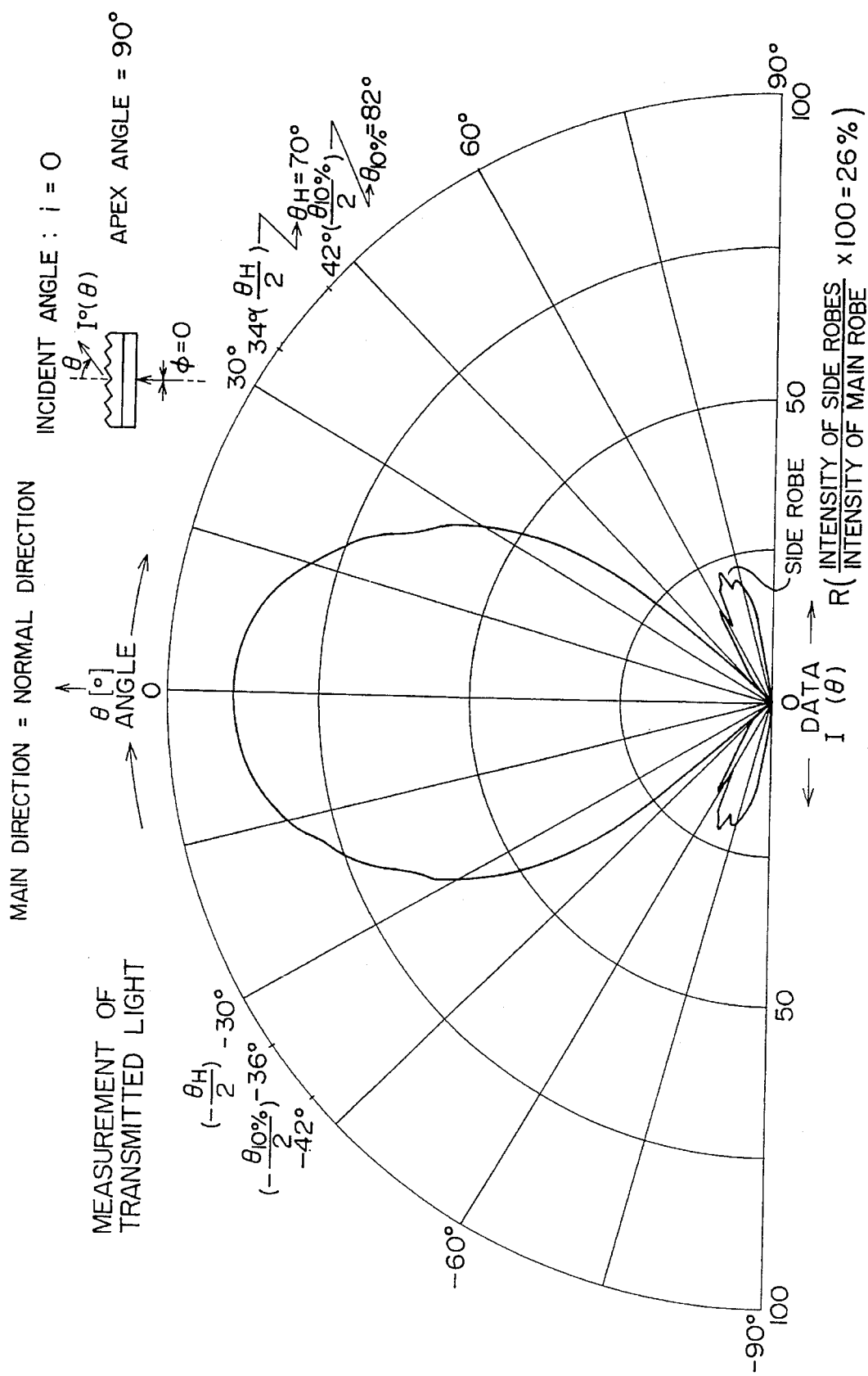
FIG. 13 is a schematic diagram showing a measurement result of transmitted light (for a composition of a lenticular lens with a vertical angle of 90° and a light isotopic diffusing layer)

Measurement of transmitted light (3): FIG. 13
    Lenticular lens with a vertical angle α=90°+delustered transparent sheet
    Incident angle i=0°

Figure 14:
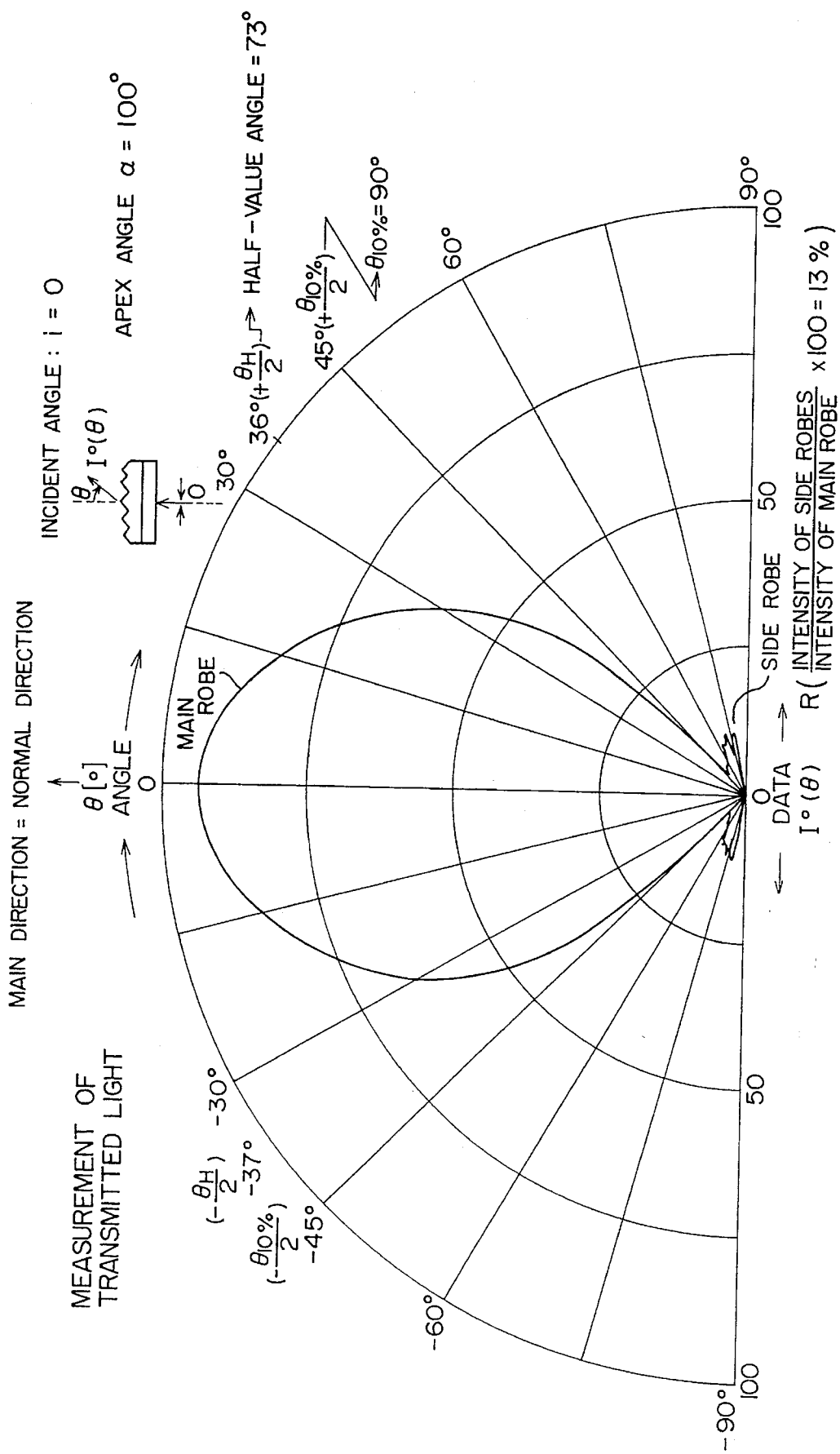
FIG. 14 is a schematic diagram showing a measurement result of transmitted light (for a composition of a lenticular lens with a vertical angle of 100° and a light isotopic diffusing layer)

Measurement of transmitted light (4): FIG. 14
    Lenticular lens with a vertical angle α=100°+delustered transparent sheet
    Incident angle i=0°

Measurement of transmitted light (5): FIG. 15
    Lenticular lens with a vertical angle α=110°+delustered transparent sheet
    Incident angle i=0°

Figure 16:
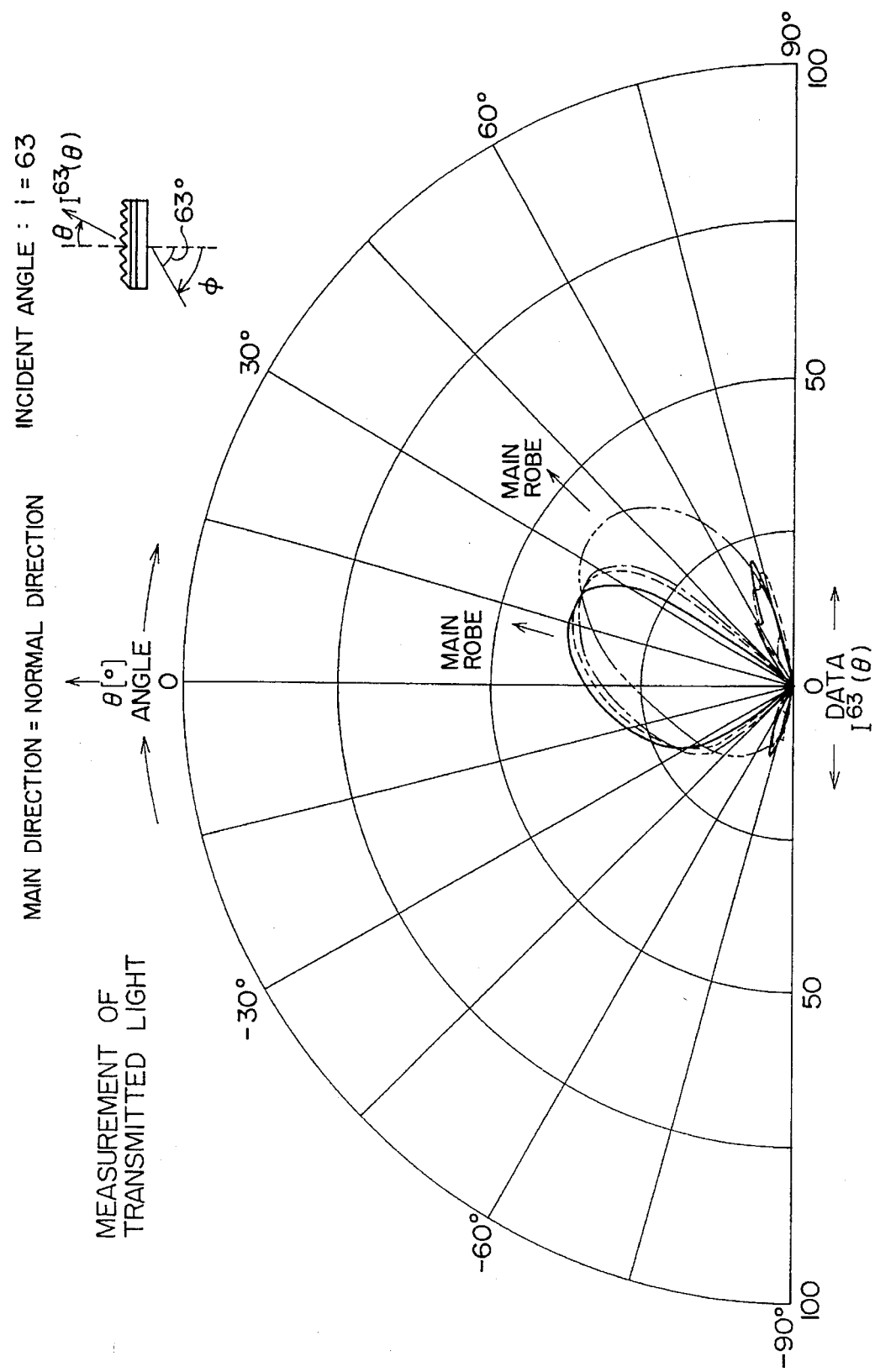
FIG. 16 is a schematic diagram showing a measurement result of transmitted light (for an incident angle of 63°)

Measurement of transmitted light (6): FIG. 16
    Layer construction of first embodiment+lenticular lens with a vertical angle α=90° (isosceles triangle) and a prism pitch=100 μm+delustered transparent sheet (solid line)
    Layer construction of second embodiment+lenticular lens with a vertical angle α=90° (isosceles triangle) and a prism pitch=50 μm+delustered transparent sheet (dotted line)
    Lenticular lens with a vertical angle α=100°+delustered transparent sheet (one-point dashed line)
    Delustered transparent sheet (two-point dashed line)
    Incident angle i=63°

Figure 17:
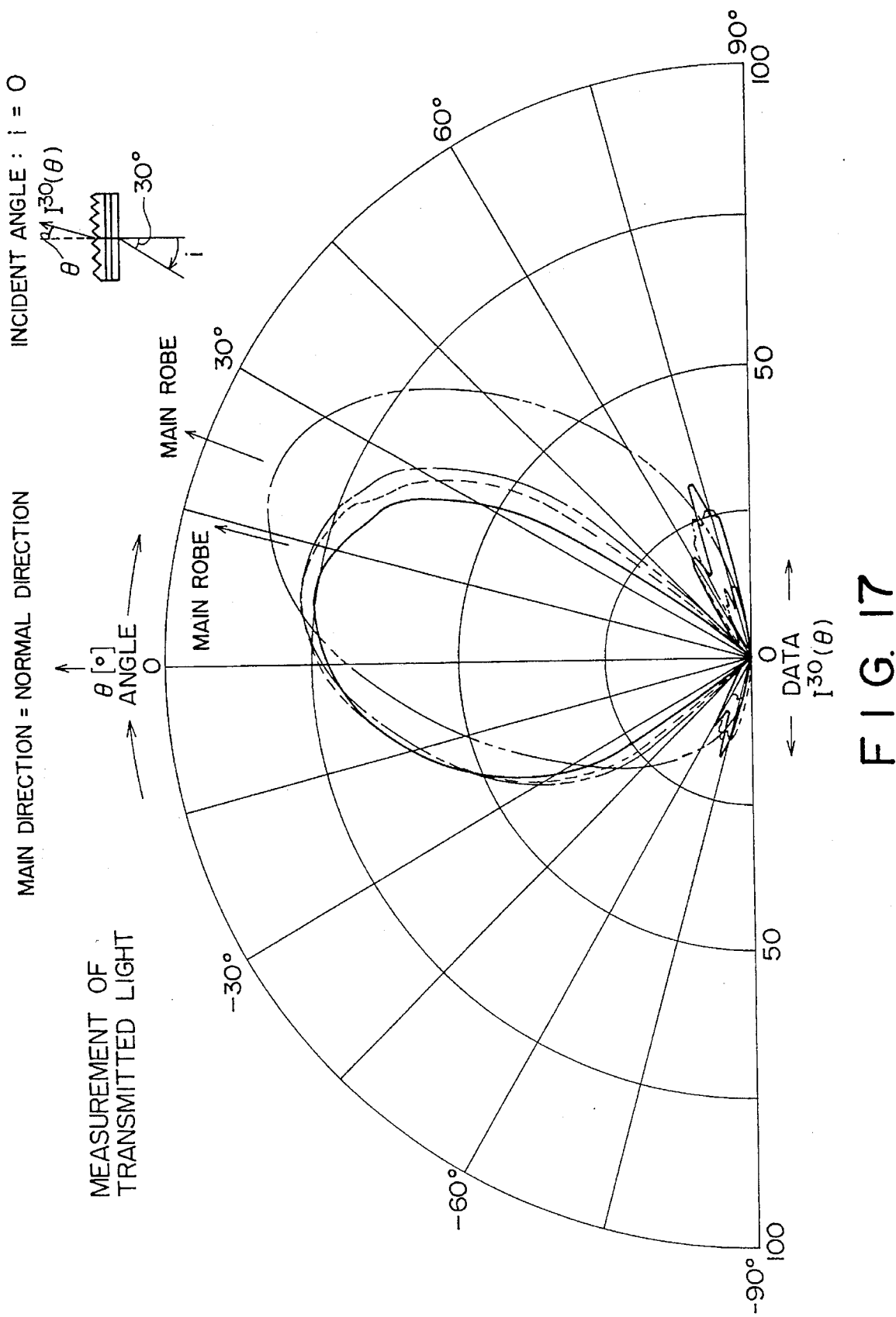
FIG. 17 is a schematic diagram showing a measurement result of transmitted light (for an incident angle of 30°)

Measurement of transmitted light (7): FIG. 17
    Layer construction of first embodiment+lenticular lens with a vertical angle α=90° (isosceles triangle) and a prism pitch=100 μm+delustered transparent sheet (solid line)
    Layer construction of second embodiment+lenticular lens with a vertical angle α=90° (isosceles triangle) and a prism pitch=50 μm+delustered transparent sheet (dotted line)
    Lenticular lens with a vertical angle α=100°+delustered transparent sheet (one-point dashed line)
    Delustered transparent sheet (two-point dashed line) Incident angle i=30°

(Description of apex angle α)

Figure 3:
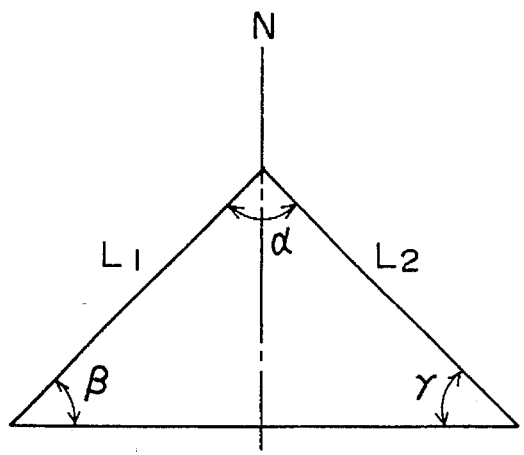
FIG. 3 is a schematic diagram for explaining a vertical angle of lens elements of the lenticular lens according to an embodiment of the first invention.
Figure 4:
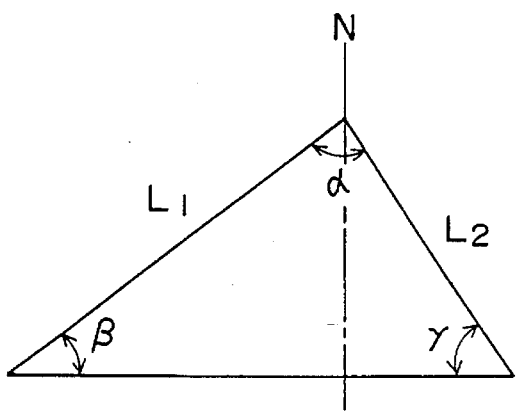
FIG. 4 is a schematic diagram for explaining a vertical angle of lens elements of the lenticular lens according to an embodiment of the first invention.

To obtain the intensity of transmitted light I (θ) which is symmetrical with respect to the normal N of the bottom surface or the substrate surface of the triangular-prism-shaped lens elements 12, the lens elements 12 should be formed in an isosceles triangle shape (as shown in FIG. 3). To deflect the distribution of the intensity of transmitted light I(θ) to the light or left, the lens elements should be formed in a scalene triangle shape (as shown in FIG. 4).

The apex angle α is always set in the range from 95°≦α≦100°. In particular, the vertical angle α is preferably around 100°.

The reason the lower limit of the apex angle α is 95° is in that if α≧95°, the distribution of the intensity of transmitted light $I^i(\theta)$ of the laminate of the triangular-prism-shaped lenticular lens and the delustered transparent light transmitting substrate (or the lenticular lens itself is formed of the delustered transparent light transmitting substrate) is not adversely affected by side lobes which take place apart from the main direction of the transmitted light. In reality, it is known that the ratio of the intensity of light of the main lobe to the side lobes, R, is equal to or less than 15% (see FIGS. 13 to 17).

In other words, when a character image is displayed by a liquid crystal display device for use with a TV screen, a watch, an illumination advertisement plate, a monitor, or the like, light should be clearly, equally, and isotopically diffused in an angle range of 30° to 100° (preferably, 30° to 60°) each to the normal direction. In addition, in this angle range, an image should be displayed with equal intensity and equal sharpness. In other words, when people watch the same TV program on the same TV set, they need to have equal intensity and sharpness of light. In addition, since light which deviates from this angle range becomes a light loss and light noise, this light should be suppressed. Thus, as the distribution of the intensity of transmitted light $I^i(\theta)$, most of light should be transmitted in the range from 30° to 100° each to the normal direction.

To effectively evaluate this distribution, the following two parameters can be used.

(1) Diffusing angle

Figure 5:
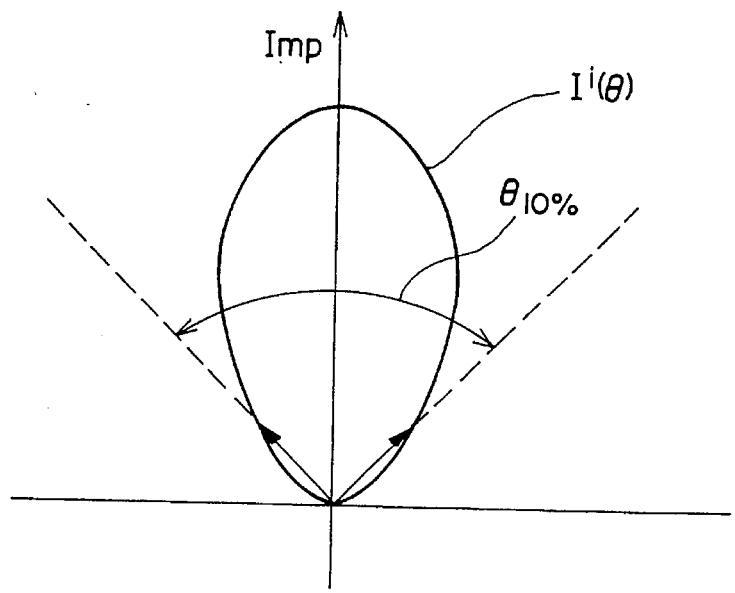
FIG. 5 is a schematic diagram for explaining a diffusing angle.

As shown in FIG. 5, the diffusing angle is preferably evaluated by an angle range with the intensity of 10% or more of the intensity of transmitted light $I_{mp}$ in the peak direction of the main lobe. The peak direction is a direction where the intensity of transmitted light of the main lobe is most strong. Thus, the peak direction is not always the normal direction. This angle is denoted by $\theta_{10\%}$.

(2) Ratio of side lobes to main lobe

Even if the diffusing angle θ10% is in the optimum range ($30° \leq \theta_{10\%} \leq 100°$), if the intensity of light of side lobes is large, the above-mentioned light loss and light noise will inevitably take place.

The affection of the side lobes is evaluated by the ratio of side lobes to main lobe, R, which is given by the following equation.

$$R=(I_{sp}/I_{mp})\times100[\%] \qquad (1)$$

where $I_{sp}$ is the intensity of light in the peak direction of the side lobes; and $I_{mp}$ is the intensity of light in the peak direction of the main lobe.

To effectively use light and to prevent light noise to the user of the display, experimental results show that when $R \leq 20\%$, the affection of the side lobes to the main lobe can be substantially ignored.

In addition, the results of experiments conducted by the inventors of the present invention show that the ratio R depends on the apex angle α of the triangular-prism-shaped lens elements 12. When the apex angle α is smaller than 95° the ratio R is larger than 20. However, when the vertical angle α becomes around 95°, the ratio R remarkably increases.

Figure 7A:
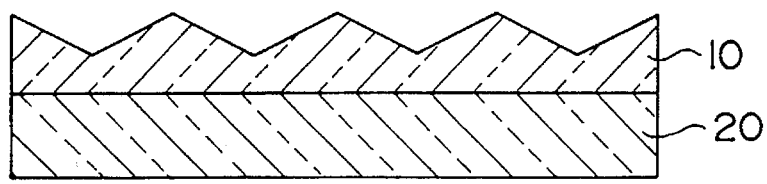
FIG. 7A is a sectional view showing a composition of a lenticular lens and a light isotopic diffusing layer.
Figure 7B:
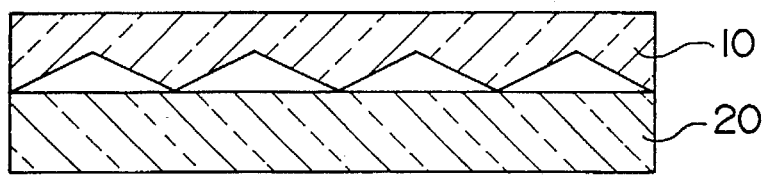
FIG. 7B is a sectional view showing a composition of a lenticular lens and a light isotopic diffusing layer.
Figure 8A:
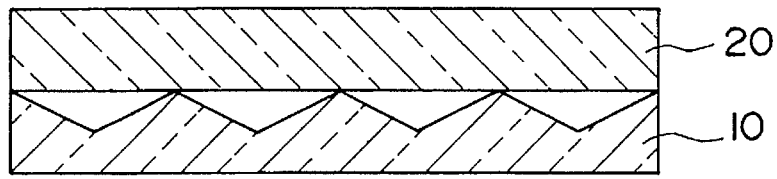
FIG. 8A is a sectional view showing a composition of a lenticular lens and a light isotopic diffusing layer.
Figure 8B:
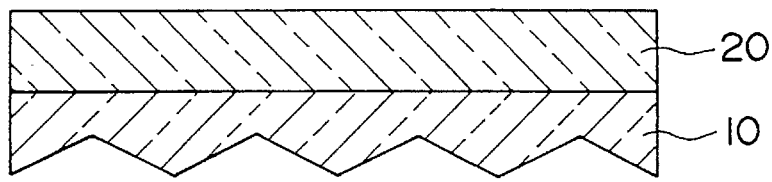
FIG. 8B is a sectional view showing a composition of a lenticular lens and a light isotopic diffusing layer.
Figure 9A:
FIG. 9A is a sectional view showing a composition of a lenticular lens and a light isotopic diffusing layer.
Figure 9B:
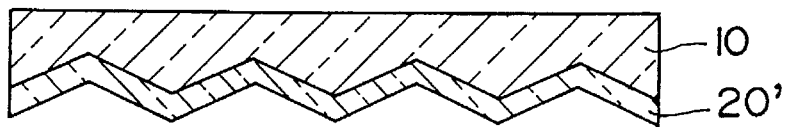
FIG. 9B is a sectional view showing a composition of a lenticular lens and a light isotopic diffusing layer.
Figure 10A:
FIG. 10A is a sectional view showing a composition of a lenticular lens and a light isotopic diffusing layer.
Figure 10B:
FIG. 10B is a sectional view showing a composition of a lenticular lens and a light isotopic diffusing layer.

For example, as shown in FIG. 7A, when light is entered vertically (with an incident angle i=0°) from the rear surface of a light isotopic diffusing layer (delustered transparent sheet) 20 which is layered over a triangular-prism-shaped lenticular lens 10, if the vertical angle α of lens elements 12 is 90°, the ratio R is 26% (less than 20%) as shown in FIG. 13. However, in this case, if the apex angle α of the lens elements 12 is 100°, the ratio R sharply decreases to 13% as shown in FIG. 14 In addition, if the apex angle α is 110°, the ratio R becomes 6% as shown in FIG. 15.

The reason the upper limit of the apex angle α is 110° is that if the apex angle α is larger than 110°, the diffusing angle θ exceeds the above-mentioned angle range. Thus, the apex angle α should be equal to or less than 110°.

For example, if the apex angle α is 90°, the diffusing angle $\theta_{10\%}$ is 82° (see FIG. 13). If the apex angle α is 100°, the diffusing angle $\theta_{10\%}$ is 90° (see FIG. 14) If the apex angle α is 110°, the diffusing angle $\theta_{10\%}$ is 98° (see FIG. 15). Thus, the upper limit of the diffusing angle takes place.

If the apex angle α is 180° (namely, perfect plane) as the upper limit, only the delustered transparent sheet 20 is used. In this case, as shown in FIG. 12, the diffusing angle $\theta_{10\%}$ becomes as high as 140°.

(Definition of intensity of transmitted light $I^i(\theta)$)

The angle dependency of the intensity of the light which transmits a substance with light diffusing and transmitting characteristics depends on the direction of transmitted light and the direction of incident light. The angle dependency of the intensity of transmitted light is evaluated by $I^i(\theta)$.

Figure 6:
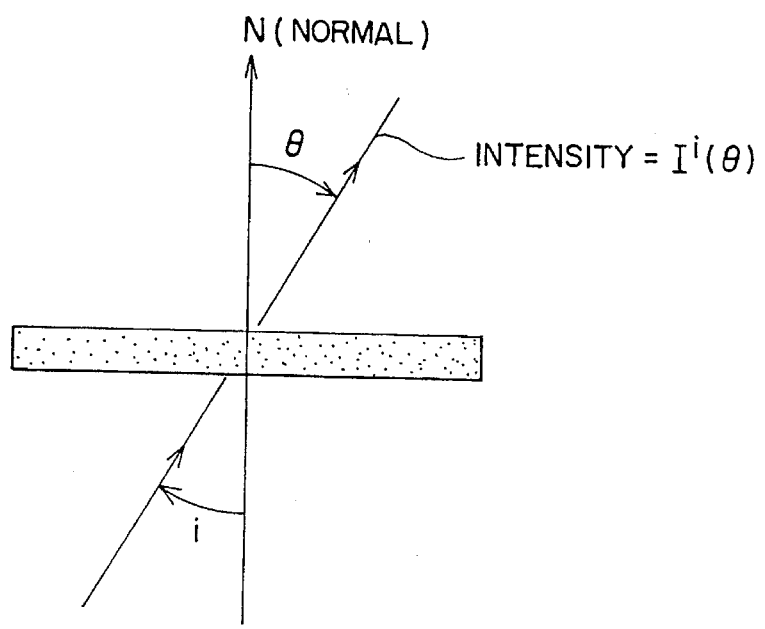
FIG. 6 is a schematic diagram for explaining the intensity of transmitted light $I'(\theta)$.

In other words, as shown in FIG. 6, when light with an incident angle i is entered, the intensity of light which travels with an angle θ to the normal of a light emitting surface is the intensity of transmitted light $I^i(\theta)$.

(Light isotopic diffusing layer)

The light isotopic diffusing layer is made by dispersing inorganic fine particles (such as calcium carbonate, silica, alumina, barium carbonate, or the like) or resin bead particles (such as acrylic resin) which serve as a light diffusing agent (delustering agent) in the above-mentioned light transmitting material. The diameter of the particles of the light diffusing agent is approximately 1 to 20 μm.

The light isotopic diffusing layer 20 is formed by extruding or calendering the above-mentioned resin material (where the light diffusing agent is kneaded into the light transmitting material). Thus, the light isotopic diffusing layer 20 is formed in a sheet shape as a single layer.

A paint where the above-mentioned light diffusing agent has been dispersed into the light transmitting material as a binder may be coated on the sheet (or plate) of the light transmitting material (as a two-layer construction).

A fine mat pattern (sand pattern) with a centerling-average surface roughness of 1 to 20 μm may be formed on the front surface of the sheet (or plate) of the light transmitting material by sand-blasting method, emboss method, or the like.

(Layer construction of lenticular lens and light isotopic diffusing layer)

FIGS. 7 to 10 are sectional views showing layer constructions formed of a lenticular lens and a light isotopic diffusing layer.

When the light isotopic diffusing layer 20 is deposited on the lenticular lens 10, the lenticular lens 10 may be disposed on the user side. In this case, the light isotopic diffusing layer 20 is disposed on the light source side (see FIGS. 7 and 9). Alternately, the lenticular lens 10 may be disposed on the light source side. In this case, the light isotopic diffusing layer 20 may be disposed on the user side (see FIGS. 8 and 10).

In these cases, the lens elements 12 of the lenticular lens 10 may be disposed on the user side (see FIGS. 7A to 10A). The lens elements 12 may be disposed on the light source side (see FIGS. 7B to 10B).

The light isotopic diffusing layer 20 may be a sheet (or plate) (see FIGS. 7A, 7B, 8A and 8B). In addition, the light isotopic diffusing layer 20' may be a film which is directly coated over the lenticular lens 10 (see FIGS. 9A, 9B, 10A, and 10B).

(Embodiment of back-light type surface light source)

Figure 19A:
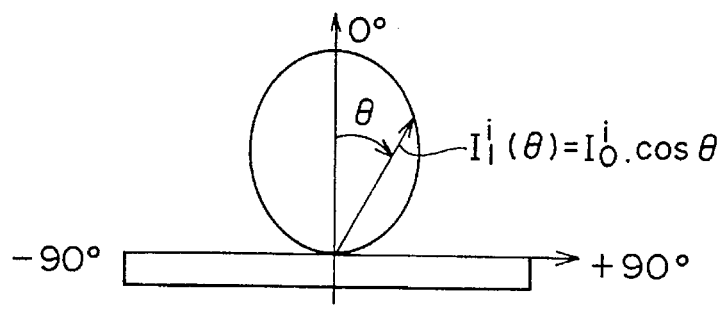
FIG. 19A is a schematic diagram for explaining the intensity of transmitted light of the embodiment of FIG. 18.
Figure 19B:
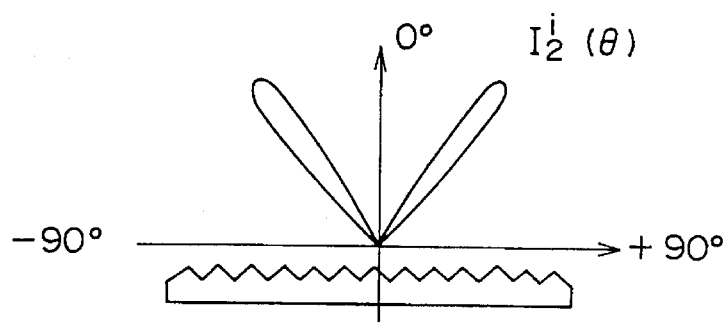
FIG. 19B is a schematic diagram for explaining the intensity of transmitted light of the embodiment of FIG. 18.
Figure 19C:
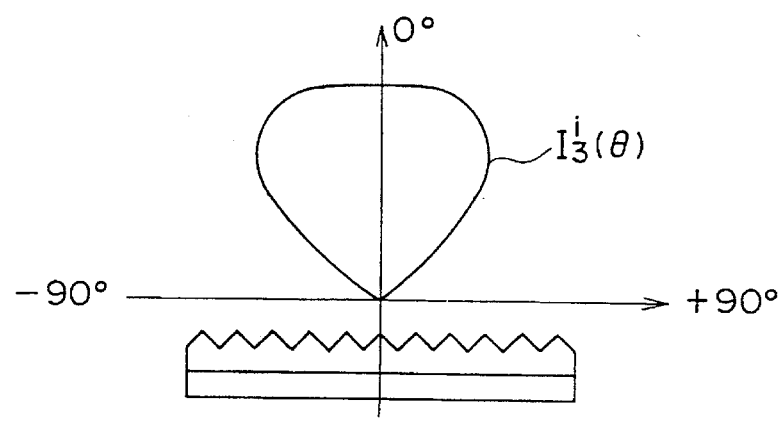
FIG. 19C is a schematic diagram for explaining the intensity of transmitted light of the embodiment of FIG. 18.

FIG. 18 is a sectional view showing a first embodiment (back-light type) of a surface light source according to the first invention. FIGS. 19A, 19B, and 19C are schematic diagrams for explaining the intensity of transmitted light of embodiments of FIG. 18.

The back-light type surface light source 30 has a linear light source 32 (such as a fluorescent lamp) which is accommodated in a case 31. A lenticular lens 10 and a light isotopic diffusing layer 20 are disposed on an opening side of the case 31.

The intensity of transmitted light, $I^i_1(\theta)$, has a cosine distribution as shown in FIG. 19A.

On the other hand, the lenticular lens 10 refracts and divides the incident light entered from the linear light source 32 into two rays. Thus, the intensity of transmitted light $I^i_2(\theta)$ of each of rays of light which are divided is shown in FIG. 19B.

Therefore, the intensity of transmitted light $I^i_3(\theta)$ is formed of the intensity of $I^i_2(\theta)$ of each of rays divided. Thus, $I^i_3(\theta)=I^i_2(\theta)\times I^i_2(\theta)$ (as shown in FIG. 19C).

(Embodiment of edge-light type surface light source)

FIG. 20 is a sectional view showing a second embodiment (edge-light type; see also FIG. 20A) of the surface light source according to the first invention. FIGS. 21A to 21D are schematic diagrams for explaining the embodiment of FIG. 20. FIGS. 22A to 22C are schematic diagrams for explaining the intensity of transmitted light of the embodiment of FIG. 20.

The edge-light type surface light source 40 comprises a light guiding plate 41, a reflecting layer 42, a lenticular lens 10, a light isotopic diffusing layer 20, two light sources 43, two reflecting films 44, and two light insulating covers 45. The reflecting layer is formed below the light guiding plate 41. The lenticular lens 10 and the light isotopic diffusing layer 20 are disposed over the light guiding plate 41. The light sources 43, the reflecting films 44, and the light insulating covers 45 are disposed on both the sides of the light guiding plate 41.

Figure 21A:
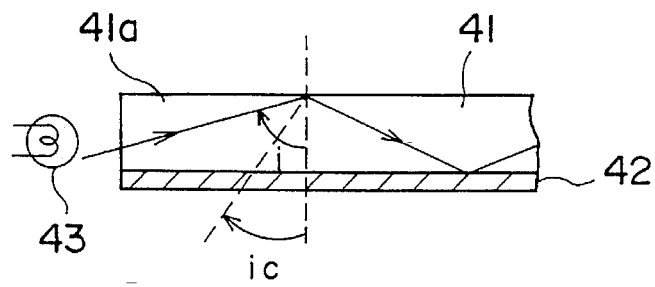
FIG. 21A is a sectional view for explaining the characteristics of a light guiding plate.
Figure 22A:
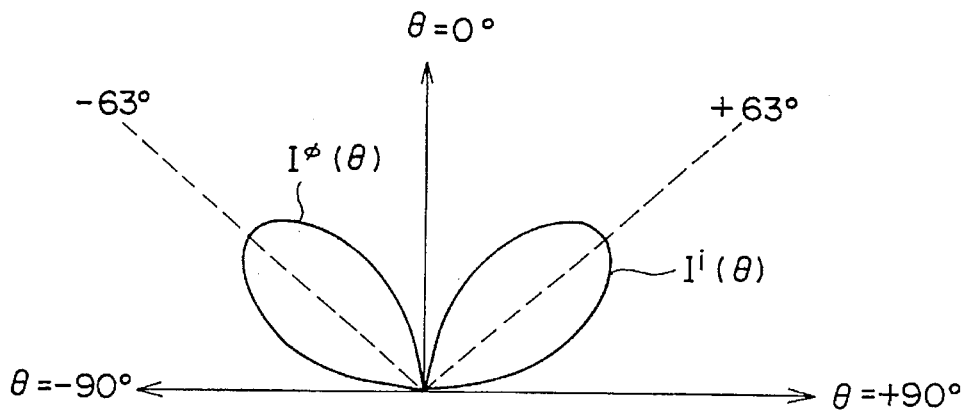
FIG. 22A is a schematic diagram for explaining the intensity of transmitted light of the embodiment of FIG. 20.
Figure 22B:
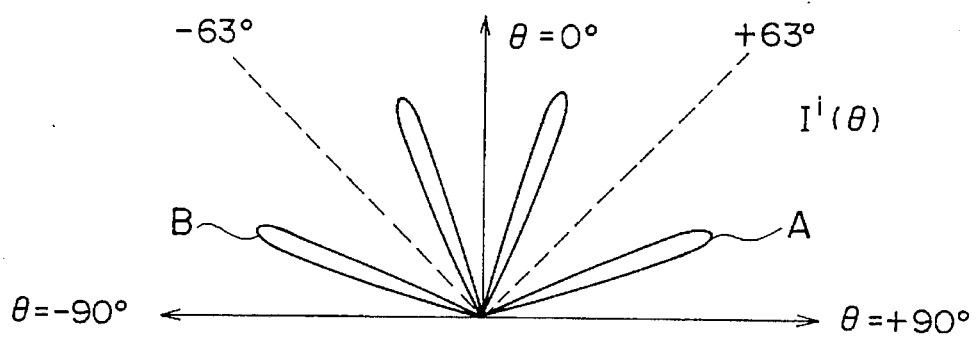
FIG. 22B is a schematic diagram for explaining the intensity of transmitted light of the embodiment of FIG. 20.
Figure 22C:
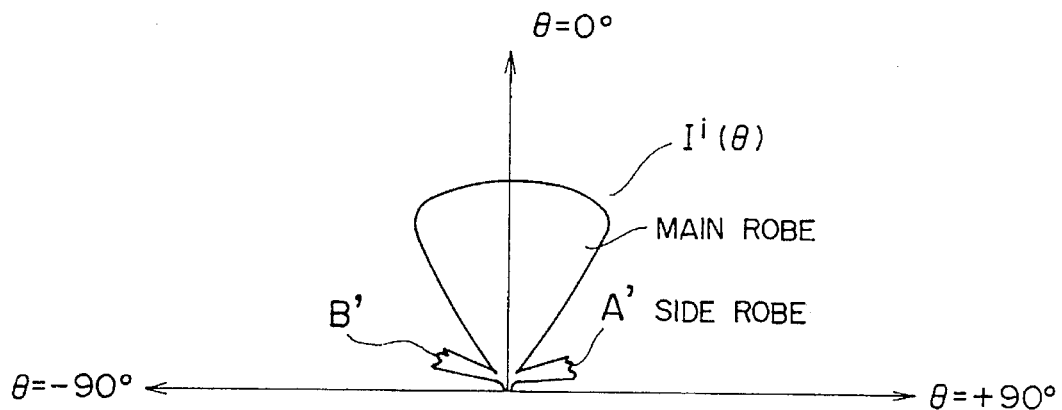
FIG. 22C is a schematic diagram for explaining the intensity of transmitted light of the embodiment of FIG. 20.

When the incident angle i of the light guiding plate 41 is larger than the critical angle ic, rays of light totally reflect and propagate in the light guiding plate 41 as shown in FIG. 21A. Thus, the rays of light do not leak out from a light emitting surface 41a.

Figure 21B:
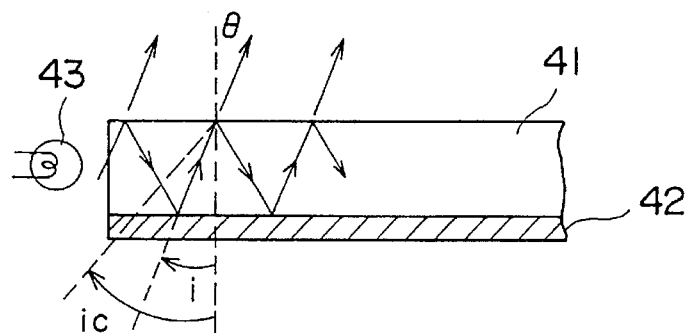
FIG. 21B is a sectional view for explaining the characteristics of a light guiding plate.

On the other hand, when the incident angle i is smaller than the critical angle ic, part of rays of light reflect on a side interface of the light emitting surface 41a of the light guiding plate 41 (propagate in the light guiding plate 41) as shown in FIG. 21B. The rest of the rays of light transmit the light guiding plate 41 and then the rays are emitted.

Figure 21C:
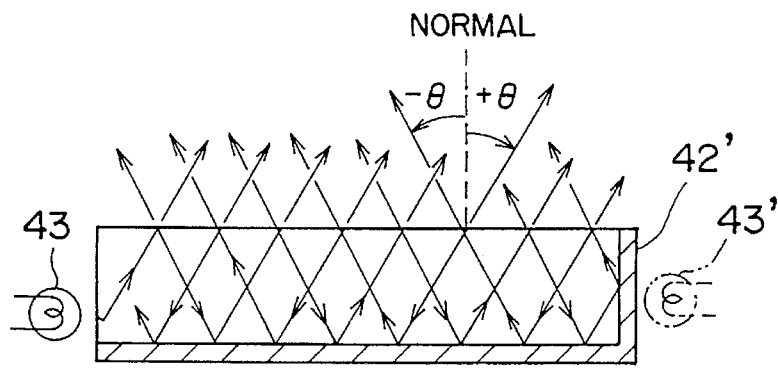
FIG. 21C is a sectional view for explaining the characteristics of a light guiding plate.
Figure 21D:
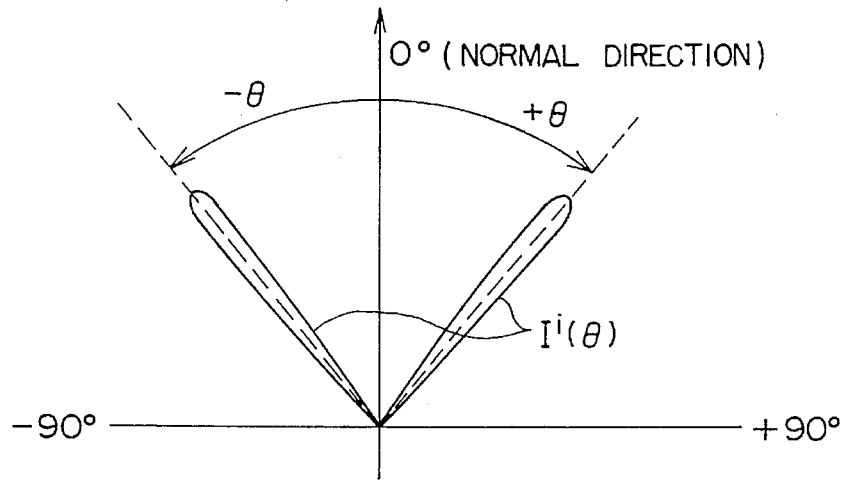
FIG. 21D is a sectional view for explaining the characteristics of a light guiding plate.

In reality, as shown in FIG. 21C, when a light source 43' or a light reflecting layer 42' is disposed on the other end surface of the light guiding plate 41, the rays of light bidirectionaly propagate in the light guiding plate 41. Alternately, when a stationary wave should be formed, rays of light are irradiated with angles $\pm\theta$ to the normal.

It is known that these angles $\theta$ are 60° and –60°. Thus, sharp peaks take place in these directions. To deflect these rays of light nearly in the normal direction, where the user sees an image, the lenticular lens 10 is used. By the lenticular lens 10, rays of light are deflected in proper directions (if the vertical angle $\alpha$ is 90°, the angles $\theta$ become 30° and –30° as shown in FIG. 11).

In each of the back-light type surface light source and edge-light type surface light source, the rays of light which are emitted from the light emitting surface have two peaks in two directions symmetrical with respect to the normal direction of the light emitting surface (see FIG. 11).

However, these surface light sources cannot equally emit rays of light. In other words, the intensity of the light in the normal direction, where the user sees an image, is weaker than that of the two peaks. When the light isotopic diffusing layer (delustered transparent layer) 20 is used, a gradual peak is produced in the normal direction. Thus, the diffusing light can be emitted only in the range from 30° to 100° each on the left and right of the normal direction, where the user usually see images.

In the case of the edge-light type surface light source 40, rays of light which transmit the light guiding plate 41 has two peaks in two directions with for example angles $\pm 63°$ symmetrical with respect to the normal direction. Thus, the intensity of transmitted light $I^i(\theta)$ has a distribution where the symmetrical axes to the normal direction are rotated by $\pm 63°$ (see FIGS. 22A and 22B). These two peaks are composed (thus, the product of $I^i(\theta)$). Thus, the intensity of transmitted light of the surface light source 40 becomes $I^i(\theta)$ (see FIGS. 22C and 22B). In FIGS. 16 and 17, the intensity of transmitted light in the directions of $\theta=+63°$ and –30° is shown.

At this point, peaks A and B of FIG. 22B become side lobes A' and B', respectively. When the vertical angle $\alpha$ of the lens element 12 is equal to or larger than 95°, the side lobes A' and B' can be remarkably attenuated.

(Embodiment of light reflecting layer)

FIGS. 23A to 23D are sectional views showing embodiments of light reflecting layers for use with the edge-light type surface light source.

A light reflecting layer 42 is a layer which diffuses and reflects rays of light. The light reflecting layer 42 is formed in the following manner.

Figure 23A:
FIG. 23A is a sectional view showing an embodiment of a light reflecting layer for use with the edge-light type surface light source.

(1) As shown in FIG. 23A, a white layer 42A is coated over one surface of a light guiding plate 41. The white layer 42A is a pigment with high insulating characteristics and high whiteness degree (such as titanium dioxide or aluminum).

Figure 23B:
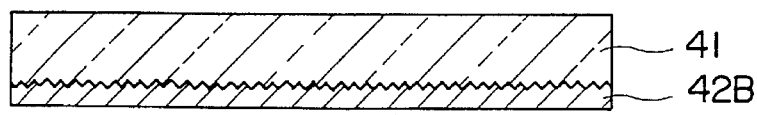
FIG. 23B is a sectional view showing an embodiment of a light reflecting layer for use with the edge-light type surface light source.

(2) As shown in FIG. 23B, a delustering fine mat pattern 41a is formed on one surface of the light guiding plate 41 by sand-blasting method, emboss method, or the like. Thereafter, a metal such as aluminum, chrome, or silver is plated or vacuum evaporated on the delustering fine mat pattern 41A so as to form a metal thin film 42B.

Figure 23C:
FIG. 23C is a sectional view showing an embodiment of a light reflecting layer for use with the edge-light type surface light source.

(3) As shown in FIG. 23C, a metal thin film 42B is formed on a white layer 42A' similar to that shown in FIG. 22A (the light insulating characteristic of the white layer 42A' may be lower than that of the white layer 42A).

Figure 23D:
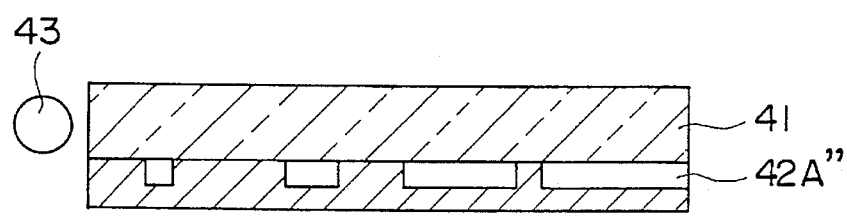
FIG. 23D is a sectional view showing an embodiment of a light reflecting layer for use with the edge-light type surface light source.
Figure 23E:
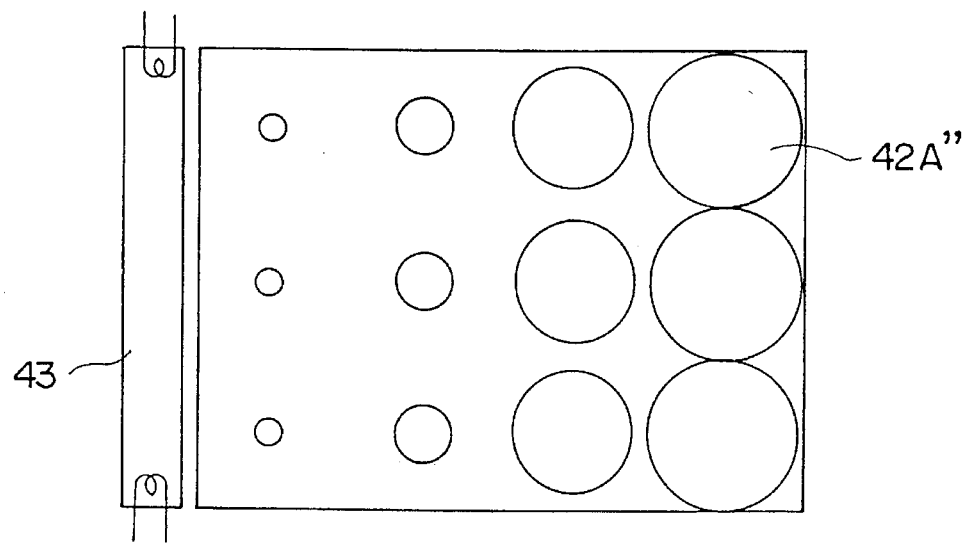
FIG. 23E is a sectional view showing an embodiment of a light reflecting layer for use with the edge-light type surface light source.

(4) As shown in FIGS. 23D and 23E, a white layer 42A" in a mesh pattern is formed over the light guiding plate 41 in such a way that the area of the white layer 42A" increases in proportion to the distance from the light source 43 so as to prevent the intensity of the light source 43 from decreasing.

When the surface light sources 30 and 40 shown in FIGS. 18 and 20 are disposed on known transmission type liquid crystal display devices, they can be used as liquid crystal display apparatuses.

As described above, according to the first invention, the intensity of side lobes which cause light loss and stray light (light noise) can be remarkably reduced. As a result, rays of light can be equally and isotopically focused in a limited angle range (30° to 100° on the left and right symmetrically with respect to the normal direction).

Thus, when the lenticular lens according to the present invention is used for a surface light source, it can emit bright surface light without the need to increase power consumption and heat generation. In addition, the light diffusing angles and the equal and isotopic characteristics thereof of the present invention can be nearly the same as those of the related art references.

Next, a lenticular lens according to the second invention will be described.

(Embodiment of integrated type lenticular lens)

Figure 24A:
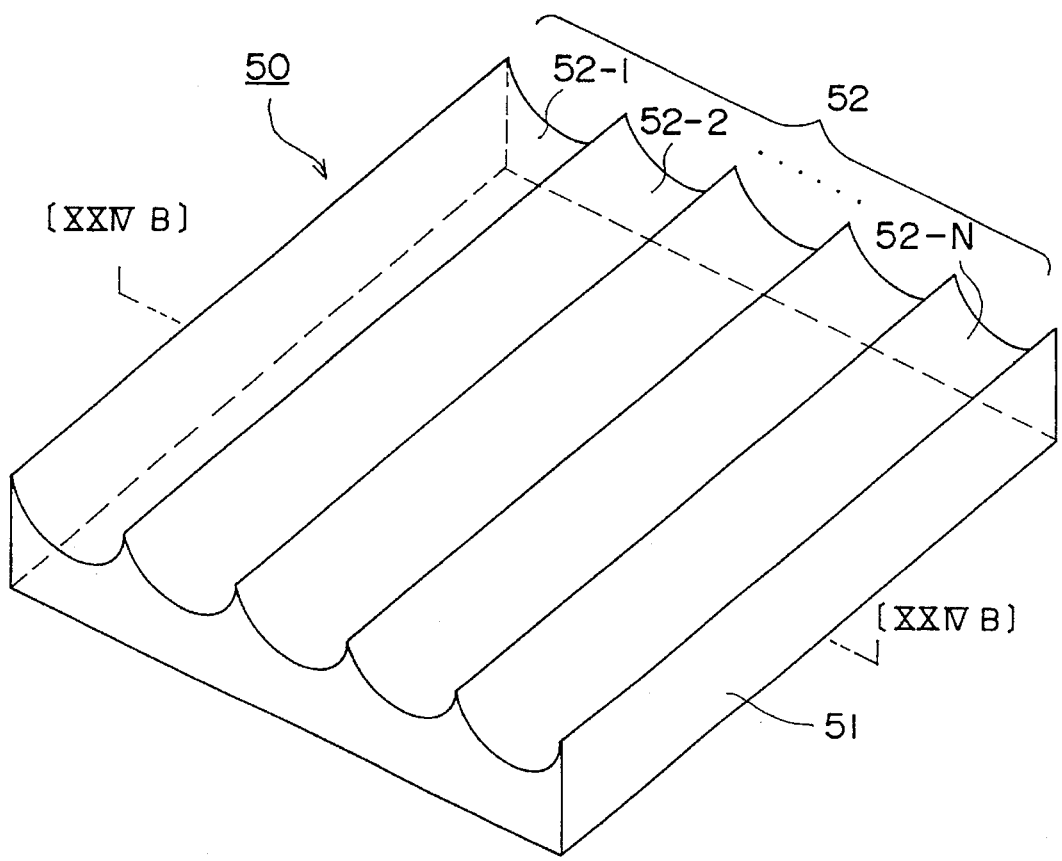
FIG. 24A is a perspective view showing a first embodiment of a lenticular lens according to a second invention.
Figure 24B:
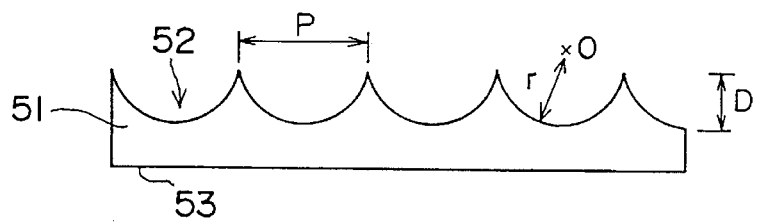
FIG. 24B is a perspective view showing a first embodiment of a lenticular lens according to a second invention.

FIGS. 24A and 24B show a first embodiment of a lenticular lens according to the second invention. FIG. 24A is a perspective view showing the first embodiment. FIG. 24B is a sectional view taken along line XXIVB—XXIVB of FIG. 24A.

In the lenticular lens 10 according to the first embodiment of the first invention, a lens plane 52 is formed on one surface of a light transmitting substrate 51. The lens plane 52 is formed of a plurality of lens elements 52-i (i=1 to N). The lens elements 52-i are defined in such a way that their ridges are aligned in parallel with each other. The other surfaces of the light transmitting substrate 51 are flat surfaces 53.

The material, thickness, and transmittance of the light transmitting substrate 51 are the same as those of the first invention. However, according to the second invention, in the case of the back-light type or if the light guiding member is hollow and if the light isotopic diffusing layer is a thin plastic sheet, a thicker resin with a thickness of 1 to 10 mm may be used.

The concave lens elements 52-i of the lens surface 52 are continuously formed in such a way that the shape of the main cross section which is cut perpendicular to the longer axis (their ridges) accords with a quadratic curve (such as a circle, an ellipse, a hyperbola, or a parabola), a Rankine egg shape, a curve expressed by a linear function (such as a trochoid, a cycloid, a cardioid, or an involute), or a similar curve. Part (normally, less than semi-circle) of a curve (circle or the like) with a concave or convex portion on one side is formed.

The angle distribution of the concave lens elements 52-i as a diffused light emitting surface is determined by parameters of shape (such as a radius of curvature r, a cutting depth D, and a pitch P). The values of these parameters are preferably in the range from 20 to 1000 μ.

The lens surface 52 may be disposed on the light source side or the light emitting side (opposite side of the light source side (see FIGS. 32 and 33)).

The lens surface 52 may be formed by a known heat press method (as disclosed in Japanese Patent Laid-Open Publication No. 56-157310), a method disclosed in Japanese Patent Laid-Open Publication No. 61-156273, or the like. In the latter method, an ultraviolet-ray-setting thermoplastic resin film is embossed by a roll emboss plate. Thereafter, the film is irradiated with ultraviolet rays and thereby the film is hardened.

(Embodiment of lamination-type lenticular lens)

Figure 25:
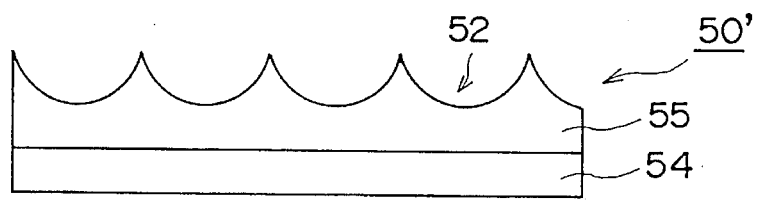
FIG. 25 is a sectional view showing a second embodiment of the lenticular lens according to the second invention.

FIG. 25 is a sectional view showing a second embodiment of the lenticular lens according to the second invention.

While the lenticular lens 50 according to the first embodiment is formed of only the light transmitting substrate 51, a lenticular lens 50' according to the second embodiment is formed by layering a lens layer 55 made of a light transmitting substrate having a lens surface 52, which is similar to that of the first embodiment, over a plane light transmitting substrate 54.

The lenticular lens 50' is made in the following manner. An electron/ultraviolet-ray-setting resin solution is coated on a roll (cylindrical) mold. A light transmitting substrate sheet is contacted with the mold surface. At this point, the resin solution is hardened. The substrate sheet is adhered to the hardened resin. Thereafter, the hardened resin with a mat pattern of the mold is removed. This method is disclosed in U.S. Pat. No. 4,576,850 and 3,689,346, Japanese Patent Application No. 3-223883, and so forth).

(Shape of concave lens elements)

Figure 26A:
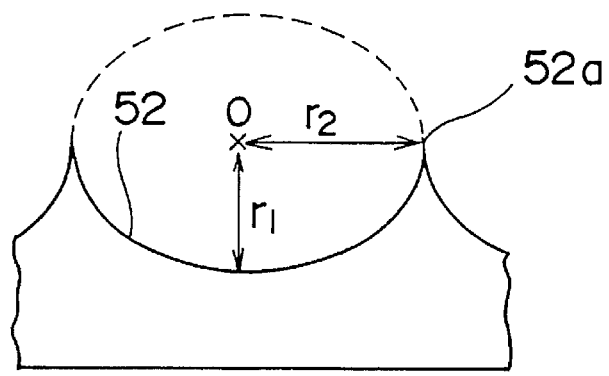
FIG. 26A is a sectional view showing the shape of concave lens elements of the lenticular lens according to an embodiment of the second invention.
Figure 26B:
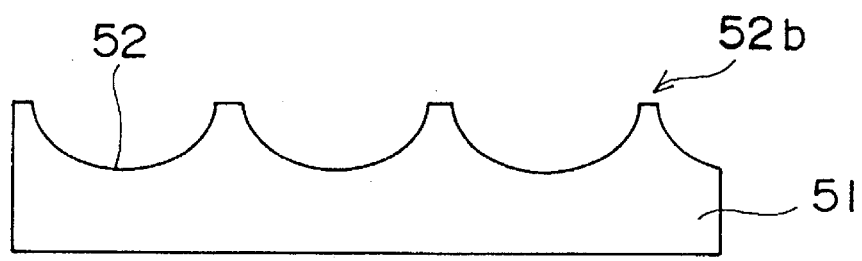
FIG. 26B is a sectional view showing the shape of concave lens elements of the lenticular lens according to an embodiment of the second invention.
Figure 26C:
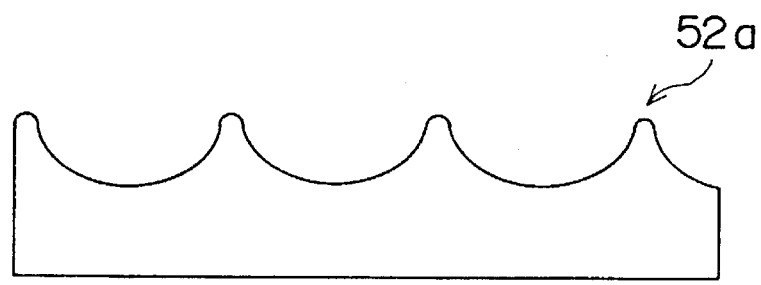
FIG. 26C is a sectional view showing the shape of concave lens elements of the lenticular lens according to an embodiment of the second invention.

FIGS. 26A, 26B, and 26C are sectional views showing the shapes of concave lens elements of the lenticular lens according to embodiments of the second invention.

As shown in FIG. 26A, when the concave lens elements 52-i each have a circular section, they may have pointed arch portions 52a which are part of ellipses. In addition, as shown in FIG. 26B, the concave lens elements 52-i may have flap portions 52b at upper positions. Moreover, as shown in FIG. 26C, the concave lens elements 52-i may have curved portions 52c at the upper positions. (Optical paths of rays of light)

FIGS. 27 to 30 are schematic diagrams showing optical paths of rays of light which transmit the lenticular lens according to an embodiment of the present invention.

Rays of light which enter the lenticular lens 50 are emitted with an angle distribution determined by the radius of curvature r, the cutting depth D, the pitch P (see FIG. 24B), the refractive index n, and so forth.

Figure 27:
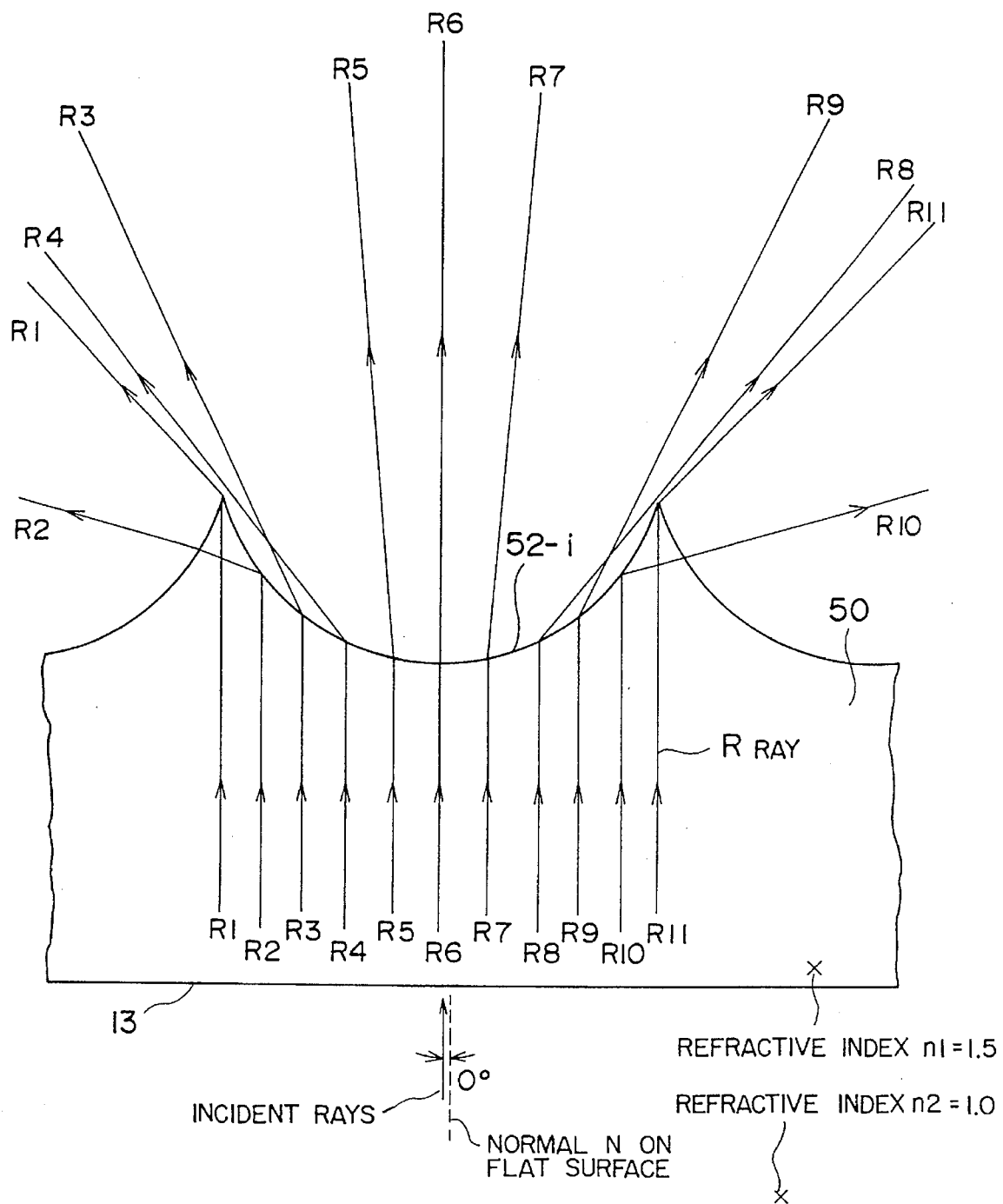
FIG. 27 is a schematic diagram showing optical paths of rays of light transmitted through a lenticular lens according to an embodiment of the second invention.
Figure 30:
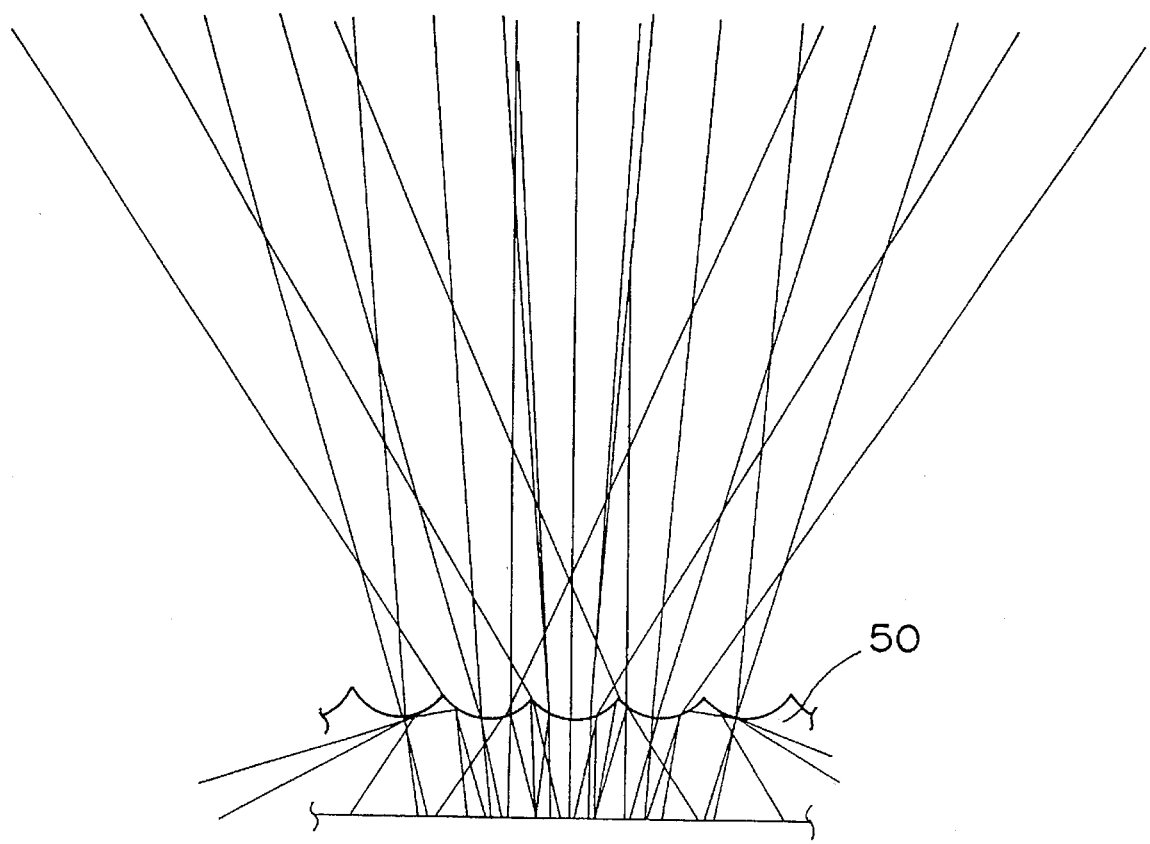
FIG. 30 is a schematic diagram showing optical paths of rays of light transmitted through a lenticular lens according to an embodiment of the second invention.

FIGS. 27 and 30 show simulation diagrams of optical paths of rays of light which are emitted from the lenticular lens 50 which is made of an acrylic resin (according to a first fabrication example described later) with a radius of curvature r of 35 μm, a pitch P of 59 μm, and a refractive index n of 1.5.

To obtain a desired diffusing angle $\theta_s$, the parameters $n_1$, P, and D are optimally designed in the following manner.

When most of rays of incident light enter a plane surface 53 of the lenticular lens 50 at an incident angle=0° as with a back-light type back-light source, the optical paths of rays of light emitted from the lens are determined by positions where total reflection conditions are satisfied. In FIG. 27, the refractive angle increases as the distance from the center of the lens increases. The total reflection conditions are satisfied between rays $R_2$ and $R_3$ and between rays $R_9$ and $R_{10}$. At this point, rays $R_{2.5}$ and $R_{9.5}$ are emitted in the tangent direction of the lens. Rays outside the rays $R_{2.5}$ and $R_{9.5}$ are widely spread. However, the rays of light which are widely spread are much smaller than all the rays of light. The outer rays such as rays $R_1$ and $R_{11}$ become focusing rays rather than diffusing rays.

Figure 28:
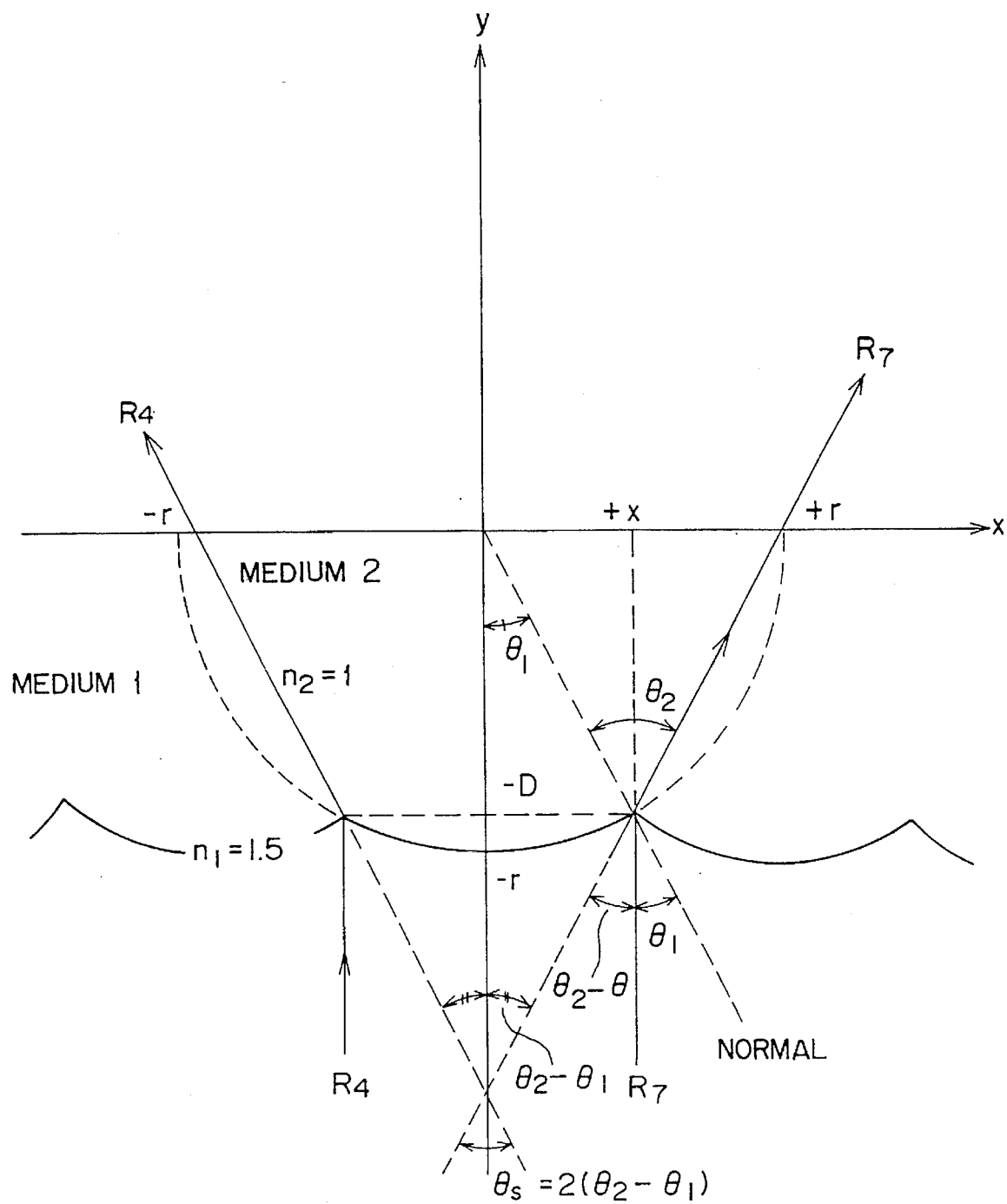
FIG. 28 is a schematic diagram showing optical paths of rays of light transmitted through a lenticular lens according to an embodiment of the second invention.
Figure 29:
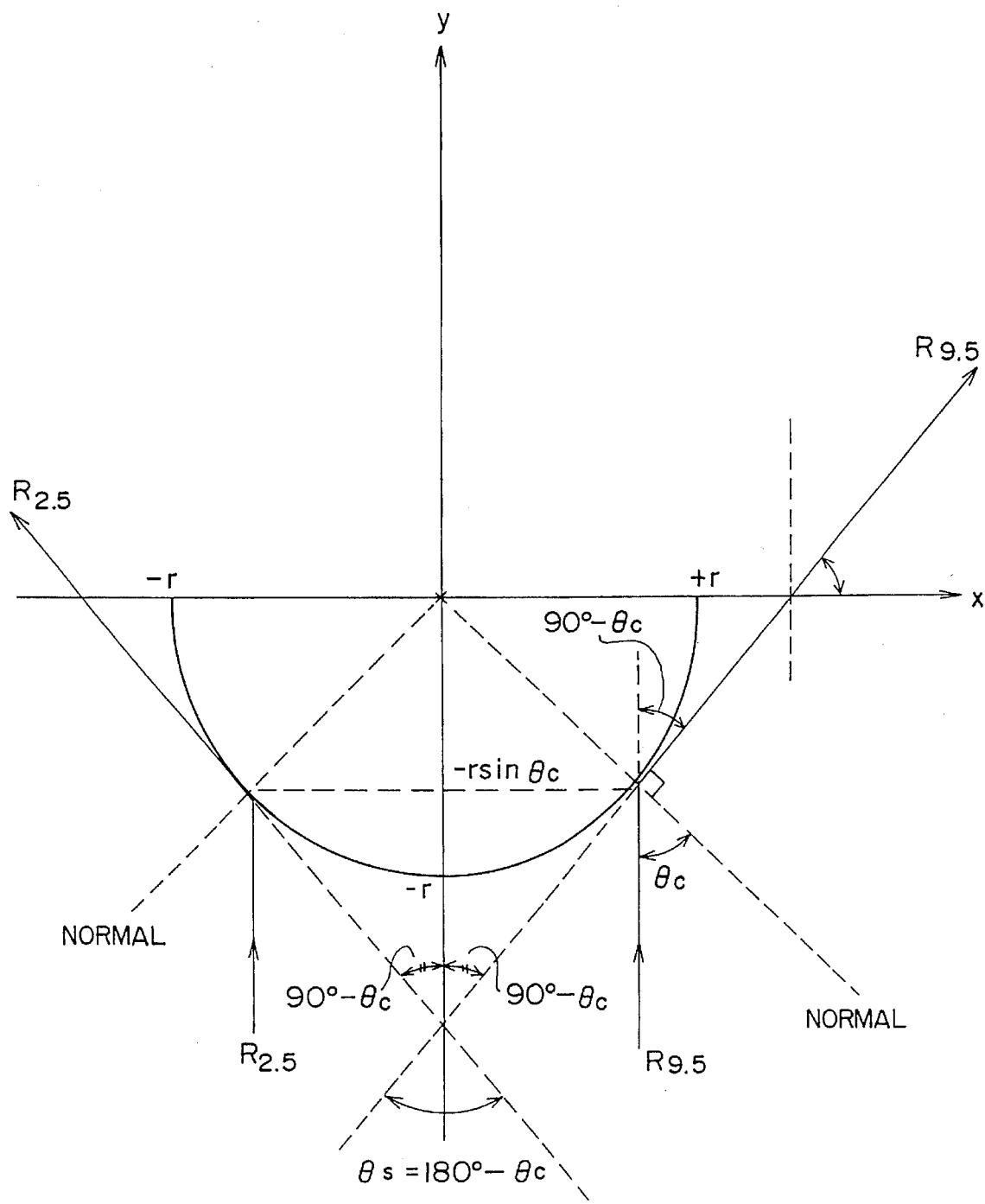
FIG. 29 is a schematic diagram showing optical paths of rays of light transmitted through a lenticular lens according to an embodiment of the second invention.

Consequently, the range of which rays of light are totally reflected (between rays $R_{2.6}$ and $R_{9.5}$) is a diffusing angle $\theta_s$ of emitted light as shown in FIGS. 28 and 29.

(1) When the cutting depth D is equal to or smaller than r $\sin\theta_c$ (total reflection takes place at a particular position), if the section of the lens is circular, the diffusing angle $\theta_s$ is given by the following equation regardless of the radius of curvature.

$$\theta_s = 180° - \theta_c = \sin^{-1}(1/n_1)$$

Thus, when a desired $\theta_s$ is given, a refractive index $n_1$ can be selected as follows.

$$n_1 = 1/(\sin \theta_s)$$

(2) When the cutting depth D>r sin $\theta_c$>0 (if θ<$\theta_c$, no total reflection always takes place), the following relation is satisfied.

$$n_1 \sin \theta_1 = n_2 \sin \theta_2$$

because $\theta_2 = \sin^{-1}(n_1 \sin \theta_1)$
In addition, since $\theta_1 = \tan^{-1}(x/D)$ the diffusing angle $\theta_s$ is given as follows.

$$\theta_s = 2(\theta_2 - \theta_1) = 2[\sin^{-1}\{n_1 \sin(\tan^{-1}(x/D))\} - \tan^{-1}(x/D)]$$

In particular, when the edge portions as shown in FIG. 26A are formed, since 2x=P, the diffusing angle $\theta_s$ is given as follows.

$$\theta_s = 2[\sin^{-1}\{n_1 \sin(\tan^{-1}(P/2D))\} - \tan^{-1}(P/2D)]$$

When a desired $\theta_s$ is given, since the refractive index $n_1$, the cutting depth D, and the pitch P can be selected, degree of freedom of designing increases.

In FIG. 27, with a back-light surface light source (see FIG. 34), parallel rays of light with an incident angle of 0° are entered into a plane surface 53 of a lenticular lens 50 and then the transmitted rays of light are emitted from a concave lens element 52.

In FIG. 30, a lenticular lens 50 is disposed on a light isotopic diffusing layer 60 of an edge-light type surface light source and rays of light are entered from a plane surface 53. In this drawing, rays of light with an angle range of −40° to +40° to the normal are entered (See FIG. 36C).

(Light isotopic diffusing layer)

FIGS. 32A, 32B, 33A and 33B are sectional views showing layer constructions of lenticular lenses and light isotopic diffusing layers according to embodiments of the second invention.

A lenticular lens 50 and a light isotopic diffusing layer (delustered transparent layer) 60 may be layered. In this case, the lenticular lens 50 and the light isotopic diffusing layer 60 should be disposed on the user side and the light source side, respectively, so as to focus the diffused light.

Figure 32A:
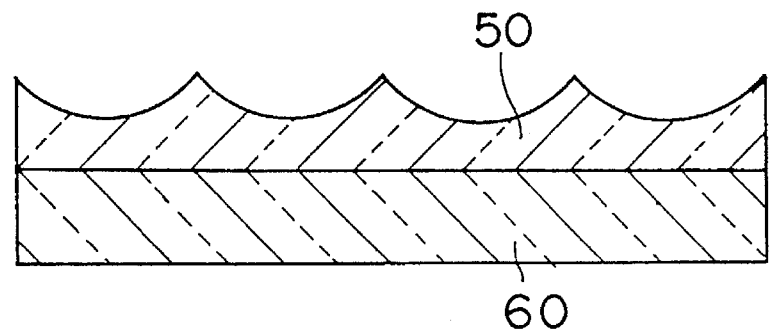
FIG. 32A is a sectional view showing a composition of a lenticular lens and a light isotopic diffusing layer according to an embodiment of the second invention.
Figure 32B:
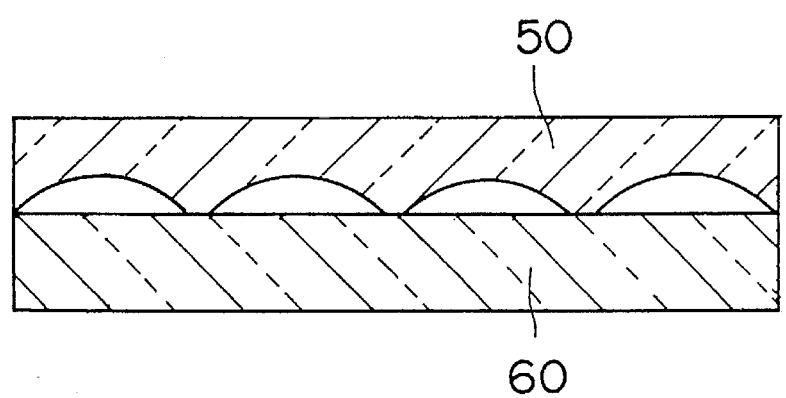
FIG. 32B is a sectional view showing a composition of a lenticular lens and a light isotopic diffusing layer according to an embodiment of the second invention.
Figure 33A:
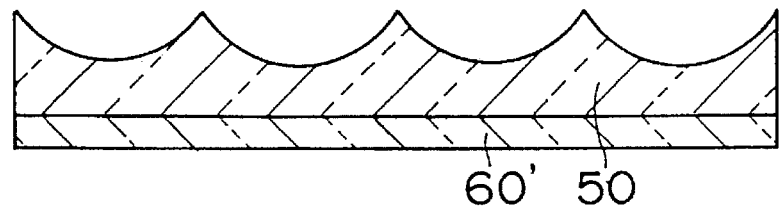
FIG. 33A is a sectional view showing a composition of a lenticular lens and a light isotopic diffusing layer according to an embodiment of the second invention.
Figure 33B:
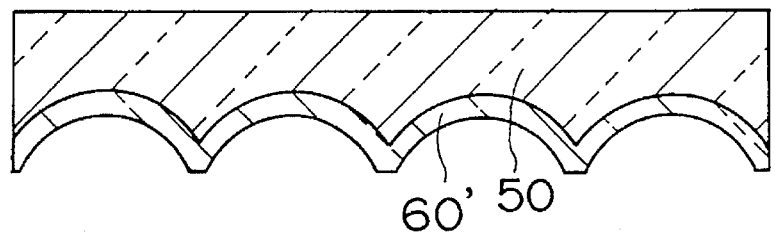
FIG. 33B is a sectional view showing a composition of a lenticular lens and a light isotopic diffusing layer according to an embodiment of the second invention.

As described above, the lens surface 52 of the lenticular lens 50 may be disposed on the user side (as shown in FIGS. 32A and 33A) or the light source side (as shown in FIGS. 32B and 33B).

The light isotopic diffusing layer 60 is made by dispersing inorganic fine particles (such as calcium carbonate, silica, alumina, barium carbonate, or the like) or resin bead particles (such as acrylic resin) which serve as a light diffusing agent (delustering agent) in the above-mentioned light transmitting material. The diameter of the particles of the light diffusing agent is approximately 1 to 20 μm.

The light isotopic diffusing layer 20 is formed by extruding or calendering the above-mentioned resin material (where the light diffusing agent has been kneaded into the light transmitting material). Thus, the light isotopic diffusing layer 20 is formed in a sheet shape as a single layer.

A paint where the light diffusing agent has been dispersed into the light transmitting material which serves as a binder may be coated on the sheet (or plate) of the light transmitting material (as a two-layer construction).

A fine mat pattern (sand pattern) with a centerling-average surface roughness of 1 to 20 μm may be formed on the front surface of the sheet (or plate) of the light transmitting material by sand-blasting method, emboss method, or the like.

(Embodiment of back-light type surface light source)

Figure 34:
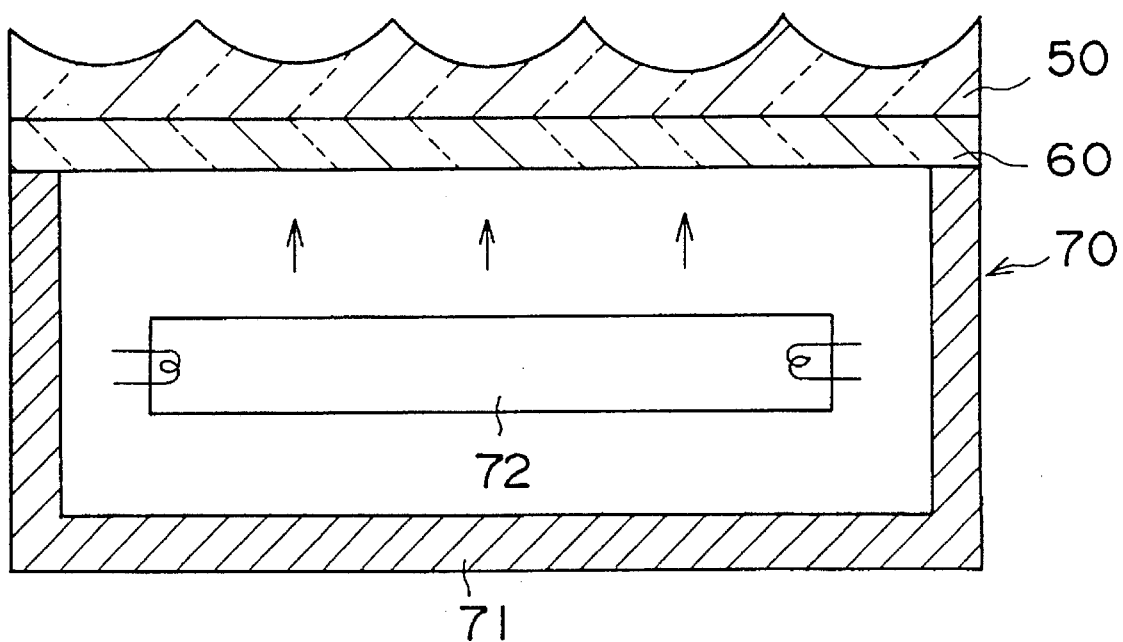
FIG. 34 is a sectional view showing a first embodiment (back-light type) of a surface light source according to the second invention.

FIG. 34 is a sectional view showing a first embodiment (back-light type) of the surface light source according to the second invention.

A back-light type surface light source 70 has a linear light source 72 such as a fluorescent lamp. The linear light source 72 is disposed in a case 71. A light isotopic diffusing layer 60 and a lenticular lens 50 are disposed on an opening side of the case 71.

(Embodiment of edge-light type surface light source)

Figure 36A:
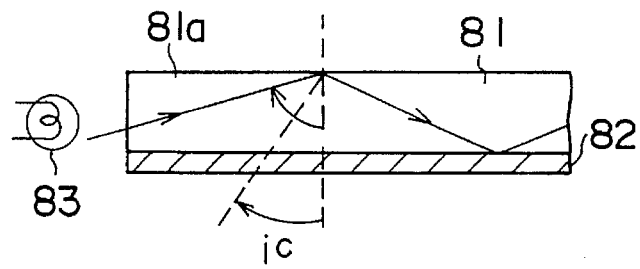
FIG. 36A is a sectional view for explaining characteristics of the light guiding plate of FIG. 25.
Figure 36B:
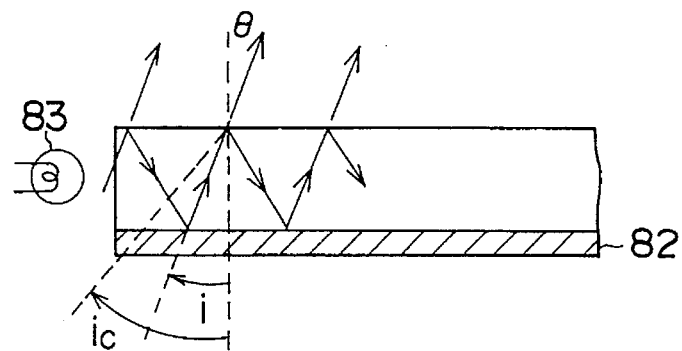
FIG. 36B is a sectional view for explaining characteristics of the light guiding plate of FIG. 25.
Figure 36C:
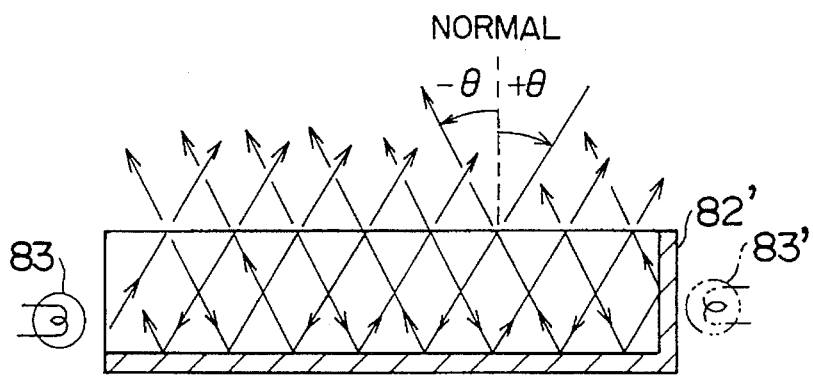
FIG. 36C is a sectional view for explaining characteristics of the light guiding plate of FIG. 25.

FIG. 35 is an exploded perspective view showing a second embodiment ledge-light type) of the surface light source according to the second invention. FIGS. 36A, 36B, and 36C are sectional views for explaining characteristics of a light guiding plate.

The edge-light type surface light source 40 comprises a light guiding plate 81, a reflecting layer 82, a light isotopic diffusing layer 60 (see also FIG. 35A), a lenticular lens 50 (see also FIG. 35B), two light sources 83, two reflecting films 84, and two light insulating covers 85. The reflecting layer 82 is disposed on the lower surface of the light guiding plate 81. The light isotopic diffusing layer 60 and the lenticular lens 50 are disposed on the upper surface of the light guiding plate 81. The light sources 83, the reflecting films 84, and the light insulating covers 85 are disposed on both the sides of the light guiding plate 81.

When the incident angle i of the light guiding plate 81 is larger than the critical angle ic, rays of light totally reflect and propagate in the light guiding plate 81 as shown in FIG. 36A. Thus, the rays of light do not leak out from a light emitting surface 81a.

On the other hand, when the incident angle i is smaller than the critical angle ic, part of rays of light reflect on a critical surface of the light emitting surface 81a of the light guiding plate 81 as shown in FIG. 36B. However, part of the rays of light reflect (propagate in the light guiding plate 81). The rest of the rays of light transmit the light guiding plate 81. Thus, the rays are emitted from the light emitting surface.

In reality, as shown in FIG. 36C, when a light source 83' or a light reflecting layer 82' is disposed on the other end surface of the light guiding plate 81, the rays of light bidirectionaly propagate in the light guiding plate 81. Thus, the rays of light are emitted with angles ±θ symmetrically with respect to the left and right of the normal.

The embodiment of the light reflecting layer for use with the edge-light type surface light source is the same as that of the first invention.

(Measurement of transmitted light)

The inventors of the present inventions fabricated lenticular lenses shown in first and second fabrication examples and first comparison example. Each of these lenticular lenses was placed on a light isotopic diffusing layer 60 through a light isotopic diffusing layer 60 in such a way that the lens elements 52 faced upward. In these conditions, an angle distribution of the intensity of light emitted from the lens elements 52 was measured for each of the first and second fabrication examples and the first comparison example. For a second comparison example, only the light isotopic diffusing layer was used without the light isotopic diffusing layer 60.

First Fabrication Example
   Shape: FIG. 24 (or FIG. 25) Section: Circle
   Radius of curvature r: 35 μm
   Pitch P: 59 μm
   Cutting depth D: 15 μm
   Material: Acrylic resin
   Refractive index $n_1$: 1.5

Second Fabrication Example
   Shape: FIG. 26B Section: Circle
   Radius of curvature r: 100 μm
   Pitch P: 300 μm
   Cutting depth D: 100 μm
   Material: Acrylic resin
   Refractive index $n_1$: 1.5

First Comparison Example
   Shape: Triangular cylinder prism shaped lenticular lens with a vertical angle=90° and bottom angles=45°
   Pitch: 100 μm
   Material: Acrylic resin
   Refractive index $n_1$: 1.5

Second Comparison Example
   An angle distribution was measured only with a light isotopic diffusing layer 60 rather than a lenticular lens.

Figure 31:
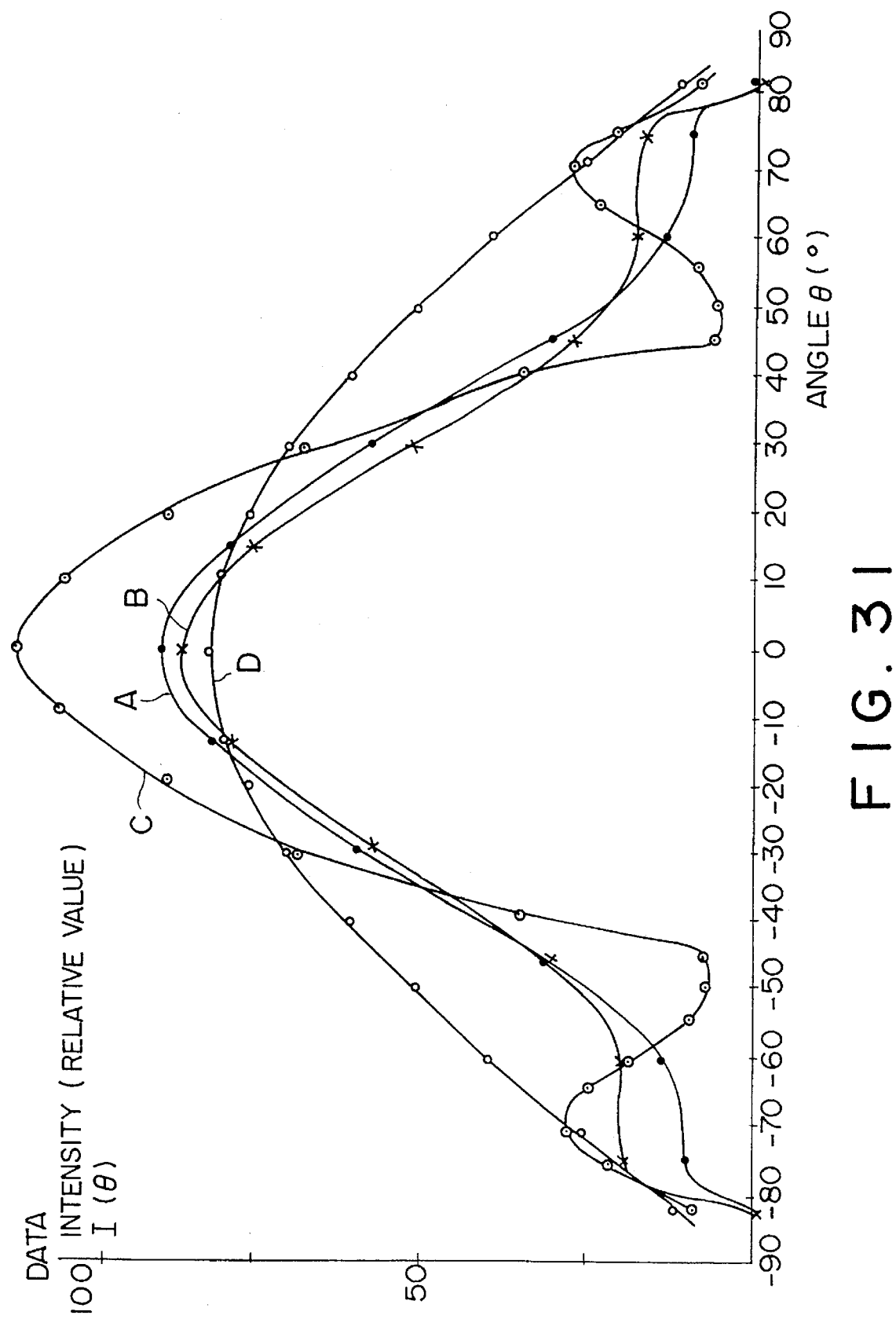
FIG. 31 is a graph showing transmission characteristics of the lenticular lens according to the second invention.

FIG. 31 shows the measurement results of the first and second fabrication examples and the first and second comparison examples with curves A, B, C, and D, respectively. Table 1 shows the measurement results.

TABLE 1

(Measurement Results)

| | Half-value angle $\theta_M$ (°) | Side lobe ratio [%] | Ratio of intensity normal direction |
|---|---|---|---|
| First fabrication example | 38 | 11 | 111.2 |
| Second fabrication example | 35 | 22 | 108.5 |
| First comparison example | 34 | 26 | 135.0 |
| Second comparison example | 37 | 0 | 100.0 (reference) |

With reference to FIG. 31 or Table 1, in the first and second fabrication examples, diffused rays of light are focused on in a predetermined angle range (normally, half-value angle $\theta_M$=30° to 90°) in the vicinity of the normal direction unlike with the second comparison example, where only the light isotopic diffusing layer 60 was used.

In addition, occurrences of side lobes of the first and second fabrication examples are smaller than those of the first comparison example, where a triangular cylinder prism shaped lenticular lens with a vertical angle of 90° was used.

As described above, according to the second invention, when the parameters with respect to shape (such as radius of curvature, pitch, cutting depth, and refractive index) are properly set, rays of light can be diffused in a desired angle distribution.

Thus, when the lenticular lens is used along with a light isotopic diffusing layer, rays of light can be focused in a desired angle range to the normal direction. Thus, high intensity of light can be obtained in a predetermined angle range with the same power consumption. In other words, the same intensity can be obtained with less power consumption.

In addition, since light energy emitted from diagonal directions to tangent direction decreases, occurrences of stray light decrease.

Moreover, the occurrences of side lobes and stray light of the first and second fabrication examples are smaller than those of the first comparison example, which is the triangular cylinder prism shaped lenticular lens.

Next, before explaining the third and fourth inventions, related art references thereof will be described.

The following related art references for back-light surface light sources for use with liquid crystal display (LCD) devices are known.

Figure 43:
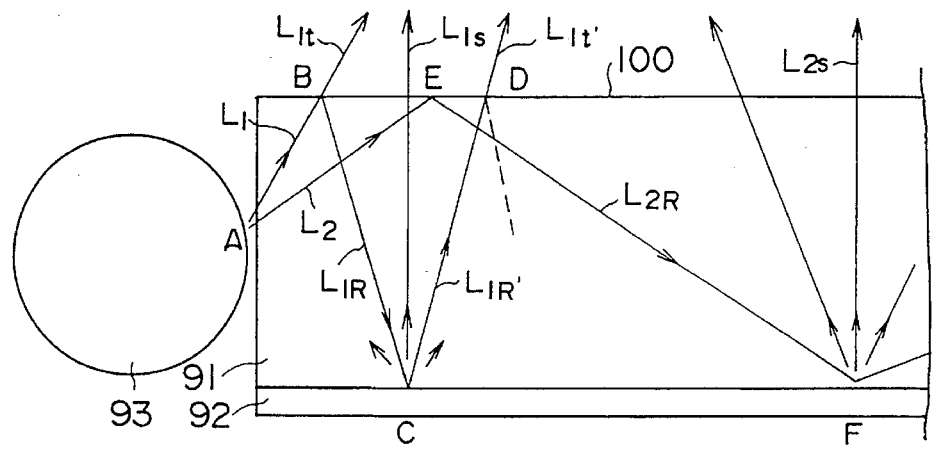
FIG. 43 is a sectional view of an edge-light type surface light source of a related art reference, no lens sheet being disposed on a light guiding plate.

(1) As shown in FIG. 43, an edge-light type surface light source with a light transmitting plate which serves as a light guiding member is known. In this device light source, rays of light are entered from at least one side edge surface of a light guiding member made of a transparent flat plate. The rays of light are totally reflected and equally transmitted in the light guiding plate. Part of transmitted rays of light are emitted by a light scattering and reflecting plate on the front surface of the light guiding plate as diffused and reflected rays of light with angles less than critical angle. Thus, the diffused rays of light are emitted from the front surface of the light guiding plate. This related art reference is disclosed as Japanese Utility Model Registration Laid-Open Publication No. 55-162201.

Figure 44:
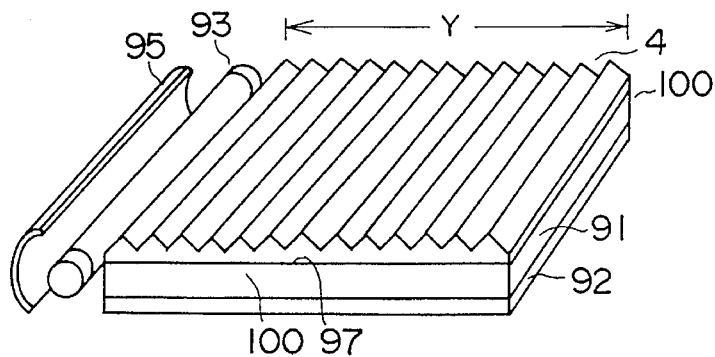
FIG. 44 is a perspective view showing an edge-light type surface light source of a related art reference, a lens sheet being in contact with a light guiding plate without a cavity.

(2) As shown in FIG. 44, a lens sheet having a triangular cylinder prism shaped lenticular lens surface and a flat surface is disposed on the light guiding plate of the surface light source described in the first related art reference so that the lens surface of the lenticular lens is in contact with the front surface of the light guiding plate. By the light focusing effect of the lens, diffused and irradiated rays can be equally and isotopically diffused in a desired angle range. This second related art reference is disclosed as Japanese Utility Model Registration Laid-Open Publication No. 4-107201. When this lens sheet is used along with a delustered transparent light diffusing plate (delustered transparent sheet), light energy of the light source can be more effectively distributed in a limited angle range than another related art reference which only uses a delustered transparent diffusing plate (as disclosed in U.S. Pat. No. 4,729,067). In addition, in the second related art reference, diffused rays of light with high equality and isotropy can be obtained in this angle range.

Figure 53:
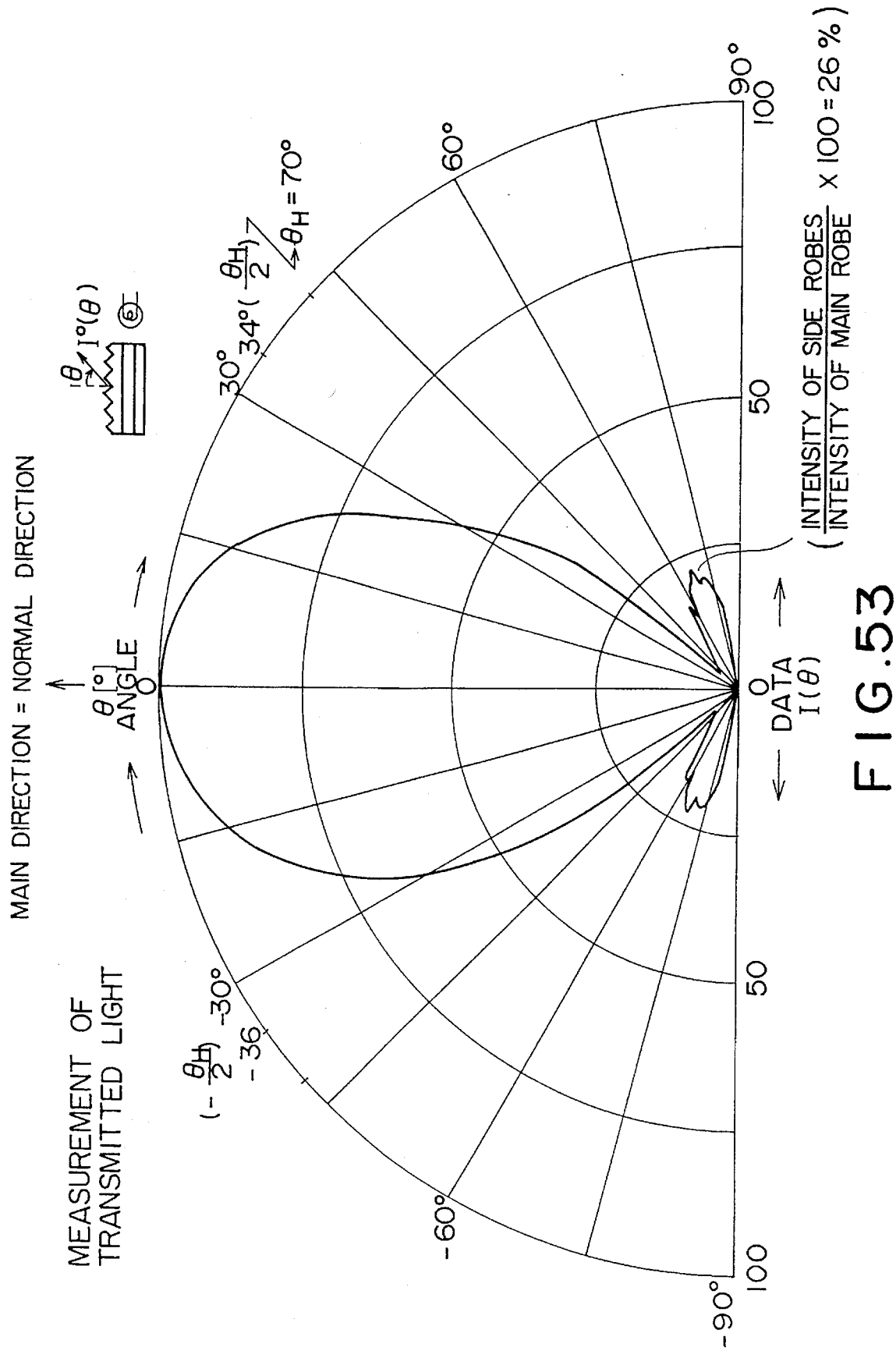
FIG. 53 is a graph showing the characteristics of an edge-light type surface light source according to a first comparison example, the graph illustrating an angle distribution of the intensity of emitted light of a triangular cylinder lenticular lens.

However, in the first related art reference, only with a light scattering plate disposed on the rear surface of a light guiding member, emitted rays of light have a relatively sharp distribution with a peak of 60° in the normal direction of the front surface of the light guiding plate. Thus, the intensity of light in the normal direction is insufficient. In other words, light energy is scattered in diagonal directions where light is not less useful. In addition, in the second related art reference, since a triangular cylinder prism shaped lenticular sheet reflects and focuses emitted rays of light, the ratio of light energy in an angle range from 30° to 60° is high (with a peak of light energy in the normal direction of the light emitting surface). However, as shown in FIG. 53, peaks (side lobes) take place in diagonal directions apart from the normal direction.

Thus, lost light which is not useful for the user remains. In addition, noise light is adversely irradiated around the side lobes.

In addition, with respect to the intensity distribution on the light emitting surface, although light intensity at positions spaced apart by 2 to 4 cm from a side edge of the light guiding plate, the light intensity gradually unexpectedly decreases as the distance from the side edge further increases. The light intensity at the other side edge opposite to the light source is very dark.

To solve such problems, the following attempts were made.

(3) A light diffusing layer disposed on a rear surface of a light guiding member is formed in a mesh pattern or the like. In addition, the area of the pattern is decreased in proportion to the distance to a light source so as to compensate and equalize a light intensity distribution on the surface of a light guiding plate. This attempt is disclosed as Japanese Patent Laid-Open Publication No. 1-245220.

(4) Two or more light sources are disposed on side edges of a light guiding plate so as to compensate and equalize a light intensity distribution of the surface of the light guiding plate. This attempt is disclosed as Japanese Patent Laid-Open Publication No. 3-9306.

However, in such attempts, the light intensity cannot be equalized. In the third related art reference, the mesh pattern of the light diffusing layer becomes remarkable. On the other hand, in the fourth related art reference, the space and power consumption of the light source become twice as much as those of the other related art references.

An object of the third and fourth inventions are to solve the above-mentioned problems and to provide a lens sheet for use with a liquid crystal display apparatus and a surface light source having such a lens sheet so as to equally emit high intensity of rays of light in a desired angle range free of deviation of intensity depending on the position on the surface without the need to increase power consumption and heat generation.

(Construction)

Next, the third invention will be described.

A surface light source according to the first embodiment of the third invention comprises a light guiding member made of a light transmitting plate or a rectangular parallelpiped cavity, at least one linear or point light source disposed on at least one side edge of the light guiding member, at least one light reflecting layer disposed on the rear surface of the light guiding member, and a concave or convex lenticular lens sheet layered on a light emitting surface of the light guiding member.

The lens lenticular sheet is formed of a large number of elliptic cylinder lens elements defined in such a way that their ridges are aligned in parallel. The longer axis direction of the elliptic cylinder lens elements accords with the normal direction of the light emitting surface. In addition, the following relation is satisfied.

$$1.1 \times n/(n^2-1)^{1/2} \geq \text{length of longer axis/length of shorter axis}$$

$$\geq 0.9 \times n/(n^2-1)^{1/2}$$

The surface light source according to the second embodiment of the third invention is formed of a large number of hyperbolic lens elements defined in such a way that their edges are aligned in parallel. The longer axis direction of the hyperbolic cylinder lens elements accords with the normal direction of the light emitting surface. In addition, the following relation is satisfied.

$$1.1 \times n/(n^2-1)^{1/2} \geq \text{slope of asymptotic line}$$

$$\geq 0.9 \times n/(n^2-1)^{1/2}$$

The surface light source according to the third embodiment of the third invention is formed of a light transmitting plate having a smooth surface whose surface roughness is equal to or less than the wavelength of the light of a light source. The above-mentioned lenticular lens sheet has a fine mat surface whose surface roughness is equal to or larger than the wavelength of the light of the light source. The fine mat surface is layered on the smooth surface of the light guiding member. Thus, a cavity with a depth of equal to or larger than the wavelength of the light of the light source is disposed at least partly between the light guiding member and the lens sheet.

The surface light source according to the fourth embodiment of the third invention has a light guiding member which is formed of a light transmitting plate having a smooth surface whose surface roughness is equal to or less than the wavelength of the light of a light source. A light diffusing layer is disposed between the rear surface of the above-mentioned lenticular lens sheet and the front surface of the light guiding member. The light diffusing layer has fine mat surfaces whose surface roughness is equal to or larger than the wavelength of the light of the light source. Thus, two cavities whose depth is equal to or larger than the wavelength of the light of the light source are formed at least partly between the front surface of the light guiding member and the light diffusing layer and between the light diffusing layer and the rear surface of the lens sheet.

The surface light source according to the fifth embodiment of the third invention comprises at least one linear or point light source, a lamp house, and a concave or convex lenticular lens. The lamp house covers the lower surface and side surfaces of the light source and has an opening on the upper surface of the light source. The lamp house has inner reflecting surfaces. The concave or convex lenticular lens is disposed over the opening.

The lens sheet is formed of a large number of elliptic cylinder lens elements defined in such a way that their ridges are aligned in parallel. The longer axis direction of the elliptic cylinder lens elements accords with the normal direction of the light emitting surface. In addition, the following relation is satisfied.

$$1.1 \times n/(n^2-1)^{1/2} \geq \text{length of longer axis/length of shorter axis}$$

$$\geq 0.9 \times n/(n^2-1)^{1/2}$$

The surface light source according to the sixth embodiment of the third invention is formed of a large number of hyperbolic lens elements defined in such a way that their edges are aligned in parallel. The longer axis direction of the hyperbolic cylinder lens elements accords with the normal direction of the light emitting surface. In addition, the following relation is satisfied.

$$1.1 \times n/(n^2-1)^{1/2} \geq \text{slope of asymptotic line}$$

$$\geq 0.9 \times n/(n^2-1)^{1/2}$$

The display apparatus according to the seventh embodiment of the third invention comprises the above-mentioned surface light source and a transmission type display device. The transmission type display device is layered over the light emitting surface of the surface light source.

The lens sheet according to the eighth embodiment of the third invention is formed of a large number of elliptic lens elements defined in such a way that their edges are aligned in parallel. The longer axis direction of the elliptic cylinder lens elements accords with the normal direction of the light emitting surface. In addition, the lens sheet has a fine mat surface whose surface roughness is in the range from the wavelength of light of the light source to 100 μm. The fine mat surface is formed on the non-lens surface of a convex or concave lenticular lens. The longer axis and the shorter axis of the lens elements have the following relation.

$$1.1 \times n/(n^2-1)^{1/2} \geq \text{length of longer axis/length of shorter axis}$$

$$\geq 0.9 \times n/(n^2-1)^{1/2}$$

The lens sheet according to the ninth embodiment of the third invention is formed of a large number of hyperbolic cylinder lens elements defined in such a way that their edges are aligned in parallel with each other. The longer axis direction of the hyperbolic cylinder lens elements accords with the normal direction of the light emitting surface. In addition, the lens sheet has a fine mat surface whose surface roughness is in the range from the wavelength of light of the light source to 100 μm. The fine mat surface is formed on the non-lens surface of a convex or concave lenticular lens. The longer axis and the shorter axis of the lens elements have the following relation.

$$1.1 \times n/(n^2-1)^{1/2} \geq \text{slope of asymptotic line}$$

$$\geq 0.9 \times n/(n^2-1)^{1/2}$$

The lens sheet 94 according to the third invention is an elliptic cylinder lenticular lens or a hyperbolic cylinder lenticular lens. First, the elliptic cylinder lenticular lens will be described.

Figure 39A:
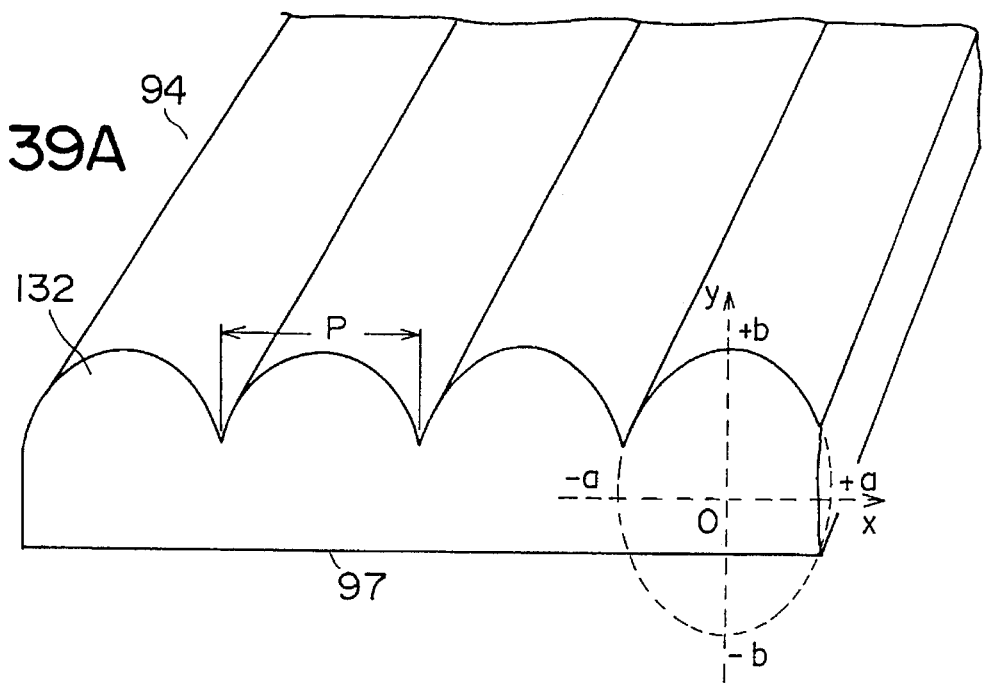
FIG. 39A is a perspective view showing an embodiment (convex elliptic cylinder lenticular lens) of a lens sheet according to the third invention.

As shown in FIG. 39A, the elliptic cylinder lenticular lens is formed of elliptic cylinder lens elements 92 defined in such a way that their edges are aligned in parallel. The longer axis direction of the elliptic cylinder lens elements accords with the normal direction of the lens sheet 94.

The flatness of the ellipsis is given by the following equation.

$$x^2/a^2 + y^2/b^2 = 1 \quad (1)$$

where a is the length of the shorter axis; and b is the length of the longer axis.

When a is smaller than b, the ratio of the length of longer axis and the length of shorter axis (namely, b/a) is given by the following equation.

$$1.1 \times n/(n^2-1)^{1/2} \geq b/a \geq 0.9 \times n/(n^2-1)^{1/2}. \quad (2)$$

When the ellipse is given by the above-mentioned equations, the spherical aberration of the lenticular lens is removed and the light collecting loss is minimized.

Figure 40A:
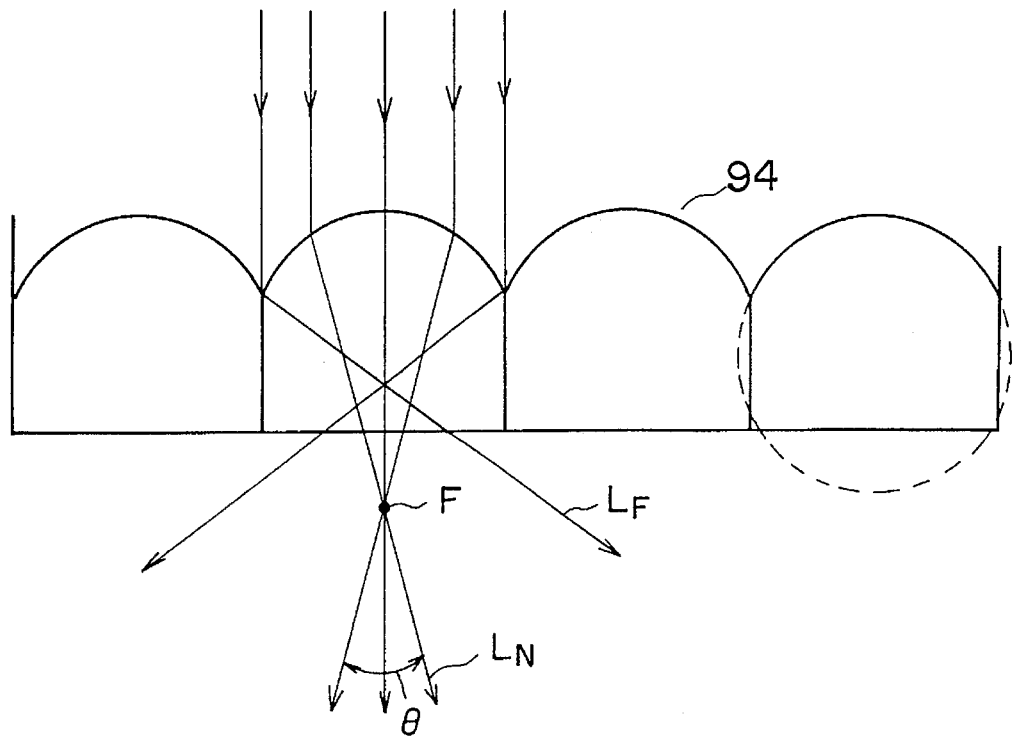
FIG. 40A is a sectional view for explaining optical paths in a lens sheet, particularly, a spherical aberration of a convex perfect cylinder lens element according to the third invention.
Figure 41A:
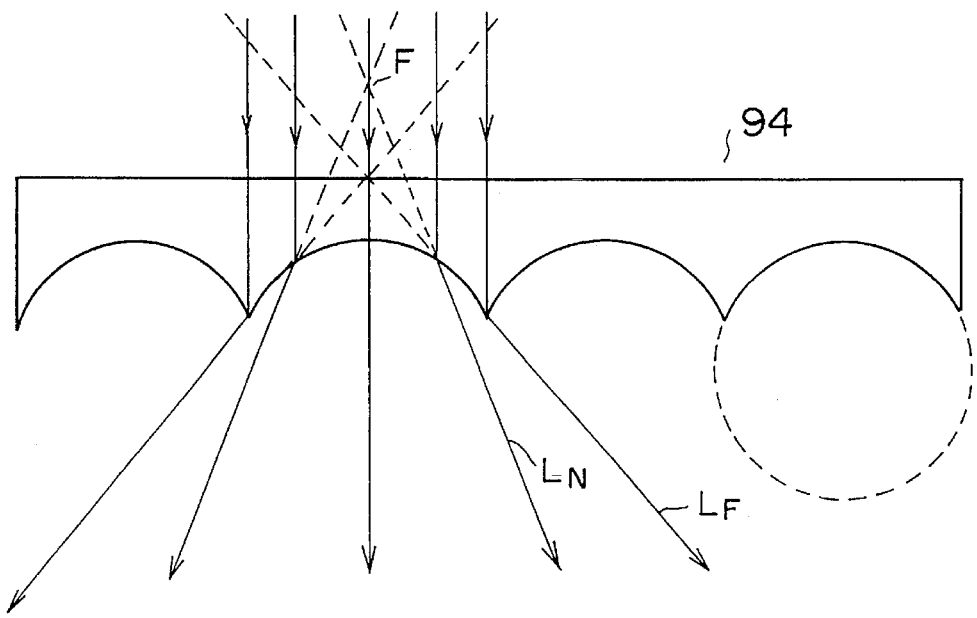
FIG. 41A is a sectional view for explaining optical paths in a lens sheet, particularly, a spherical aberration of a concave perfect cylinder lens element according to the third invention.

In other words, as shown in FIGS. 40A and 41A, when a perfect circular cylinder lenticular lens is used, even if emitted rays of light are focused in a predetermined diffusing angle range θ by using the light focusing effect of the lens, only paraxial rays LN near the center of the lens are focused at a focal point F. The other rays LF become diffused rays of light (because of spherical aberration).

The rays LF which deviate from the focal point diffuse from the predetermined diffusing angle range θ. These rays LF become light loss and noise light.

The geometrical optics condition for minimizing spherical aberration of the lenticular lens is given by the following equation.

$$n = 1/e \quad (3)$$

where n is the refractive index of the lens material; and e is the flatness of the ellipse of a section which is perpendicular to the edge line of the lenticular lens (this section is referred to as the main cross section).

The flatness e can be given by the following equation.

$$e^2 = (b^2 - a^2)/b^2 \quad (4)$$

When the length of the longer axis of the ellipse and the length of the shorter axis of the ellipse are 2b and 2a, respectively, by using the equations (1) and (2), the following relation is obtained.

$$\textit{Length of longer axis/length of shorter axis} = 2b/2a = b/a = n/(n^2-1)^{1/2} \quad (5)$$

When the lenticular lens is made of acrylic resin whose refractive index is 1.5, by applying the equation (5), the spherical aberration does not take place in the following condition.

Length of longer axis/length of shorter axis=1.34 In reality, part of rays of light are diffused and refracted by for example the light diffusing and reflecting layer 92 layered on the rear surface of the light guiding plate and the light diffusing layer 98 disposed between the light guiding plate and the lens sheet. Light energy which deviates from the predetermined diffusing angle θ is not zero, but it can be minimized.

Even if the flatness deviates from the equation (5) to some extent, while the difference is small, similar characteristics thereof can be obtained. However, the flatness largely deviates from the equation (5), the angle distribution of the intensity of light becomes a flat curve with a peak in the normal direction of the light emitting surface due to the spherical aberration. In addition, side lobes (side peaks) take place on both edges of the flat curve. Thus, in this case, the object of the present invention cannot be accomplished. Experimental results show that no side lobes take place when the flatness deviates from the equation (5) by ±20%. In this case, high light energy efficiency, sharp diffusing angle, and high intensity in normal direction can be achieved in comparison with the case that a simple light isotopic diffusing film is used.

However, in reality, the deviation of the flatness is more preferably within ±10% of the equation (5).

Figure 39B:
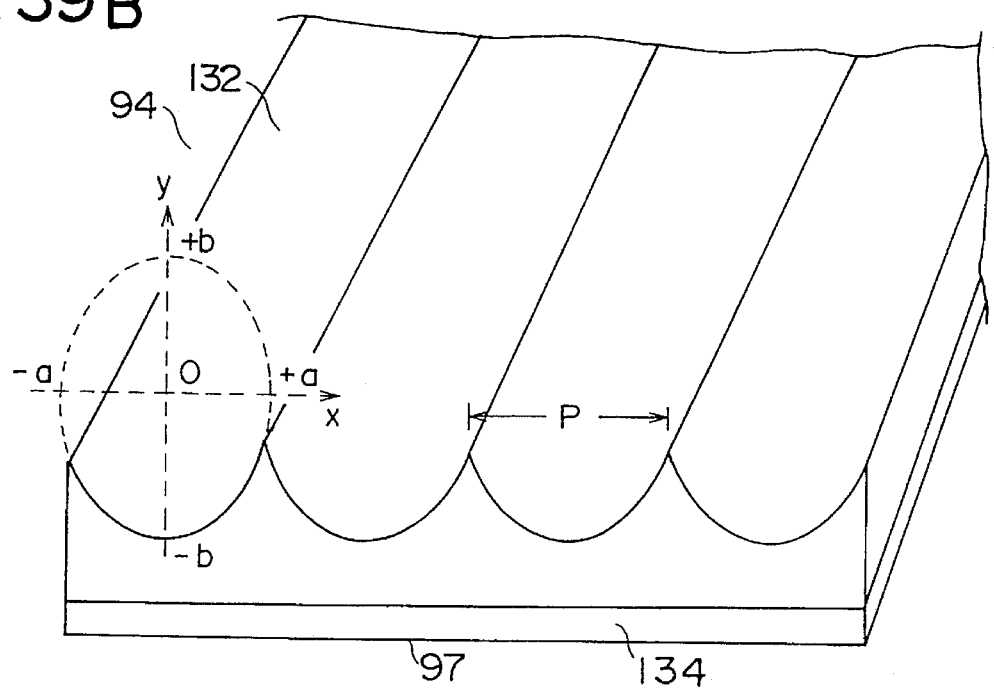
FIG. 39B is a perspective view showing an embodiment (concave elliptic cylinder lenticular lens) of the lens sheet according to the third invention.
Figure 39C:
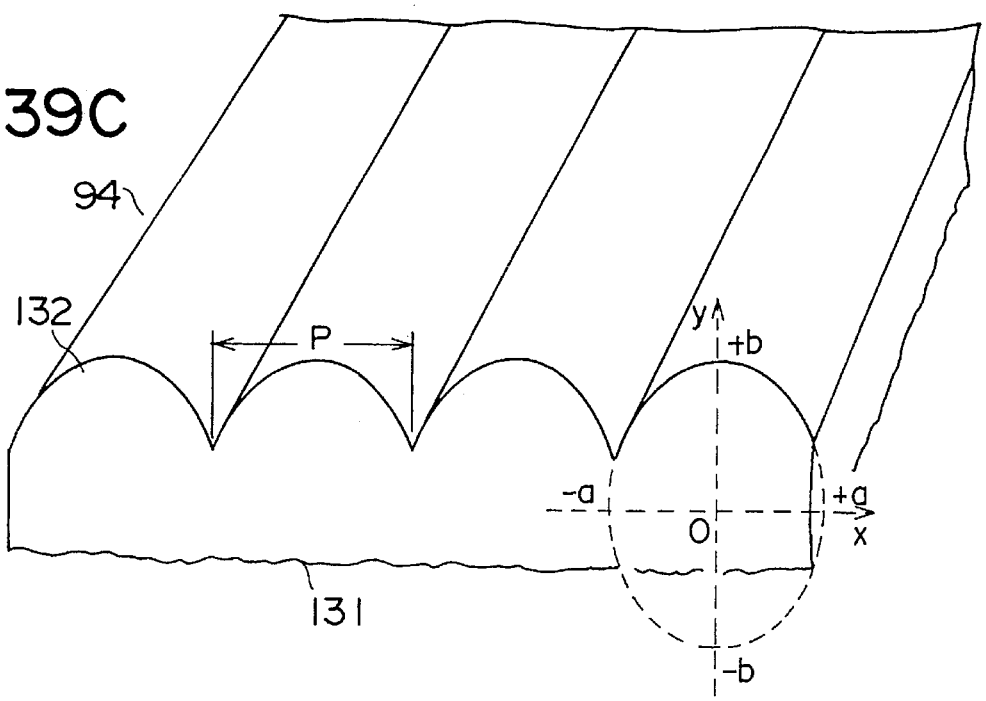
FIG. 39C is a perspective view showing an embodiment (convex elliptic cylinder lenticular lens) of the lens sheet according to the third invention.
Figure 39D:
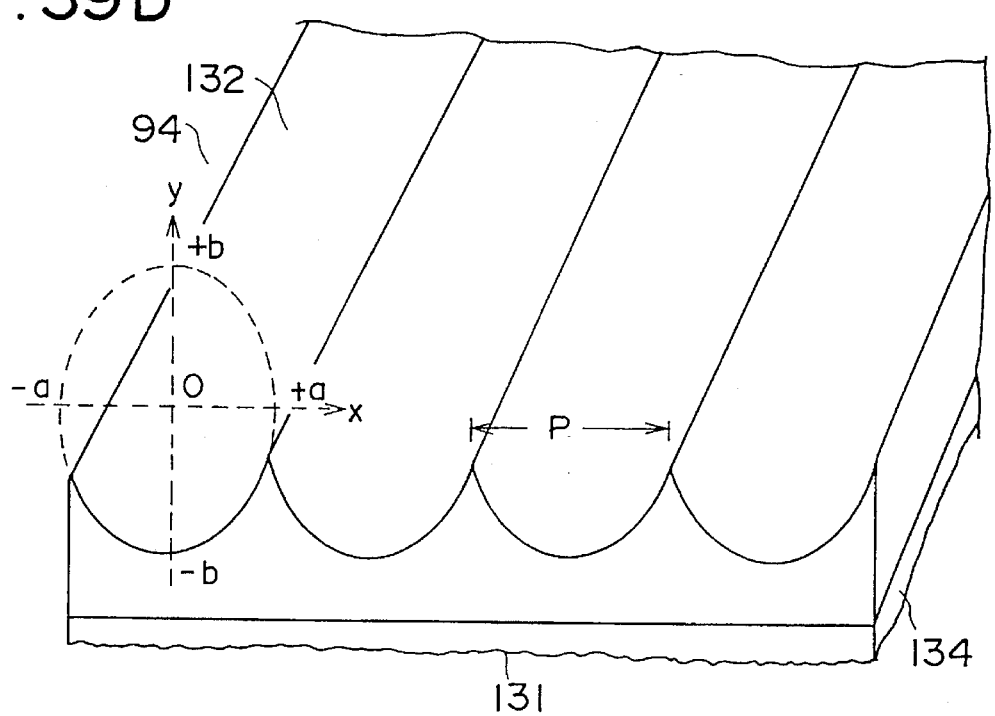
FIG. 39D is a perspective view showing an embodiment (concave elliptic cylinder lenticular lens) of the lens sheet according to the third invention.

The lens elements may be convex lenses (as shown in FIGS. 39A and 39C) or concave lenses (as shown in FIGS. 39B and 39D).

Figure 40B:
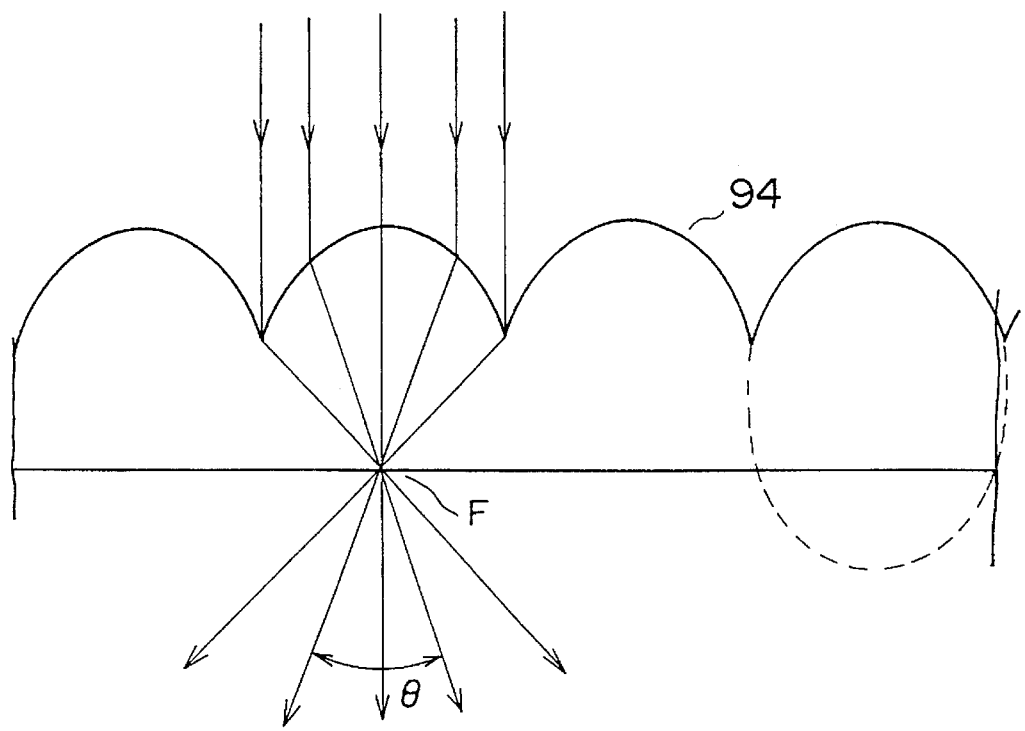
FIG. 40B is a sectional view for explaining optical paths, in a lens sheet, particularly, a spherical aberration of a convex elliptic cylinder lens element according to the third invention.
Figure 41B:
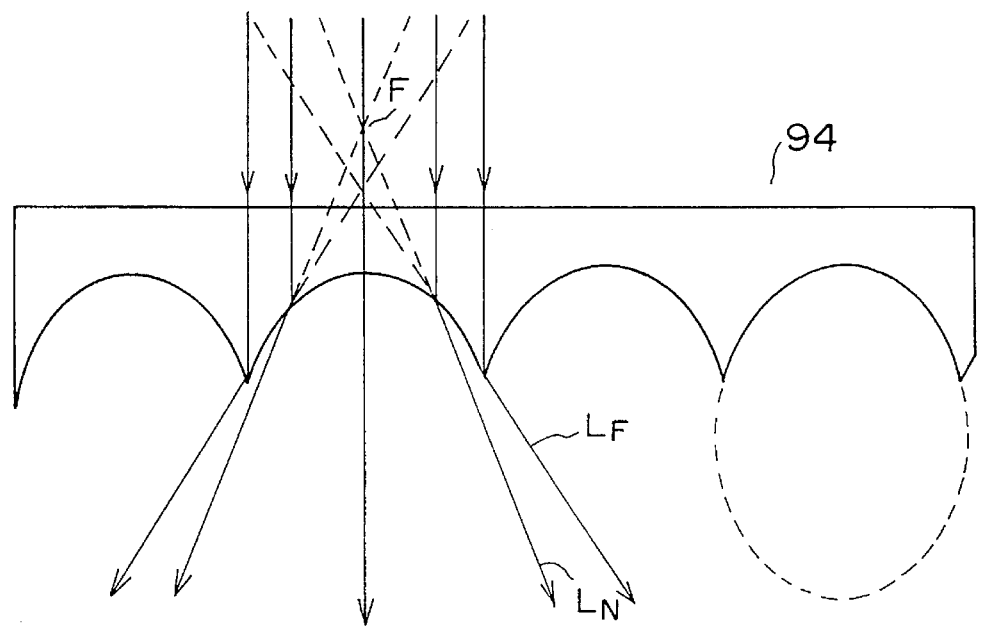
FIG. 41B is a sectional view for explaining optical paths, in a lens sheet, particularly, a spherical aberration of a concave elliptic cylinder lens element according to the third invention.

The optical paths of rays of light in the elliptic cylinder lens element are shown in FIGS. 40B and 41B. Rays of light which are entered in parallel with the optical axis are focused at the focal point F (without spherical aberration) and then diffused at a diffusing angle θ.

Assume that the spherical aberration can be ignored, that rays of light which largely deviate from the normal of the light guiding plate due to total reflection between the smooth surface 100 of the light guiding plate and the lens sheet 94 are fed back to the light guiding plate, and that rays of light which are nearly in parallel with the optical axis are entered into the lens due to diffusion and reflection of the light reflecting layer on the rear surface of the light guiding plate. In these conditions, the diffusing angle θ is given by the following equation.

$$\theta = 2 \tan^{-1}(p/2f) \quad (6)$$

where p is the pitch of the lens elements; and f is the focal distance.

As shown in FIGS. 40A, 40B, 41A and 41B, the focal points of the concave lens and convex lens differ from each other. As shown in FIG. 40B, in the case of the convex lens, a real image is formed and the focal point is present outside the lens. On the other hand, as shown in FIG. 41B, in the case of the concave lens, a virtual image is formed and the focal point is present inside the lens.

In any case, in the embodiments of the third invention, the focal distance (normally, 10 mm or less) is much shorter than the distance from the lens surface (surface of the surface light source) to the user, there is not so large a difference between the concave lens and the convex lens as the effects to the user.

In the above description, only the elliptic cylinder lenticular lens was explained. However, when the cross section of each lens element of a hyperbolic cylinder lenticular lens is given by the following equation, this lenticular lens will have the same effects as the elliptic cylinder lenticular lens has.

$$X^2/a^2 - y^2/b^2 = 1 \quad (7)$$

where b/a is the slope of the asymptotic line, and a<b. The optimum ranges of a and b of the hyperbolic cylinder lenticular lens are the same as those of the elliptic cylinder lenticular lens.

Such lenticular lens may be formed of a single lens sheet. However, to decrease light diffusing angles in X and Y directions (upper, lower, right and left directions), two lens sheets may be layered in such a way that the longer axis of the first lens sheet is perpendicular to that of the second lens sheet as shown in FIG. 42. In this case, the two lens sheets are preferably layered in such a way that the orientation of the lens surface of the first lens sheet accords with that of the second lens sheet. In this construction, the transmittance of rays of light which are emitted from the light reflecting layer 92 and which are relatively close to the normal direction most accords with the feedback ratio of rays of light which relatively largely deviate from the normal direction. However, the lens surfaces of these lens sheets may be opposed each other.

As shown in FIGS. 39A and 39C, the lens sheet may be formed integrally of a light transmitting substrate. In addition, as shown in FIGS. 39B and 39D, lens elements 132 may be formed over a light transmitting plate (or sheet) 134.

The lens sheet 94 is made of the light transmitting substrate described in the first invention. The thickness of the light transmitting substrate, the lens forming method, and the transmittance of the lens sheet are the same as those of the first invention.

A fine mat pattern 131 is preferably formed on the rear surface of the lens sheet (the opposite surface of the lens surface). The reason of forming this fine mat pattern depends on a so-called edge-light type surface light source according to the first to fourth embodiments and a so-called back-light type surface light source according to the fifth and sixth embodiments.

In the case of the edge-light type, as will be described later, the fine mat pattern is used to equalize the intensity distribution on the light emitting surface. In the case of the back-light type, the fine mat pattern is used to equalize the angle distribution of the intensity in a predetermined light diffusing angle (in this case, light diffusing effect is obtained).

The fine mat pattern 131 whose height is in the range from the wavelength of light of the light source to 100 μm is directly formed on the rear surface of an integrally formed lens sheet 94 by a heat press method (such as emboss method or sand-blasting method). In addition, the fine mat pattern 131 may be formed by depositing a transparent layer with a fine pattern on the flat rear surface of the lens sheet 94. In reality, a paint where fine transparent particles such as calcium carbonate, silica, or acrylic resin have been dispersed in a transparent binder is coated on the lens sheet 94 so as to form a fine mat pattern. Alternately, an ultraviolet-ray-setting resin solution or an electron-beam-setting resin solution is formed on a roll-shaped concave plate so that the surface of the lens sheet has a delustering fine mat pattern. This method is disclosed as the above-described Japanese Patent Laid-Open Publication No. 3-223883, U.S. Pat. No. 4,576,850, and so forth.

The fine mat pattern 131 is used so as to form a cavity 99 at least partly between the smooth surface 100 of the light guiding plate 91 and the lens sheet 94. The depth ($\Delta X$) of the cavity 99 is equal to or larger than the wavelength of the light of the light source. If the depth $\Delta$ of the cavity 99 is less than the wavelength of the light of the light source, total reflection of the light does not satisfactorily take place on the smooth surface 100 of the light guiding plate 91. On the other hand, if the depth $\Delta X$ of the cavity 99 exceeds 100 μm, the fine mat pattern becomes remarkable.

When such an object is accomplished, the fine mat pattern 131 may have any shape. However, to have both an angle distribution with equal intensity at a desired diffusing angle and an equal intensity distribution on the surface of the light source, a random mat pattern (for example, a sand pattern or pear pattern) is preferably formed over the entire rear surface of the lens sheet 94 as shown in FIGS. 39C and 39D.

In this construction, as shown in FIG. 47, rays L1, L2S, and so forth entered from the rear surface of the lens sheet 94 are isotopically diffused by the fine mat pattern 131 which serves as a light diffusing layer. In this case, an equal angle distribution can be obtained without the need to use a delustered transparent sheet. In addition, the mesh pattern is not remarkable.

In addition, as shown in FIG. 46, a light isotopic diffusing sheet 98 which is delustered transparent and has a fine mat pattern 131 whose depth is in the range from the wavelength of the light of the light source to 100 μm may be disposed between a lens sheet 94 and a smooth plane 100 of a light guiding plate. However, in this case, since rays of light are diffused from a plurality of interfaces (the smooth plane 100, the light isotopic diffusing sheet 98, and the rear surface of the lens sheet 94), the transmittance of effective energy of light which travels in the vicinity of the normal direction becomes maximum. In addition, the reflection ratio of light energy of rays which are emitted in the range from the diagonal directions to the tangent direction of the light emitting surface and which are lost from the light source becomes maximum. Thus, these reflected rays of light are used in the light reflecting layer 92 as shown in FIG. 47. Consequently, the efficiency of the light energy becomes maximum. In addition, the intensity distribution on the entire light emitting surface is most equalized.

Figure 50:
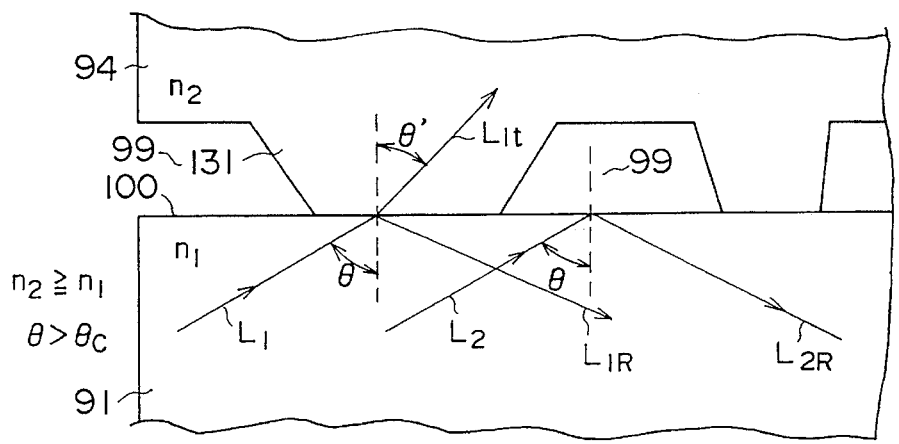
FIG. 50 is a sectional view for explaining that part of rays of light which outwardly travels from a light guiding plate is totally reflected by a lens sheet according to the third invention and that the rest of the rays of light are transmitted.

Moreover, as shown in FIG. 50, the fine mat pattern 131 may be a point-shaped pattern (such as a mesh pattern) where points are equally disposed on a plane. However, in this case, since the pattern 131 becomes remarkable, a delustering agent should be dispersed in the lens sheet 94.

The surface light source according to the third invention is shown in FIGS. 46, 47 (which are sectional views thereof), 37 and 38 (which are perspective views thereof). The surface light source comprises a light guiding plate 91, at least one linear or point light source 93, a light reflecting layer 92, and a lens sheet 94. The linear or point light source 93 is disposed adjacent to a side edge of the light guiding plate 91. The light reflecting layer 92 is disposed on the rear surface of the light guiding plate. The lens sheet 94 is disposed on the opposite surface of the light reflecting layer of the light guiding plate. Normally, the surface light source further comprises a light reflecting mirror 95, a case (not shown), and a power supply. The case accommodates the surface light source and has an opening for a light emitting surface.

The opposite surface 100 of the light reflecting layer of the light guiding plate 91 is plane. The surface roughness of the opposite surface 100 should be equal to or less than the wavelength of the light of the light source. The surface roughness is measured by ten-point-average roughness Rz according to JIS-B-0601. Normally, the light source irradiates visible light. The wavelength of the visible light is in the range from 0.4 to 0.8 μm. Thus, the surface roughness of the opposite surface 100 should be 0.4 μm or less.

The opposite surface 100 can be formed by a known method (such as a heat press method using a mirror plate, an injection molding method using a mirror mold, a casting molding method, or a precise abrading method used for optical lenses).

The material of the light guiding plate 91 may be selected from the light transmitting materials for use with the above-mentioned lens sheet. Normally, acrylic resin or polycarbonate resin is used.

The thickness of the light guiding plate is normally in the range from 1 to 10 mm.

As the light source 93, a linear light source such as a fluorescent lamp is preferable so as to have equal intensity on the entire surface. However, a point light source such as an incandescent lamp may be used. The light source 93 may be disposed adjacent to a side edge of the light guiding plate as shown in the drawing. However, the light source 93 may be disposed at least partly in a side edge of the light guiding plate 91.

To improve the intensity and equality thereof on the surface, another light source 93 may be disposed adjacent to the other side edge of the light guiding plate 91.

The light reflecting mirror 95 is formed by evaporating a metal over the inner surface of a plate having the shape of a parabola cylinder, a hyperbolic cylinder, or an elliptic cylinder.

In the case of the edge-light type surface light source, the above-mentioned lens sheet 94 is layered on a smooth plane 100 of a light guiding plate. In this case, as shown in FIGS. 46 and 47, the lens surface of the lens sheet 94 is layered on the opposite surface of the plane 100. The fine mat pattern 131 is layered on the plane 100. Thus, a cavity 99 whose depth is equal to or larger than the wavelength λ of the light of the light source is formed at least partly between the lens sheet 94 and the smooth plane 100 of the light guiding plate 91. The area ratio R of the cavity 99 is given by the following equation and determined by the equality of intensity on a given surface, the efficiency of light energy, the size of the light guiding plate, and the like.

R=(area of cavity whose depth is equal to or larger than wavelength λ/area of entire surface of light guiding plate)× 100%

Normally, the area ratio R should be 80% or more. Preferably, the ratio R should be 90% or more.

Figure 45:
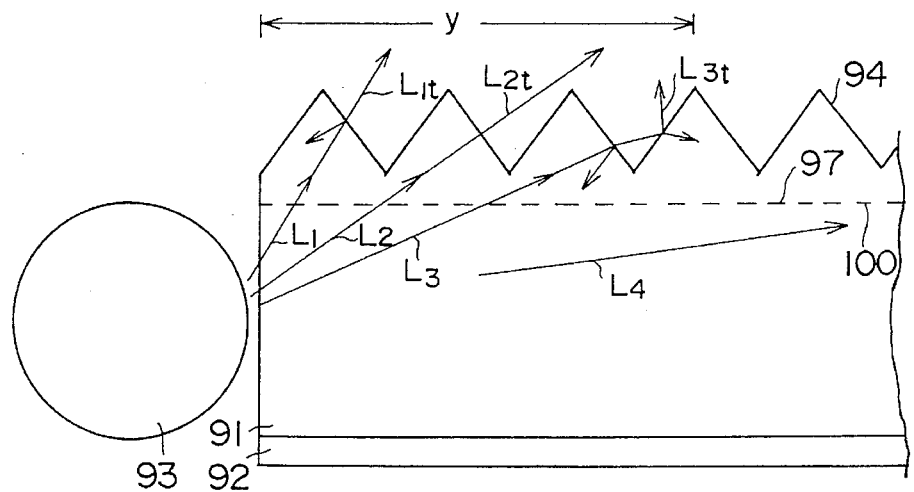
FIG. 45 is an enlarged sectional view of FIG. 44, the interface of a lens sheet and a light guiding plate being optically not present, the lens sheet and the light guiding plate being integrally formed.

As shown in FIG. 45, experimental results show that when a smooth plane 100 of a light guiding plate is brought into contact with a surface 131 of a lens sheet, most of rays of light entered from a linear light source 93 are emitted without being totally reflected at a position spaced apart from a side edge of the light source by distance y. In addition, the experimental results show that the intensity sharply decreases at a position spaced apart from the distance y.

The experimental results show that the ratio of the length y of the light source to the entire length Y of the light guiding plate in the light transmitting direction is given as follows.

(y/Y)×100=10 to 20%

Thus, to equally distribute the light energy from the light source to the entire length y of the plane 100 of the light guiding plate, 10 to 20% of incident light should be transmitted and the rest should be totally reflected. The ratio of the amount of light transmitted and the amount of light totally reflected is approximately given by the following equation.

(Amount of light transmitted/amount of light totally reflected)=
(area of cavity whose depth is equal to or more than wavelength λ/area of light guiding plate) (8)

Thus, the experimental results show that the ratio R should be larger than 80 to 90%.

As a method for forming a cavity (whose depth is equal to or larger than the wavelength of the light of the light source) between the lens sheet 94 and the light guiding plate 91, the lens sheet 94 may be layered in such a way that the orientations of the lens surface 132 and the fine mat pattern 131 is the reverse of those of the constructions shown in FIGS. 46 and 47.

In this case, light which is focused within a predetermined angle by the lens surface 132 is isotopically diffused. Thus, the diffusing angle of the light can be easily maintained in the optimum range which is from 30° to 60° measured from the normal.

The light reflecting layer 92 is a layer which diffuses and reflect rays of light. The light reflecting layer 92 can be formed in the same manner as the first invention.

Figure 37:
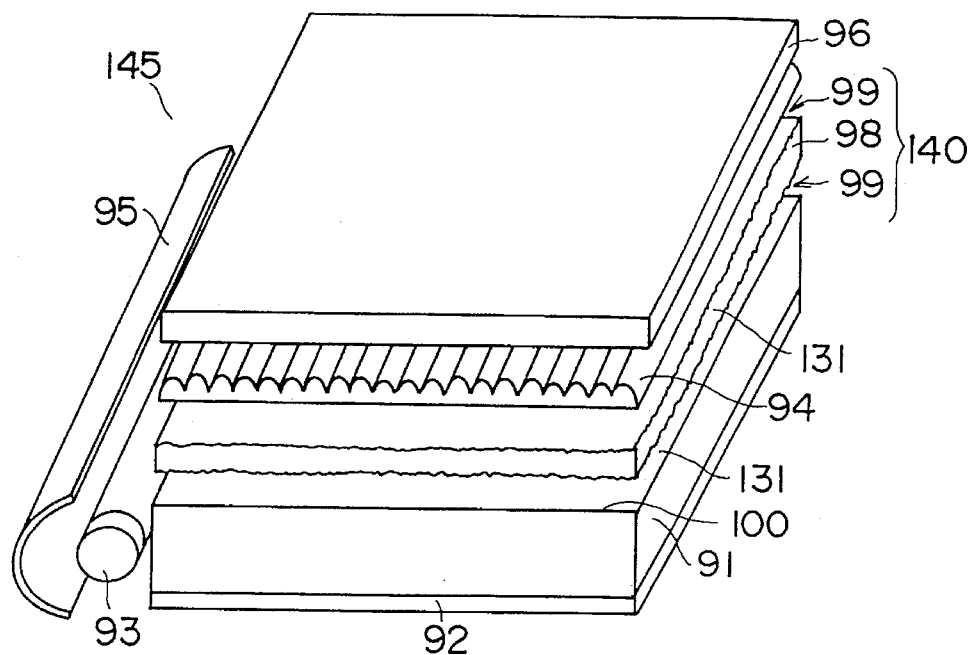
FIG. 37 is a perspective view showing an embodiment of an edge-light type surface light source and a transmission type display apparatus having the surface light source according to a third invention.
Figure 38:
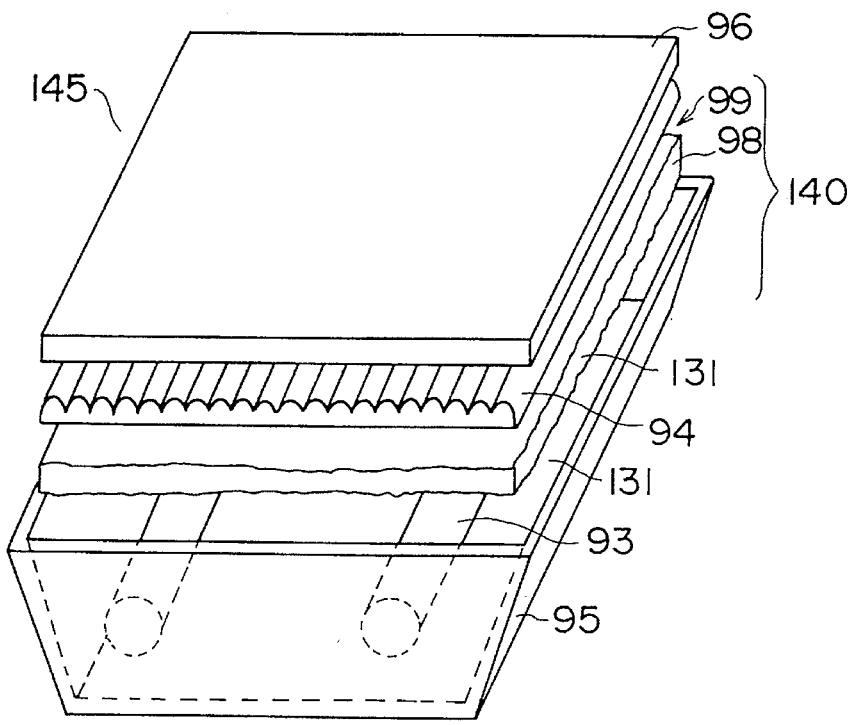
FIG. 38 is a perspective view showing an embodiment of a back-light type surface light source and a transmission type display apparatus having the surface light source according to the third invention.

FIGS. 37 and 38 shows the construction of the surface light source 140 according to the third invention. The surface light source 140 is used for a black light of a transmission type display apparatus such as a transmission type LCD apparatus. By layering a transmission type display apparatus 96 over a lens surface (lens elements 132) of a lens sheet of a surface light source according to the third invention, a display apparatus according to the third invention can be obtained.

To evaluate a distribution of light of a surface light source, a diffusing angle can be effectively used.

As a diffusing angle, for example a half-value angle $\theta_H$ may be used. The half-value angle $\theta_H$ can be given by the following equation.

$$I(\theta_H)=I(\theta)/2 \tag{9}$$

where θ is the angle measured from the normal of the light emitting surface; I is the intensity of transmitted light; and I(θ) is a decreasing function of the intensity of transmitted light.

(Operation)

As described above, the elliptic cylinder lenticular lens according to the first and fifth embodiment of the third invention does not have spherical aberration from the geometrical optics point of view. In other words, a perfect circular cylinder lens element has spherical aberration as shown in FIGS. 40A and 41A. A ray L2 of incident light apart from the optical axis is not focused at a focal point. Thus, part of rays of light deviate from the range of the diffusing angle θ and are lost.

On the other hand, as described above, the elliptic cylinder lens elements according to the third invention shown in FIGS. 40B and 41B are designed so that no spherical aberration takes place or it can be ignored. Thus, incident rays of light parallel to the optical axis are refracted by the lens sheet 94, focused on at a focal point, and then diffused. Therefore, the emitted rays of light are focused at an angle close to a desired diffusing angle θ (equation (6)) and effectively used.

The difference between the concave lens and the convex lens is whether the focal position is ahead or behind the lens. Thus, when the user is position much far from the focal distance of the lens sheet 94, the function of the concave lens substantially becomes the same as that of the convex lens.

This applies to the hyperbolic cylinder lenticular lens.

Next, a cavity 99 of an edge-light type light source will be described.

As shown in FIG. 43, as the function and mechanism of the edge-light type surface light source, when rays of light are entered from a light source 93 to a light guiding plate 91 and then directly entered into a smooth plane 100 of the light guiding plate 91, the incident angle (the angle to the normal of the plane 100) of a ray L1 entered from a portion close to the light source is small (less than a critical angle). Thus, part of incident rays of light are emitted as transmitted light L1T. Thus, rays of light are emitted in the vicinity of the light source. On the other hand, since the incident angle of a ray L2 emitted from a portion relatively spaced apart from the light source is large (which is larger than the critical angle), the ray is not emitted to the outside. Thus, the ray L2 is further transmitted as a totally reflected ray L2R to a light diffusing and reflecting layer 92 on the rear surface of the light guiding plate. The light diffusing and reflecting layer 92 diffuses the ray L2R into rays L2S and reflects them. Part of the rays L2S are entered into the plane 100. Part of the rays L2S are emitted. Thus, rays of light are emitted at positions spaced apart from the light source.

In FIGS. 44 and 45, the lens sheet 94 is layered over the light guiding plate 91 in such a way that the non-lens surface of the lens sheet 94 is in contact with the smooth plane 100 of the light guiding plate 91. The refractive indexes of light transmitting materials which are normally used for the lens sheet 94 and the light guiding plate 91 are around 1.5. Thus, as shown in FIG. 45, the lens sheet 94 and the light guiding plate 91 become an integral member. Consequently, since the surface of the lens elements 132 of the lens sheet 94 has an angle to the smooth plane 100, most of rays of light (for example, L1, L2, and L3) are entered into the light guiding plate in the vicinity of the light source with angles less than the critical angle. Part of the rays are directly emitted. Most of the reflected rays of light are returned back to the light source direction, not further transmitted. Although rays (such as L4 of FIG. 45) which are entered into a lens surface which is spaced apart from the light source, these rays are smaller than those of the construction shown in FIG. 43.

Thus, as described above, most rays irradiated from the light source are focused to a portion which is 10 to 20% of the entire area of the light guiding plate.

On the other hand, according to the third invention, as shown in FIGS. 46 and 47, a fine mat pattern 131 is formed on a non-lens surface of a lens sheet 94. Thus, a cavity 99 is formed at least partly between a smooth plane 100 of a light guiding plate and the lens sheet 94.

In the cavity 99, the light guiding plate 91 with a refractive index of around 1.5 is in contact with an air layer (or a vacuum layer) with a refractive index of around 1.0 through the plane 100 as an interface. Thus, as with the construction shown in FIG. 43, total reflection takes place on the plane 100. Consequently, in a region close to the light source, a ray L1T which is entered into the plane 100 with an angle less than the critical angle is emitted. On the other hand, in a region spaced apart from the light source, a ray L2T is totally reflected on the interface of the cavity 99 and then diffused and reflected on the rear surface of the light diffusing and reflecting layer 92. Thus, the ray L2T with an angle less than the critical angle is emitted.

A ray which is entered into a region where the fine mat pattern 131 is in contact with the smooth plane 100 is not totally reflected, but directly transmitted as an emitted ray. When the area ratio R of the cavity is larger than 80 to 90%, the intensity distribution becomes almost equal on the entire surface.

Since the depth of the fine mat pattern 131 is equal to or more than the wavelength of the light of the light source, rays of light are totally reflected.

Figure 48:
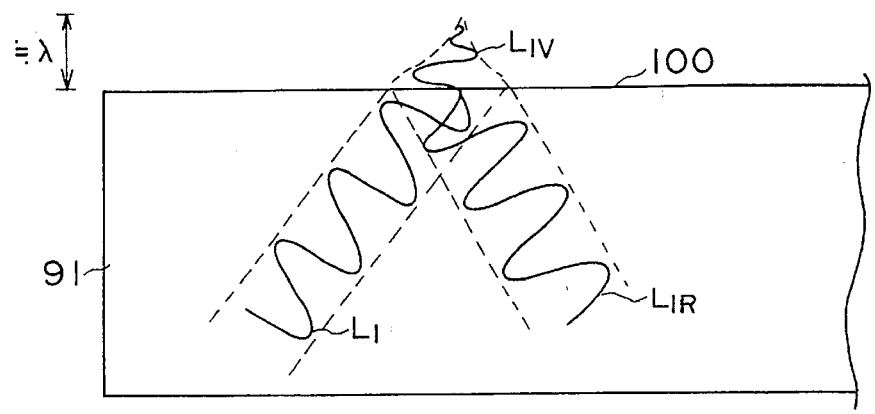
FIG. 48 is a sectional view showing an optical path of a ray of light totally reflected on a smooth plane of the front surface of a light guiding plate, an electromagnetic field partly leaking out from the light guiding plate due to tunnel effect.

As shown in FIG. 48, when a ray L1 which is entered into the smooth plane 100 of the light guiding plane 100 is totally reflected and becomes a reflected ray L1R, strictly speaking, an electromagnetic field of the ray is partly present. In other words, an electromagnetic field L1V which is transmitted from the interface 100 is present due to tunnel effect. However, the intensity of the electromagnetic field L1V exponentially attenuates. The wavelength of L1V is on the order of that of light. In addition, the amplitude of L1V is 0.

Thus, when the cavity 99 has a depth much larger than the wavelength of the light, the ray L1 is not substantially entered into the cavity 99.

Figure 49:
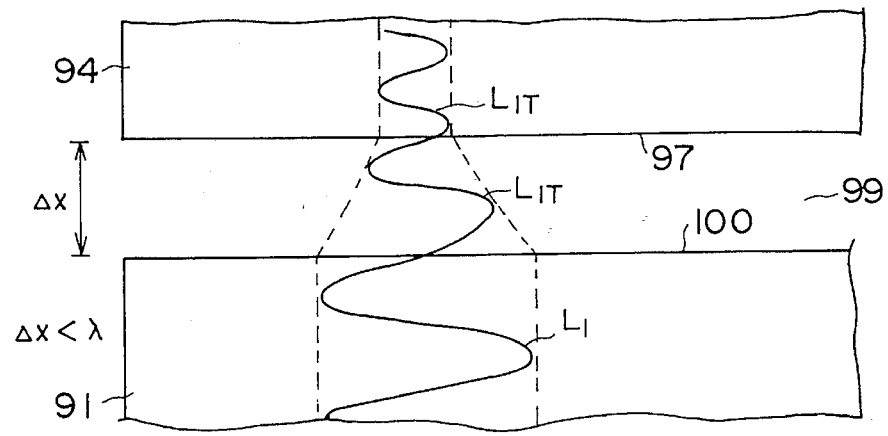
FIG. 49 is a sectional view for explaining that a ray of light which has leaked out from a light guiding plate due to tunnel effect becomes a traveling wave in a lens sheet.

However, as shown in FIG. 49, when the lens sheet 94 with nearly the same refractive index as the light guiding plate 91 is spaced apart from the plane 100 of the light guiding plate by the depth $\Delta X$ which is less than the wavelength of the light (namely, $\Delta X<\lambda$), the electromagnetic field L1V which is entered into the lens sheet 94 does not completely attenuate, but becomes a traveling wave L1T. Thus, a transmitted ray L1T takes place.

In the third invention, since the fine mat pattern 131 is formed on the rear surface of the lens sheet 94, regions with or without a cavity 99 are formed between the light guiding plate 91 and the lens sheet 94 as shown in FIG. 50. Thus, in the regions without the cavity 99, the light guiding plate 91 and the lens sheet 94 can be optically treated as an integral member. (In the regions with the cavity 99, the depth thereof is less than the wavelength of the light.)

In the cavity regions, the incident rays are totally reflected. In the non-cavity regions, the incident rays are transmitted. The amount of light totally reflected on the plane 100 depends on the area ratio of the cavity regions to the entire area of the light guiding plate.

(Effect of the third invention)

Since the surface light source according to the first, second, fifth, and sixth embodiments of the third invention does not have spherical aberration, most of the rays of light which are emitted from the light guiding plate are focused in a predetermined diffusing angle distribution. Thus, the energy of rays of light which scatter from diagonal directions to tangent direction can be used as illumination light without loss. Thus, the efficiency of light energy is high. The intensity of light emitted from the surface light source is high. In addition, noise light is not emitted from the side edges of the surface light source.

Since the surface light source according to the third and fourth embodiments of the third invention has a fine mat pattern on the rear surface (opposite surface of the lens surface) of the lens sheet 94, a cavity whose depth is equal to or larger than the wavelength of the light of the light source can be securely formed between the light guiding plate and the lens sheet.

Thus, the lens sheet does not prevent rays irradiated from the light source from being totally reflected on the front surface of the light guiding plate, thereby equalizing the intensity distribution on the light emitting surface.

Since the display apparatus according to the seventh embodiment of the third invention has the surface light source according to the first to sixth embodiments, the efficiency of energy such as electric power is high. In addition, the intensity of light emitted from the display apparatus is high. Moreover, the display apparatus has a proper view angle. Furthermore, the display apparatus emits rays of light with equal intensity on the entire front surface thereof.

(First example)
(Process for forming lens)

Figure 51:
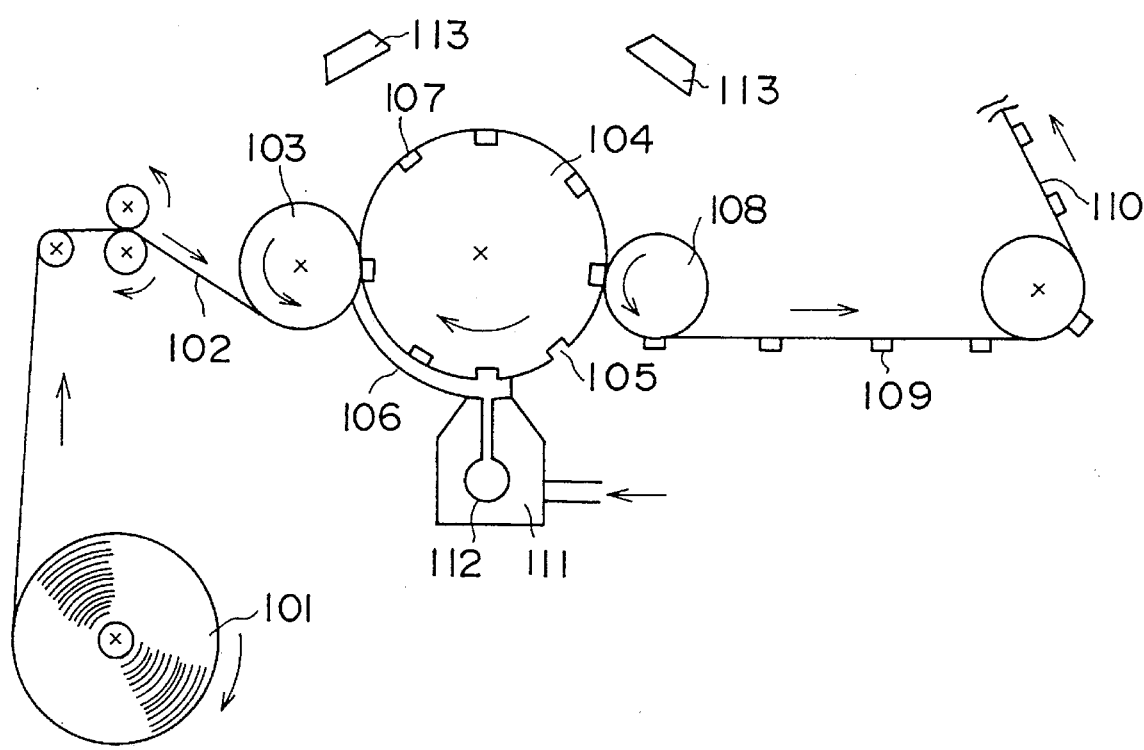
FIG. 51 is a sectional view showing a first embodiment of a fabrication method according to the third embodiment.

With an apparatus as shown in FIG. 51, a lens was fabricated according to the following steps.

(1) A substrate film roll 101 of 100 μm thick uncolored transparent biaxially-drawn polyethylene terephthalate was prepared.

(2) A roll-shaped concave plate 104 made of a metal cylinder with an invert mold pattern (same shape and reverse pattern) in the shape of an elliptic cylinder lenticular lens was prepared. While this concave plate 104 was being rotated about the center axis thereof, an ultraviolet-ray-setting resin solution 106 was supplied from a T die type nozzle 111 to the plate surface so as to fill the invert plate surface of the lens with the resin solution 106.

(3) The substrate film 102 was supplied at the same speed as the rotating peripheral speed of the roll-shaped concave plate 104 and the substrate film was layered over the roll-shaped concave plate through the resin solution. In this state, ultraviolet rays were irradiated from mercury vapor lamps 113 to the substrate film so as to cross harden the resin solution in the invert mold and adhere it to the substrate film.

(4) The substrate film which was being supplied was peeled off along with the hardened resin formed in the lens shape by using a peeling roll 108.

(5) Thus, an elliptic cylinder lenticular lens was obtained.

Lens shape: See FIG. 39A.
  Shape of lens elements: convex elliptic cylinder (The longer axis of the lens elements accords with the normal direction of the light emitting surface.)
  Length of longer axis $2b$=204 μm
  Length of shorter axis $2a$=150 μm
  Length of longer axis/length of shorter axis=$2b/2a$=1.36
  Pitch of lens elements p=130 μm
Ultraviolet-ray-setting resin solution:
  Major components are are follows:
  Multi-functional polyester acrylate oligomer
  Light reaction starting agent (Process for forming delustering layer with fine mat pattern)

(1) A roll-shaped concave plate made of a metal cylinder with an invert mold of a fine mat pattern was prepared. The invert mold was formed by sand-blasting method.

(2) A substrate film of 50 μm thick transparent biaxially-drawn polyethylene terephthalate was supplied from a roll. Then, with the substrate film and the same apparatus and resin solution which were used in the lens forming process, a delustered transparent fine mat pattern made of an ultraviolet-ray-setting resin was formed on the rear surface of the lens sheet.

(3) Thus, a light diffusing layer according to the third invention was obtained.

Fine mat pattern
  Haze value=88.8
  Surface glossiness (JIS-Z-8741)=11.1
  Surface roughness (JIS-B-0601, ten-point-average roughness) Rz=38.4 μm
  Surface roughness (JIS-B-0601, center-line-average roughness) Rz=7.3 μm (Second example)

The elliptic cylinder lens sheet fabricated in the first embodiment was layered over a light guiding plate through the light diffusing layer fabricated in the embodiment 1. Thus, an edge-light type surface light source 140 shown in FIG. 37 was obtained.

Light guiding plate
  Material: Polymethyl-methacrylate polymer resin
  Shape: Rectangular parallelpiped, 4 mm thick
  Front surface: On the entire surface, ten-point-average surface roughness Rz=0.1 μm or less
  Rear surface: A delustering transparent ink was printed on the rear surface of the light guiding plate in a mesh pattern. A mirror-face reflective film where aluminum had been vacuum-deposited on a polyethylene terephthalate film was layered over the rear surface of the light guiding plate.
    The mesh pattern was formed by dispersing silica powder in an acrylic resin by silk screen printing method.
    The pitch of the mesh pattern was 5 mm both in horizontal and vertical directions.
    The diameter of points of the mesh pattern was 0.1 mm at a position close to the light source. The sizes of the points increase in proportion to the distance from the light source. The size of the point at the edge portion on the opposite side of the light source was 2 mm.

Light source
  As a linear light source, a white fluorescent lamp was disposed at one side edge of the light guiding plate. A metallic reflecting mirror was disposed on the other side edge of the light guiding plate.

Figure 52:
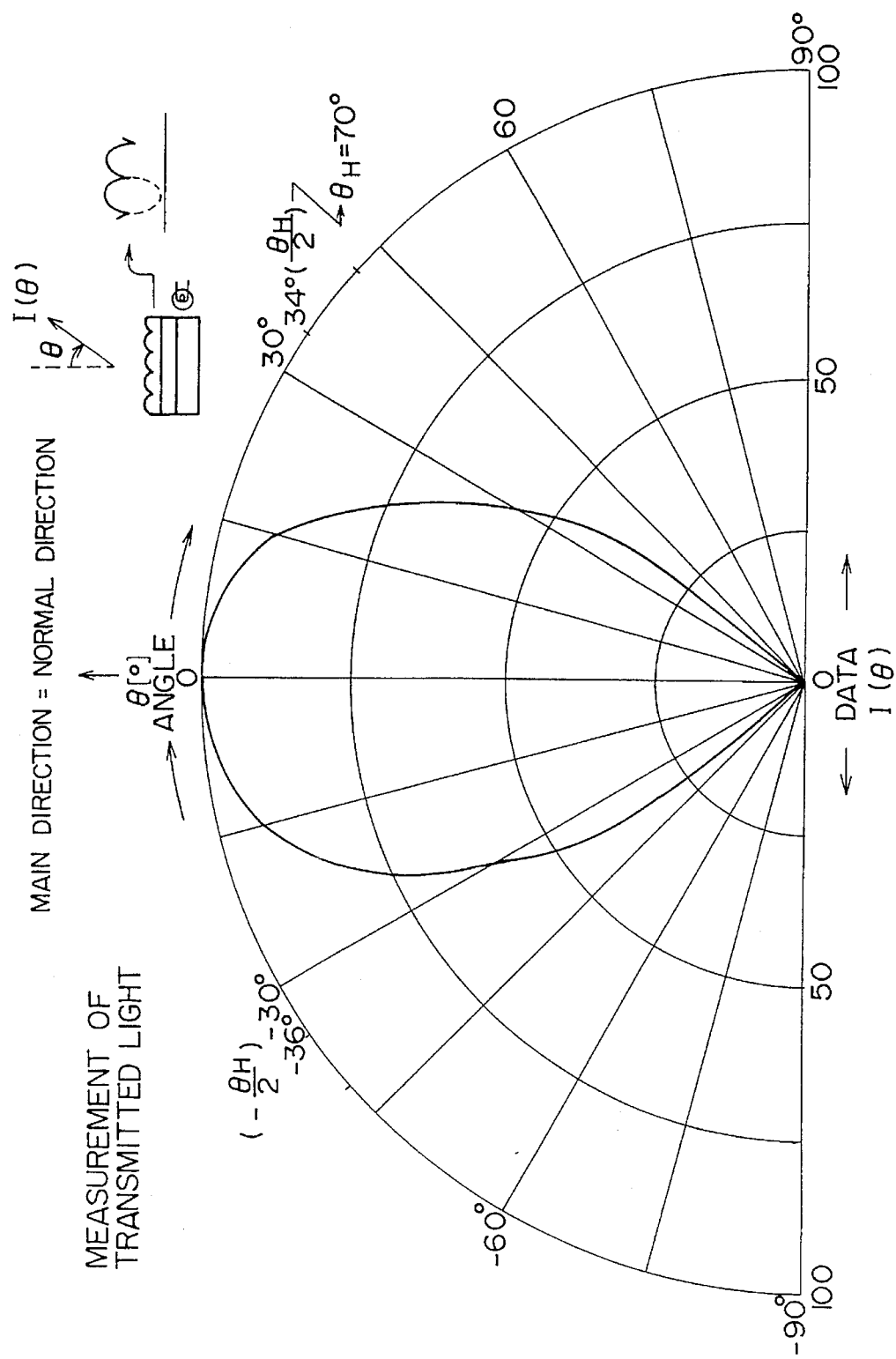
FIG. 52 is a graph showing the characteristics of a second embodiment of the edge-light type surface light source according to the third invention, the graph illustrating an angle distribution of the intensity of emitted light of a convex elliptic cylinder lenticular lens whose longer axis accords with a normal direction thereof.

The characteristics of the light source in this construction were as follows:
  Angle distribution of intensity of light: See FIG. 52
  Half-value angle=36°
  Intensity in normal direction (at the center portion of the light guiding plate)=2028 cd/m$^2$
  No side lobes (First comparison example)

The following triangular cylinder prism shaped lenticular lens was used instead of the lens sheet convex elliptic cylinder lenticular lens used in the second embodiment.

Shape of cross section: Rectangular equilateral triangle. The vertical angle (right angle) was oriented in the normal direction of the surface light source.

Pitch of lens elements (length of one side)=100 μm

The material, the layer construction, and the fabrication method of the first comparison example were the same as those of the convex elliptic cylinder lenticular lens of the first embodiment.

The characteristics of the lenticular lens according to the first comparison example were as follows:
  Angle distribution of intensity: See FIG. 53
  Half-value angle=34°
  Intensity in normal direction (at the center portion of the light guiding plate)=2074 cd/m$^2$
  Intensity distribution in normal direction of light emitting surface: ±15% or less. Almost equally viewed.
  Side lobes: Presence (peaks with angles of ±75° measured from the normal)
  Intensity of peaks of side lobes/intensity in normal direction=26%

(Second comparison example)

The same as the second embodiment except that the light diffusing layer which was fabricated in the first embodiment was used. In other words, two light diffusing layers were layered.

Figure 54:
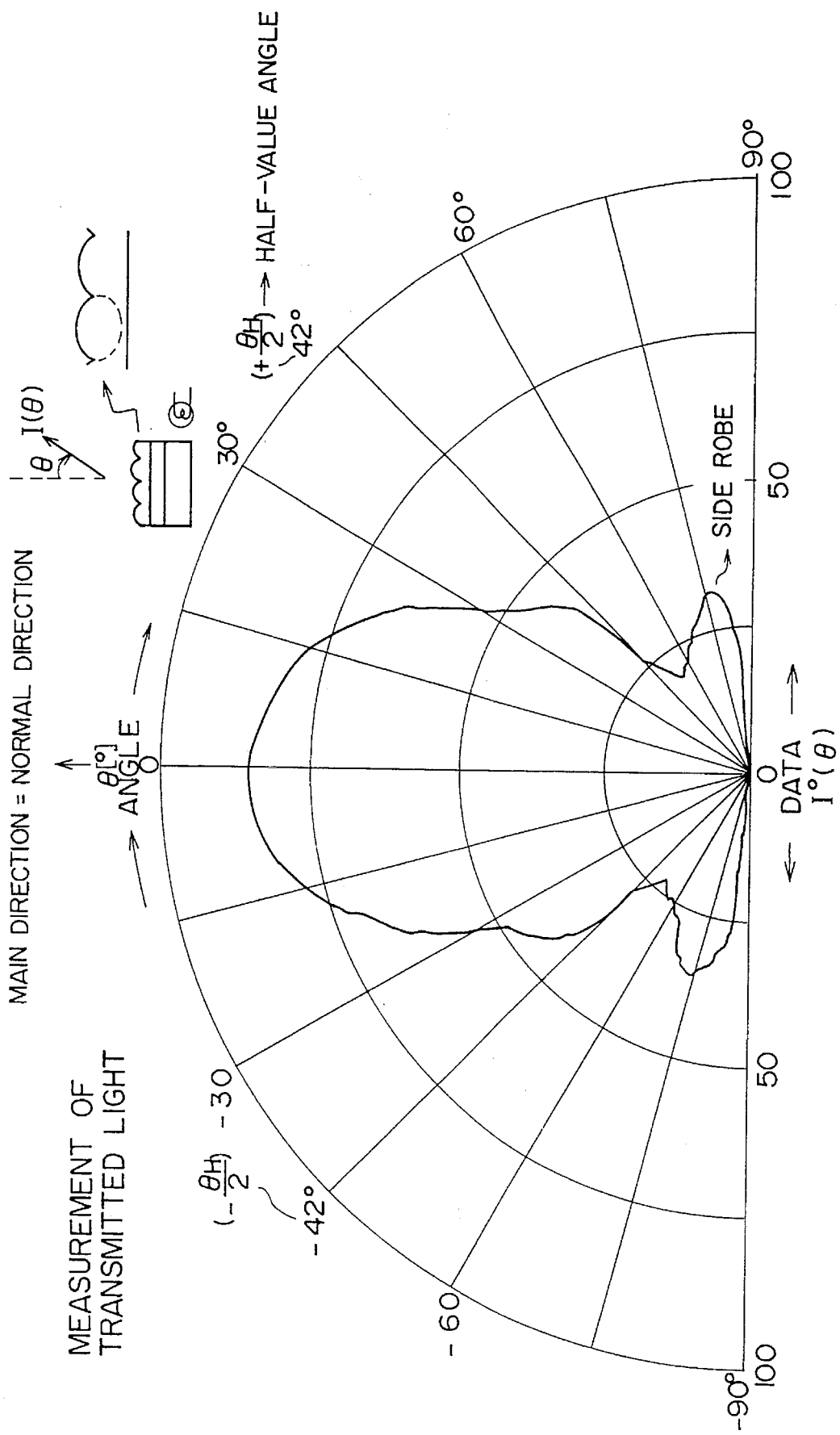
FIG. 54 is a graph showing the characteristics of an edge-light type surface light source according to a second comparison example, the graph illustrating an angle distribution of the intensity of emitted light of a convex elliptic cylinder lenticular lens whose shorter axis accords with a normal direction thereof.

The characteristics of the surface light source in this construction were as follows:
  Angle distribution of intensity of light: See FIG. 54
  Half-value angle=38° (However, outside the half-value angle, the intensity of light did not sharply attenuate, but light was emitted to some extent.)
  Intensity in normal direction (at the center portion of the light guiding plate)=1491 cd/m$^2$
  Distribution of intensity in normal direction on light emitting surface: ±15% or less. Almost equally viewed.
  No side lobes (Third comparison example)

The same as the second embodiment except that the following convex elliptic cylinder lenticular lens was used.

Shape of lens elements: Convex elliptic cylinder (The shorter axis of the lens sheet is oriented to the normal direction.)

Length of longer axis $2b=150$ μm

Length of shorter axis $2a=204$ μm

Length of longer axis/length of shorter axis$=2b/2a=0.74$

Pitch of lens elements$=177$ μm

Figure 55:
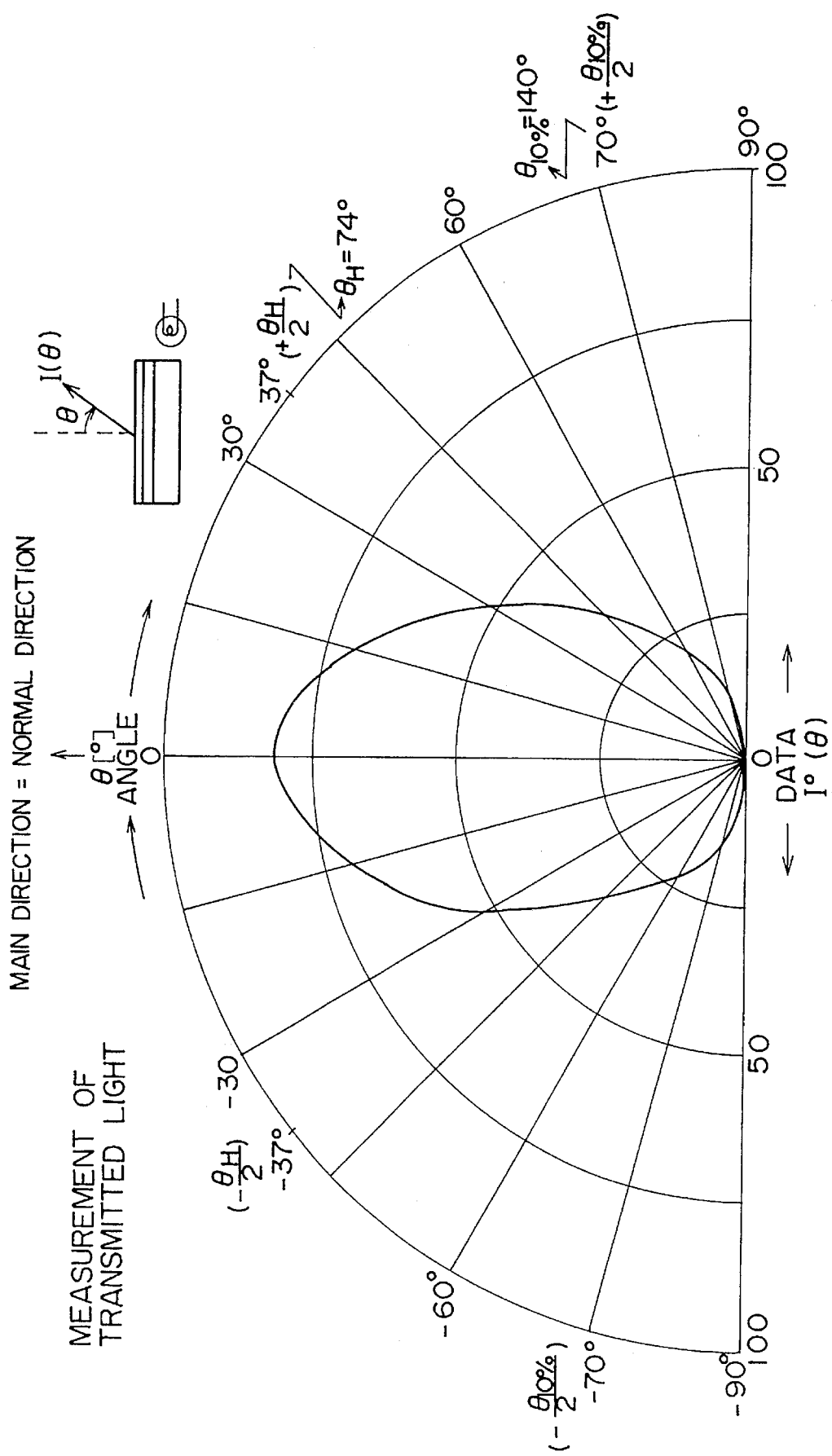
FIG. 55 is a graph showing the characteristics of an edge-light type surface light source according to a third comparison example, the graph illustrating an angle distribution of the intensity of emitted light of the surface light source, the surface light source having two light diffusing layers (films) layered over a light guiding plate.

The characteristics of the surface light source in this construction were as follows:

Angle distribution of intensity: See FIG. 55

Half-value angle$=42°$

Intensity in normal direction (at the center portion of the light guiding plate)$=1738$ cd/m$^2$ Intensity distribution in normal direction of light emitting surface: $\pm 1\%$ or less. Almost equally viewed.

Side lobes: Presence (peaks with angles of $\pm 75°$ measured from the normal)

Intensity of peaks of side lobes/intensity in normal direction$=37\%$ (Fourth comparison example)

The same as the second embodiment except that the lens sheet did not have a delustered layer. Thus, the rear surface of the lens sheet was the front surface of the substrate film. The ten-point-average surface roughness Rz of the front surface of the substrate film was 0.1 μm or less.

As the characteristics of the surface light source in this construction, the intensity of light in the vicinity of a side edge of the light emitting surface on the light source side was high. However, the intensity sharply decreased in proportion to the distance from the light source. At a position spaced apart from the light source by 2 cm, the intensity attenuated such that the light felt dark.

Next, the fourth invention will be described.

(Construction)

A surface light source according to the first embodiment of the fourth invention comprises a light guiding member, at least one linear or point light source, a light reflecting layer, and a concave or convex lenticular lens sheet. The light guiding member is formed of a light transmitting plate or a rectangular parallelpiped cavity. The linear or point light source is disposed adjacent to at least one side edge of the light guiding member. The light reflecting layer is disposed on the rear surface of the light guiding member. The lenticular lens sheet is layered on the light emitting surface (the front surface) of the light guiding member.

The lenticular lens sheet is formed of a large number of elliptic cylinder lens elements defined in such a way that their edges are aligned in parallel with each other. The longer axis direction of the elliptic cylinder lens elements accords with the normal direction of the light emitting surface. In addition, there are following relations.

$$1.40 \leq \textit{refractive index} \leq 1.60$$

$$1.20 \leq \textit{length of longer axis/length of shorter axis} \leq 2.00$$

Moreover, the relation between the cutting depth (the length along the longer axis of the elliptic cylinder lens elements) and the refractive index thereof is satisfied.

$$0.10 \leq \textit{cutting depth/length of longer axis} \leq 0.50$$

In addition, the surface light source according to the second embodiment of the fourth invention is formed by disposing a light diffusing sheet between the opposite surface of the lens surface of the lenticular lens sheet and the light guiding member.

Moreover, the surface light source according to the third embodiment of the fourth invention has a random fine mat pattern at least on one surface of the light diffusing sheet. The surface roughness of the fine mat pattern is in the range from the wavelength of the light of the light source to 100 μm. The surface roughness of the front surface of the light guiding plate is equal to or less than the wavelength of the light of the light source.

Furthermore, the display apparatus according to the fourth embodiment of the fourth invention comprises the above-mentioned light source and a transmission type display device layered on a light emitting surface of the surface light source.

The surface light source and the display apparatus having the surface light source according to the fourth invention is shown in FIG. 37 (which is a perspective views thereof). The surface light source comprises a light guiding plate 91, at least one linear or point light source 93, a light reflecting layer 92, and a lens sheet 94. The linear or point light source 93 is disposed adjacent to a side edge of the light guiding plate 91. The light reflecting layer 92 is disposed on the rear surface of the light guiding plate. The lens sheet 94 is disposed on the opposite surface of the light reflecting layer of the light guiding plate. Normally, the surface light source further comprises a light reflecting mirror 95, a case (not shown), and a power supply. The case accommodates the surface light source and has an opening for a light emitting surface.

The opposite surface 100 of the light reflecting layer of the light guiding plate 91 is plane. The surface roughness of the opposite surface 100 should be equal to or less than the wavelength of the light of the light source. The surface roughness is measured by ten-point-average roughness Rz according to JIS-B-0601. Normally, the light source irradiates visible light. The wavelength of the visible light is in the range from 0.4 to 0.8 μm. Thus, the surface roughness of the opposite surface 100 should be 0.4 μm or less.

The method for forming the plane 100 with such a surface roughness is the same as that of the third invention.

The lenticular lens 94 according to the fourth invention is a elliptic cylinder lenticular lens.

As shown in FIG. 39A, the elliptic cylinder lenticular lens is formed of elliptic cylinder lens elements 132 defined in such a way that their edges are aligned in parallel with each other. The longer axis direction of the elliptic cylinder lens elements accords with the normal direction of the lens sheet 94.

The flatness of the ellipsis is given by the following equation.

$$x^2/a^2 + y^2/b^2 = 1 \tag{1}$$

where a is the length of the shorter axis; and b is the length of the longer axis.

When an acrylic resin with a refractive index of 1.5 is used, the ratio of the length of longer axis and the length of shorter axis and the cutting depth ratio are preferably given as follows.

$$b/a = 1.85$$

$$D/d = 0.35 \tag{10}$$

where b/a is the ratio of the length of longer axis to the length of shorter axis; D is the cutting depth; and D/d is the cutting depth ratio.

Experimental results show that with such an ellipse, [1] side lobes are reduced, [2] a diffusing angle becomes sharp, [3] high intensity in normal direction on light emitting surface becomes strong.

Even if the flatness deviates from the equation (10) to some extent, while the difference is small, similar characteristics thereof can be obtained. Experimental results show that the the conditions of the equation (11) are satisfied, high light energy efficiency, sharp diffusing angle, and high intensity in normal direction can be achieved in comparison with the case that a simple light isotopic diffusing film 98 is used.

$$1.20 \leq b/a \leq 2.00$$

$$0.10 \leq D/b \leq 0.50$$

$$1.40 \leq n \leq 1.60 \text{ (where n is refractive index)} \quad (11)$$

These lens elements are preferably convex lenses shown in FIG. 39A. However, these lens elements apply to concave lenses shown in FIG. 39B.

Next, the meaning and limitation of the optimum range of such values will be described.

(1) The ratio b/a is determined by considering the following points.

(i) As shown in FIGS. 40A and 40B, when the shape of the main cross section of rays of light which are entered into the lens elements and which are in parallel with the longer axis b is an ellipse where the light incident direction accords with the longer axis direction, spherical aberration can be suppressed.

In other words, as shown in FIGS. 40A and 41A, when a perfect circular cylinder lenticular lens is used, even if emitted rays of light are focused in a predetermined diffusing angle range θ by using the light focusing effect of the lens, only paraxial rays LN near the center of the lens are focused at a focal point F. The other rays LF become diffused rays of light (because of spherical aberration).

The rays LF which deviate from the focal point diffuses from the predetermined diffusing angle range θ. These rays LF become light loss and noise light.

The geometrical optics condition for minimizing spherical aberration of the lenticular lens is given by the following equation.

$$n = 1/e \quad (12)$$

where n is the refractive index of the lens material; and e is the flatness of the ellipse of a section which is perpendicular to the edge line of the lenticular lens (this section is referred to as the main cross section).

The flatness e can be given by the following equation.

$$e^2 = (b^2 - a^2)/b^2 \quad (13)$$

When the length of the longer axis of the ellipse and the length of the shorter axis of the ellipse are 2b and 2a, respectively, by using the equations (1) and (14), the optimum condition where no peripheral aberration takes place can be given by the following equation.

$$\text{Length of longer axis/length of shorter axis} = 2b/2a = b/a = n/(n^2-1)^{1/2} \quad (14)$$

When the lenticular lens is made of acrylic resin whose refractive index is 1.5, by applying the equation (14), the spherical aberration does not take place in the following condition.

Length of longer axis/length of shorter axis=1.34 In reality, part of rays of light are diffused and refracted by for example the light diffusing and reflecting layer 2 layered on the rear surface of the light guiding plate and the light diffusing layer 8 disposed between the light guiding plate and the lens sheet. Light energy which deviates from the predetermined diffusing angle θ is not zero, but it can be minimized.

In reality, even if the ellipse of the lens elements slightly deviates from the above-mentioned optimum conditions, the focusing characteristics of the light do not remarkably degrade. The permissible range will be determined so that the following conditions (ii) and (iii) are satisfied.

(ii) The focal distance f of a convex lens (or concave lens) is almost proportional to the radius of curvature of the lens surface. Thus, as given from the equation (15), as the ratio of the length of longer axis (b) to the length of shorter axis (a) increases, the radius of curvature (in particular, at the center portion of the lens) decreases. Thus, the diffusing angle θ (field angle) can be increased (when the refractive index and pitch of the lens elements are constant). When the lens sheet is used for a back light of a liquid crystal display device, the diffusing angle is designed to be in the range from 30° to 60°.

Thus, the ratios of b/a and D/b should be selected so that the above-mentioned conditions are satisfied.

(iii) However, when a lens sheet is fabricated, regardless of the fabrication method (such as cutting method, pressing method, or molding method), if the ratios of b/a and D/b are too large, the material is difficult to machine. Thus, in consideration of the forming characteristics of the lens sheet, the upper limit of b/a should be around 2.0. As will be described later, the upper limit of D/b should be around 1.0 or less. More preferably, the upper limit of D/b should be equal to or less than 0.5.

(2) Next, the cutting depth ratio D/b will be considered.

(i) For rays of light which are diagonally entered into the lens sheet from the light guiding plate, the distribution between the amount of rays of light which are transmitted as emitted light and the amount of rays of light which are totally reflected on the light guiding plate side and fed back and used in a difference portion should be optimized.

Experimental results show that when the ratio b/a is in the above-mentioned range, the intensity of light in the diffusing angle increases as the ratio D/b increases. However, the operation and mechanism of this characteristic is unknown.

In addition, the experimental results show that the intensity of an edge-light type surface light source where the lens sheet with D/b=0.1 and 1.20≦b/a≦2.00 is disposed over the light guiding plate is as low as the intensity of a conventional edge-light type surface light source where only a delustered transparent film is disposed over the front surface of a light guiding plate. Thus, the ratio D/b should be equal to or less than 0.1.

As shown in FIG. 56C, as the cutting depth ratio D/b increases, the peak of the emitted light becomes sharper in the normal direction of the surface light source. At this point, the intensity in the normal direction, I(O), becomes high. In addition, the diffusing angle α becomes sharp. When the ratio D/b is less than 0.5, as shown in FIGS. 56B and 57B, rays of light are entered from positions Pe on the lower surface of the ellipse with an angle more than the critical angle $\theta_c$. Thus, rays Ldiv which largely deviate from the normal are emitted. These rays Ldiv are side lobes which have a predetermined diffusing angle and become light energy loss.

In particular, as the ratio D/b reaches to around 1.0, this affection becomes remarkable. When this affection is represented by the relation I(θ) of the intensity of the emitted light and the angle θ (−90≦θ≦+90) measured from the normal plane of the surface light source, as shown in FIG. 56D, I(θ) has two-peak characteristics or three-peak characteristics.

Thus, the ratio D/b should be equal to or less than 1.0. More preferably, the ratio D/b should be equal to or less than 0.5.

(ii) From the viewpoint of the machining characteristics of the lens, when the ratio D/b approaches to 1.0 (namely, the upper half of the ellipse is a lens element), the edge between adjacent lenses becomes narrow. Even if the light transmitting substrate is directly cut and abraded, the tips of cutters (such as byte and mill) should be sharp. Thus, the cutters which satisfy this requirement are not available or the machining of the lens becomes difficult. When the ratio D/b is less than 1.0, there will be an under cut portion which is very difficult to machine.

On the other hand, when a transparent substrate is formed with a mold by press method or mold method, the ratio D/b should be larger than 1.0.

The conditions of (1) (i), (ii), and (iii) and (2) (i) and (ii) are given by the equation (11).

FIG. 56A is a schematic diagram showing the position of a total reflection critical point Pc and optical paths of rays of a lenticular lens according to the fourth invention. FIG. 56B is a schematic diagram showing optical paths of rays of light of a lenticular lens with a large cutting depth D and a total reflection critical point Pc.

In FIG. 56B, Ldiv is present in optical paths of rays of light. However, in FIG. 56A, Ldiv is not present.

Figure 57A:
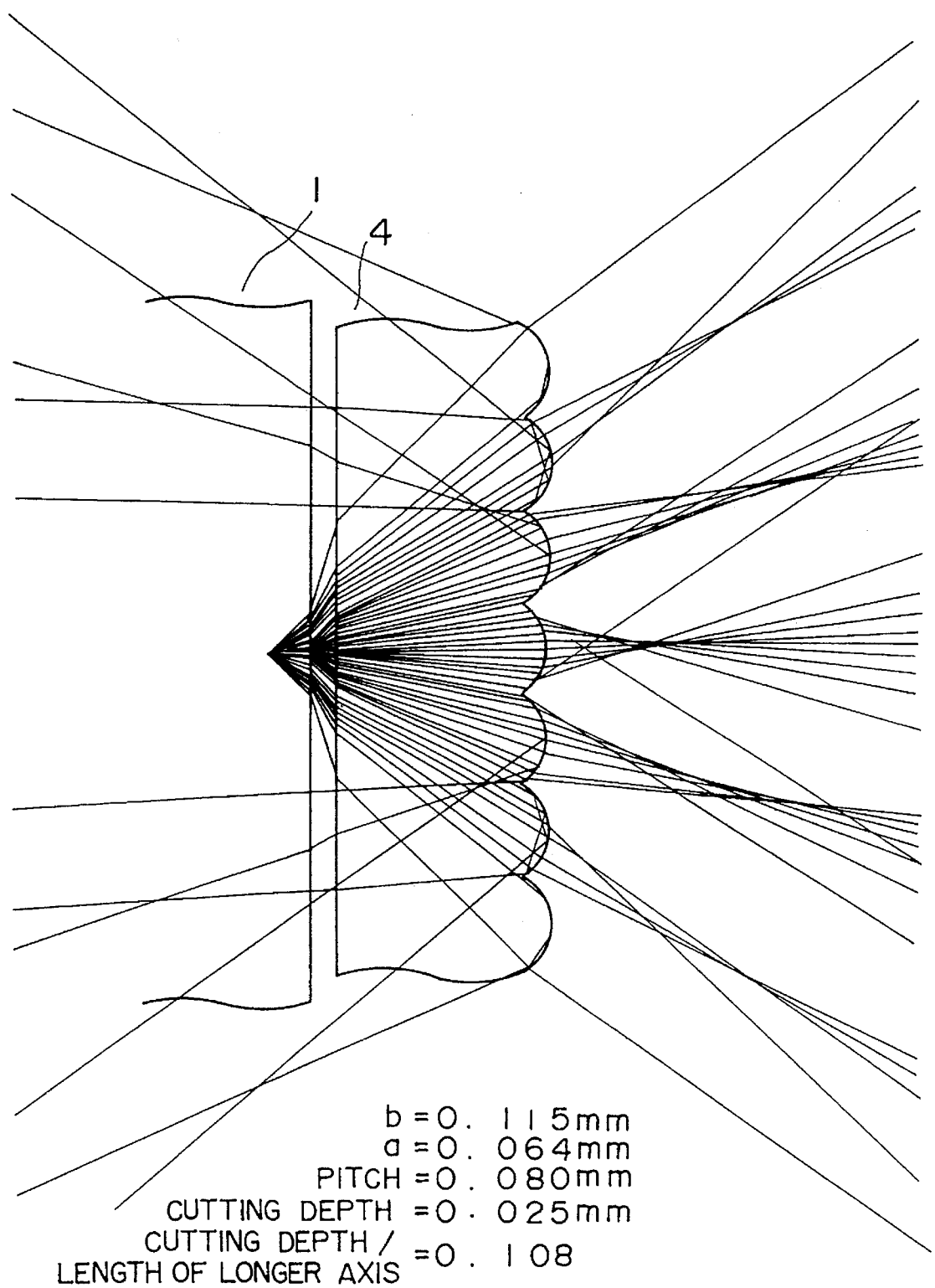
FIG. 57A is a schematic diagram showing the optical paths of diffused rays of light entered into a lenticular lens according to the fourth invention.
Figure 57B:
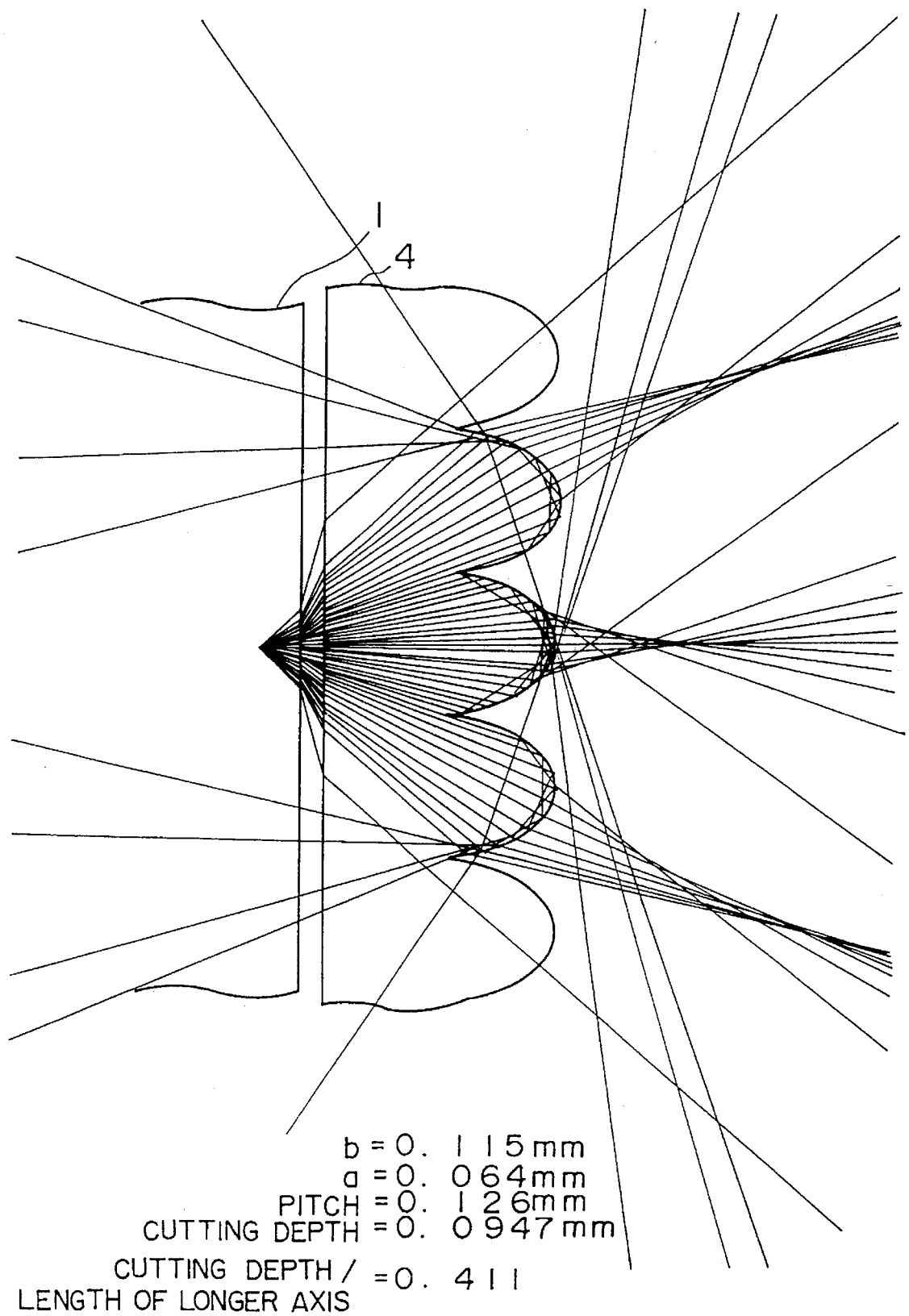
FIG. 57B is a schematic diagram showing the optical paths of diffused rays of light entered into a lenticular lens with a large cutting depth D and a total reflection critical point Pc.

FIG. 57A is a computer simulation diagram showing optical paths of diffused rays of light entered into a lenticular lens (b/a=1.80 and D/b=0.22) according to the fourth invention. FIG. 57B is a computer simulation diagram showing optical paths of diffused rays of light entered into a lenticular lens (b/a=1.80 and D/b is 0.83) with a large cutting depth D and a total reflection critical point Pc.

In FIG. 57A, rays of light are totally reflected by an interface of lens and air three to four times. Thereafter, the rays of light are returned back to the light guiding plate and used again. In FIG. 57B, rays of light which are totally reflected by the interface of lens and air are transmitted to air. At this point, since the angles of the rays to the normal of the surface light source become large, side lobes take place, thereby loosing light energy.

The difference between the concave lens and the convex lens is whether the focal position is ahead or behind the lens. Thus, when the user is position much far from the focal distance of the lens sheet 94, the function of the concave lens substantially becomes the same as that of the convex lens.

This applies to the hyperbolic cylinder lenticular lens.

The optical paths of rays of light in the elliptic cylinder lens element are shown in FIGS. 40B and 41B. Rays of light which are entered in parallel with the optical axis are focused on at the focal point F and then diffused at a diffusing angle θ.

Assume that the spherical aberration can be ignored, that rays of light which largely deviate from the normal of the light guiding plate due to total reflection between the smooth surface 100 of the light guiding plate and the lens sheet 94 are fed back to the light guiding plate, and that rays of light which are nearly in parallel with the optical axis are entered into the lens due to diffusion and reflection of the light reflecting layer on the rear surface of the light guiding plate. In these conditions, the diffusing angle θ is given by the following equation.

$$\theta = 2 \tan^{-1}(p/2f) \quad (15)$$

where p is the aperture of the lens elements (when the lens elements are aligned without a space, p is the pitch thereof); and f is the focal distance.

As shown in FIGS. 40A, 40B, 41A and 41B, the focal points of the concave lens and convex lens differ each other. As shown in FIG. 40B, in the case of the convex lens, a real image is formed and the focal point is present outside the lens. On the other hand, as shown in FIG. 41B, in the case of the concave lens, a virtual image is formed and the focal point is present inside the lens.

In any case, in the embodiments of the third invention, the focal distance (normally, 10 mm or less) is much shorter than the distance from the lens surface (surface of the surface light source) to the user, there is not so large difference between the concave lens and the convex lens as the effects to the user.

However, experimental results show that an convex lens used for the edge-light type surface light source has higher intensity in normal direction and a sharper diffusing angle of light output than those of the concave lens thereof. Although these reasons are unknown, it seems that rays of light which are totally reflected at an interface of lens and air layer on the light emitting surface are deflected outwardly and inwardly by the concave lens and convex lens, respectively. Thus, it seems that such a difference takes place.

In the above description, only the elliptic cylinder lenticular lens was explained. However, when the cross section of each lens element of a hyperbolic cylinder lenticular lens is given by the following equation, this lenticular lens will have the same effects as the elliptic cylinder lenticular lens has.

$$X^2/a^2 - y^2/b^2 = 1 \quad (16)$$

where b/a is the slope of the asymptotic line, and a<b.

The optimum ranges of a and b of the hyperbolic cylinder lenticular lens are the same as those of the elliptic cylinder lenticular lens.

As with the third invention, two lens sheets may be layered. In addition, other various features of the fourth invention are similar to those of the third invention.

(Operation)

As described above, in the elliptic lenticular according to the first embodiment lens, [1] side lobes less take place, [2] light energy is effectively used, [3] a diffusing angle is sharp, and [4] high intensity takes place in normal direction. Next, the operation of the elliptic cylinder lenticular lens will be described.

When a lens sheet according to the equation (11) is designed, the arrangement of reflection (total reflection or partial reflection), diffusing and refraction, and diffusing (transmission or reflection) at interfaces of a light diffusing and reflecting layer, a light guiding plate, a cavity, a light diffusing sheet, and a lens sheet is optimized. Rays of light irradiated from a light source 93 are distributed on the entire surface of the light guiding member 91 so that the intensity on the light emitting surface becomes equal. In addition, the rays of light irradiated from the light guiding plate in the vicinity of the normal of the light emitting surface is focused by a lens. Thus, the emitted rays of light can be distributed in a desired diffusing angle range. Most of rays of light which are irradiated with large angles to the normal of the light emitting surface are fed back to the light guiding plate side and used again. Thus, light of side lobes which result in a loss of light energy can be prevented. The amount of light which leaks out of a desired diffusing angle range can be reduced.

In the second embodiment of the fourth invention, as shown in FIG. 37, a fine mat pattern 131 is formed on the front surface of a light diffusing sheet 98. In addition, a cavity 99 is formed at least partly between a smooth plane 100 of a light guiding plate and a lens sheet 94.

In the cavity 99, the light guiding plate 91 with a refractive index of around 1.5 is in contact with an air layer (or a vacuum layer) with a refractive index of around 1.0 through the plane 100 as an interface. Thus, as with the construction shown in FIG. 43, total reflection takes place on the plane 100. Consequently, in a region close to the light source, 10% to 20% of a ray L1T which is entered into the plane 100 with an angle less than the critical angle is emitted. On the other hand, in a region spaced apart from the light source, a ray L2T is totally reflected on the interface of the cavity 99 and then diffused and reflected on the rear surface of the light diffusing and reflecting layer 92. Thus, the ray L2T with an angle less than the critical angle is emitted.

A ray which is entered into a region where the fine mat pattern 131 is in contact with the smooth plane 100 is not totally reflected, but directly transmitted as an emitted ray. When the area ratio R of the cavity is larger than 80 to 90%, the intensity distribution becomes almost equal on the entire surface.

Since the depth of the fine mat pattern 131 is equal to or more than the wavelength of the light of the light source, rays of light are totally reflected.

As shown in FIG. 48, when a ray L1 which is entered into the smooth plane 100 of the light guiding plane 100 is totally reflected and becomes a reflected ray L1R, strictly speaking, an electromagnetic field of the ray is partly present. In other words, an electromagnetic field L1V which is transmitted from the interface 100 is present due to tunnel effect. However, the intensity of the electromagnetic field L1V exponentially attenuates. The wavelength of L1V is on the order of that of light. In addition, the amplitude of L1V is 0.

Thus, when the cavity 99 has a depth much larger than the wavelength of the light, the ray L1 is not substantially entered into the cavity 99.

However, as shown in FIG. 49, when the lens sheet 94 with nearly the same refractive index as the light guiding plate 91 is spaced apart from the plane 100 of the light guiding plate by the depth ΔX which is less than the wavelength of the light (namely, ΔX<λ), the electromagnetic field L1V which is entered into the lens sheet 94 does not completely attenuate, but becomes a traveling wave L1T. Thus, a transmitted ray L1T takes place.

In the fourth invention, since the fine mat pattern 131 is formed on the front surface of the light diffusing sheet 98, regions with or without a cavity 99 are formed between the light guiding plate 91 and the light diffusing sheet 98 and/or between the light diffusing sheet 98 and the lens sheet 94 as shown in FIG. 50. Thus, in the regions without the cavity 99, the light guiding plate 91 and the lens sheet 94 can be optically treated as an integral member. (In the regions with the cavity 99, the depth thereof is less than the wavelength of the light.)

In the cavity regions, the incident rays are totally reflected. In the non-cavity regions, the incident rays are transmitted. The amount of light totally reflected on the plane 100 depends on the area ratio of the cavity regions to the entire area of the light guiding plate.

(Effect of the fourth invention)

Since the surface light source according to the fourth invention has less side lobes due to the function of a lenticular lens formed in a predetermined shape, most rays of light emitted from a light guiding plate are focused in a predetermined diffusing angle range. Thus, light energy of rays which are dispersed in the range from diagonal directions to tangent direction of the surface light source are returned to the light guiding plate and used again as effective rays of light. Therefore, the energy efficiency of the surface light source is high. In addition, the intensity of output light is high. Moreover, noise light is not emitted from side edges of the surface light source.

Even if a lenticular lens sheet is disposed, it does not prevent the light of the light source from being totally reflected on the front surface of the light guiding plate. Thus, the rays of light of the light source are equally distributed on the entire light guiding plate so that the intensity distribution on the light emitting surface becomes equal.

When a light diffusing sheet is used along with the lenticular lens sheet, the equality of the intensity distribution on the light emitting surface is further improved. In addition, a light diffusing pattern on the rear side of the light guiding plate can be properly non-visualized.

Moreover, the display apparatus according to the fourth invention provides high energy efficiency (such as power), high intensity, a proper field angle, and a display with equal intensity on the entire front surface.

(First example)
(Process for forming lenticular lens)

With an apparatus as shown in FIG. 51, a lens was fabricated according to the following steps.

(1) A substrate film roll 101 of 100 μm thick uncolored transparent biaxially-drawn polyethylene terephthalate was prepared.

(2) A roll-shaped concave plate 104 made of a metal cylinder with an invert mold pattern (same shape and reverse pattern) in the shape of an elliptic cylinder lenticular lens was prepared. While this concave plate 104 was being rotated about the center axis thereof, an ultraviolet-ray-setting resin solution 106 was supplied from a T die type nozzle 111 to the plate surface so as to fill the invert plate surface of the lens with the resin solution 106.

(3) The substrate film 102 was supplied at the same speed as the rotating peripheral speed of the roll-shaped concave plate 104 and the substrate film was layered over the roll-shaped concave plate through the resin solution. In this state, ultraviolet rays were irradiated from mercury vapor lamps 113 to the substrate film so as to cross harden the resin solution in the invert mold and adhere it to the substrate film.

(4) The substrate film which was being supplied was peeled off along with the hardened resin formed in the lens shape by using a peeling roll 108.

(5) Thus, an elliptic cylinder lenticular lens was obtained.

Lens shape See FIG. 39A.

Shape of lens elements: convex elliptic cylinder (The longer axis of the lens elements accords with the normal direction of the light emitting surface.)

Length of longer axis $2b$=230 μm

Length of shorter axis $2a$=128 μm

Length of longer axis/length of shorter axis=$2b/2a$=1.80

Pitch of lens elements p=110 μm

Cutting depth ration D/b=0.34

Cutting amount D=50 μm

Ultraviolet-ray-setting resin solution

Major components are are follows:

Multi-functional polyester acrylate oligomer

Light reaction starting agent (Process for forming light diffusing sheet)

(1) A roll-shaped concave plate made of a metal cylinder with a fine mat pattern was prepared. The fine mat pattern was formed on a metal cylinder surface by #80 sand blasting.

(2) A substrate film of 50 μm thick transparent biaxially-drawn polyethylene terephthalate was supplied from a roll. Then, with the substrate film and the same apparatus and resin solution which were used in the lens forming process, a delustered transparent fine mat pattern made of an ultraviolet- ray-setting resin was formed on the rear surface of the lens sheet.

(3) Thus, a light diffusing layer according to the third invention was obtained.

Fine mat pattern
  Haze value=88.8
  Surface glossiness (JIS-Z-8741)=11.1
  Surface roughness (JIS-B-0601, ten-point-average roughness) Rz=38.4 μm (Second example)

Two elliptic cylinder lens sheets fabricated in the first embodiment were disposed so that their edge lines are perpendicular to each other and their lens surfaces were oriented to the light emitting surface. A light diffusing sheet and a light guiding plate were layered just below the two lens sheets. Thus, an edge-light type surface light source as shown in FIG. 37 was obtained.

Light guiding plate
  Material: Polymethyl-methacrylate polymer resin
  Shape: Rectangular parallelopiped. Thick×width×depth (direction of which light propagates) =4×150×200 mm
  Front surface: On the entire surface, ten-point-average surface roughness Rz=0.1 μm or less
  Rear surface: A delustering transparent ink was printed on the rear surface of the light guiding plate in a mesh pattern. A mirror-face reflective film where aluminum had been vacuum-deposited on a polyethylene terephthalate film was layered over the rear surface of the light guiding plate.
    The mesh pattern was formed by dispersing silica powder in an acrylic resin by silk screen printing method.
    The pitch of the mesh pattern was 2 mm both in horizontal and vertical directions.
    The diameter of points of the mesh pattern was 0.1 mm at a position close to the light source. The sizes of the points increase in proportion to the distance from the light source. The size of the point at the edge portion on the opposite side of the light source was 1 mm.

Light source

As a linear light source, two 5W white fluorescent lamps were disposed at both side edges of the light guiding plate. A metallic reflecting mirror was disposed on the opposite side of the light guiding plate.

The characteristics of the surface light source in this construction were as follows:
  Angle distribution of intensity of light: See FIG. 52
  Half-value angle θh=70°
  Intensity in normal direction (at the center portion of the light guiding plate)=2260 cd/m$^2$
  Intensity distribution in normal direction on light emitting surface: Within ±5%. Almost equally viewed.
  No side lobes (Third example)

The same as the second embodiment except that the shape of the lens was as follows.

Lens shape
  Shape of lens elements: convex elliptic cylinder (The longer axis of the lens elements accords with the normal direction of the light emitting surface.)
  Length of longer axis 2$b$=230 μm
  Length of shorter axis 2$a$=128 μm
  Length of longer axis/length of shorter axis=2$b$/2$a$=1.80
  Pitch of lens elements p=95 μm
  Cutting depth ratio D/b=0.31
  Cutting amount D=36 μm The characteristics of the surface light source in this construction were as follows:
  Angle distribution of intensity of light: Similar to FIG. 52
  Half-value angle θh=68°
  Intensity in normal direction (at the center portion of the light guiding plate)=2101 cd/m$^2$
  Intensity distribution in normal direction on light emitting surface: Within ±5%. Almost equally viewed.
  No side lobes (Fourth example)

The same as the second embodiment except that the shape of the lens was as follows.

Lens shape
  Shape of lens elements: convex elliptic cylinder (The longer axis of the lens elements accords with the normal direction of the light emitting surface.)
  Length of longer axis 2$b$=230 μm
  Length of shorter axis 2$a$=128 μm
  Length of longer axis/length of shorter axis=2$b$ /2$a$=1.80
  Pitch of lens elements p=75 μm
  Cutting depth ratio D/b=0.19
  Cutting amount D=22 μm The characteristics of the surface light source in this construction were as follows:
  Angle distribution of intensity of light: Similar to FIG. 52
  Half-value angle θh=65°
  Intensity in normal direction (at the center portion of the light guiding plate)=1865 cd/m$^2$
  Intensity distribution in normal direction on light emitting surface: Within ±5%. Almost equally viewed.
  No side lobes (Fifth example)

The same as the second embodiment except that the shape of the lens was as follows.

Lens shape
  Shape of lens elements: convex elliptic cylinder (The longer axis of the lens elements accords with the normal direction of the light emitting surface.)
  Length of longer axis 2$b$=204 μm
  Length of shorter axis 2$a$=150 μm
  Length of longer axis/length of shorter axis=2$b$ /2$a$=1.36
  Pitch of lens elements p=130 μm
  Cutting depth ratio D/b=0.49
  Cutting amount D=50 μm The characteristics of the surface light source in this construction were as follows:
  Angle distribution of intensity of light: Similar to FIG. 52
  Half-value angle θh=72°
  Intensity in normal direction (at the center portion of the light guiding plate)=2028 cd/m$^2$
  Intensity distribution in normal direction on light emitting surface: Within ±5%. Almost equally viewed.
  No side lobes (First comparison example)

The following triangular cylinder prism shaped lenticular lens was used instead of the lens sheet convex elliptic cylinder lenticular lens used in the second embodiment.

Shape of cross section: Rectangular equilateral triangle. The vertical angle (right angle) was oriented in the normal direction of the surface light source.

Pitch of lens elements (length of one side)=100 μm

The material, the layer construction, and the fabrication method of the first comparison example were the same as those of the convex elliptic cylinder lenticular lens of the first embodiment.

The characteristics of the surface light source in this construction were as follows:

Angle distribution of intensity: See FIG. 53

Half-value angle=68°

Intensity in normal direction (at the center portion of the light guiding plate)=2074 cd/m$^2$ Intensity distribution in normal direction of light emitting surface: ±5% or less. Almost equally viewed.

Side lobes: Presence (peaks with angles of ±75° measured from the normal) Intensity of peaks of side lobes/intensity in normal direction=26%

(Second comparison example)

The same as the second embodiment except that the shape of the lens was as follows.

Lens shape

Shape of lens elements: convex elliptic cylinder (The longer axis of the lens elements accords with the normal direction of the light emitting surface.)

Length of longer axis 2b=150 μm

Length of shorter axis 2a=204 μm

Length of longer axis/length of shorter axis=2b/2a=0.74

Pitch of lens elements p=177 μm

Cutting depth ratio D/b=0.49

Cutting amount D=37 μm

The characteristics of the surface light source in this construction were as follows:

Angle distribution of intensity of light: See FIG. 55

Half-value angle θh=84°

Intensity in normal direction (at the center portion of the light guiding plate)=1734 cd/m$^2$ Intensity distribution in normal direction on light emitting surface: Within ±5%. Almost equally viewed.

Side lobes: Presence (peaks with angles of ±75° measured from the normal)
Intensity of peaks of side lobes/intensity in normal direction=37%

(Third comparison example)

The same as the second embodiment except that the lens sheet did not have a delustered layer. Thus, the rear surface of the lens sheet was the front surface of the substrate film. The ten-point-average surface roughness Rz of the rear surface of the film and the front surface of the substrate film was 0.1 μm or less.

As the characteristics of the surface light source in this construction, the intensity of light in the vicinity (up to 4 cm) of a side edge of the light emitting surface on the light source side was high. However, the intensity sharply decreased in proportion to the distance from the light source. At a position spaced apart from the light source by 5 cm, the intensity attenuated such that the light felt dark.

(Fourth comparison example)

The same as the second embodiment except that the following two delustered transparent sheets instead of the lenticular lens and the light diffusing sheet were layered over the light emitting surface 10 of the light guiding plate (related art reference).

Delustered transparent sheet

A two-solution type polyurethane paint where calcium carbonate whose particle diameters were 1 to 5 μm had been dispersed was coated on both surfaces of a 50 μm thick biaxial drawing polyethylene terephthalate film and then dried. Thus, the thickness of the film became 5 μm.

Figure 58:
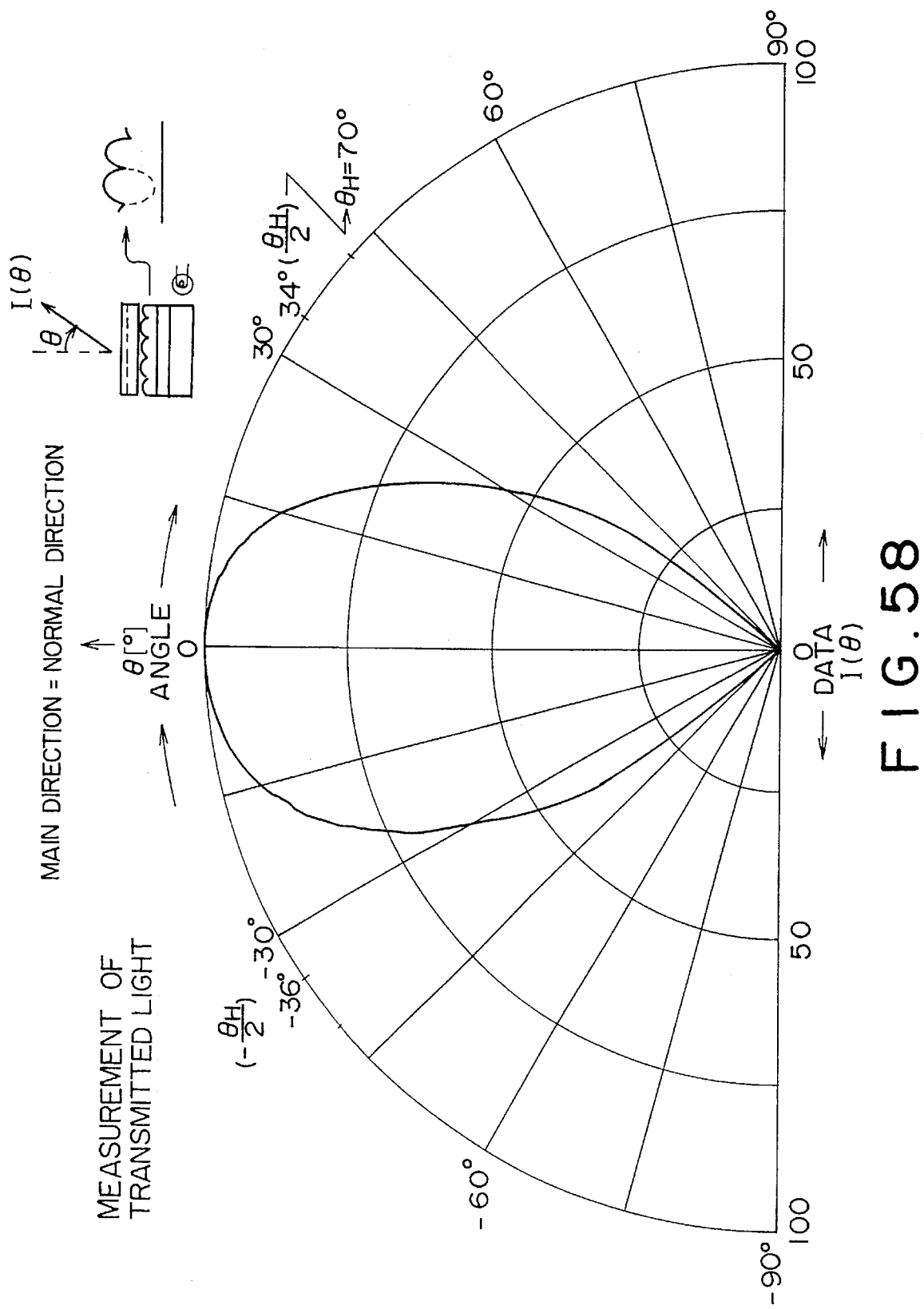
FIG. 58 is a graph showing the characteristics of an edge-light type surface light source according to a fourth comparison example, two delustered transparent sheets being disposed on a light emitting surface of a light guiding plate.

The characteristics of the surface light source with such a construction were as follows:

The characteristics of the surface light source in this construction were as follows:

Angle distribution of intensity of light: See FIG. 58

Half-value angle=70° (However, outside the half-value angle, the intensity of light did not sharply attenuate, but light was emitted to some extent.)

Intensity in normal direction (at the center portion of the light guiding plate)=1491 cd/m$^2$ Distribution of intensity in normal direction on light emitting surface: ±5% or less. Almost equally viewed.

No side lobes

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed:

1. A lenticular lens, comprising:
   a light transmitting substrate having one a first surface and a second surface opposite to said first surface; and
   a plurality of lens elements elongated on the first surface of said light transmitting substrate, having concave shaped cross sections, and defined in such a way that ridges thereof are aligned in parallel,
   wherein
   $30° \leq \theta_{10\%} \leq 100°$ and $R \leq 20\%$, where $\theta_{10\%}$ is a diffusing angle range with respect to normal of the first surface in the case that when light is entered from the second surface or first surface and transmitted from the first surface or second surface, the intensity of the light transmitted is equal to or more than 10% of the intensity of the light transmitted in a peak direction of a main lobe; and R is the ratio of side lobes to main lobe.

2. The lenticular lens, according to claim 1,
   wherein each of said lens element has a triangular prism shape, the vertical angle of each of said lens elements being in the range from 95° to 110°.

3. The lenticular lens, according to claim 2, further comprising:
   a second light transmitting substrate having two flat surfaces,
   wherein said lens elements are layered over one flat surface of said second light transmitting substrate, the vertical angle of said lens elements being in the range from 95° to 110°.

4. The lenticular lens, according to claim 3,
   wherein at least one of said light transmitting substrate and said lens elements has a light isotopic diffusing characteristic.

5. The lenticular lens, according to claim 3,
   wherein a light isotopic diffusing layer is formed on one side of said second light transmitting substrate or said lens elements.

6. The lenticular lens, according to claim 1,
   wherein said lens elements have concave shapes and are continuously formed in such a way that the shape of the main cross section which is cut perpendicular to the longer axis accords with a quadratic curve, a Rankine egg shape, or a curve expressed by a linear function.

7. The lenticular lens, according to claim 6, further comprising:
a second light transmitting substrate having two flat surfaces,
wherein said lens elements are elongated on one surface of said second light transmitting substrate.

8. The lenticular lens, according to claim 7,
wherein at least one of said light transmitting substrate and said lens elements has a light isotopic diffusing characteristic.

9. The lenticular lens according to claim 7,
wherein a light isotopic diffusing layer is formed on one side of said second light transmitting substrate or said lens elements.

10. The lenticular lens, according to claim 1,
wherein said lens elements have an elliptic shape and are defined in such a way that ridges thereof are aligned in parallel with each other, the longer axis direction of said lens elements according with the normal direction of a light emitting surface thereof, the following relation being satisfied:

$$1.1 \times n/(n^2-1)^{1/2} \geq \text{length of longer axis/length of shorter axis} \geq 0.9 \times n/(n^2-1)^{1/2}$$

where n is the refractive index of said lens elements.

11. The lenticular lens, according to claim 1,
wherein said lens elements have a hyperbolic shape and are defined in such a way that ridges thereof are aligned in parallel with each other, the longer axis direction of said lens elements according with the normal direction of a light emitting surface thereof, the following relation being satisfied:

$$1.1 \times n/(n^2-1)^{1/2} \text{ slope of asymptotic line} \geq 0.9 \times n/(n^2-1)^{1/2}$$

where n is the refractive index of said lens elements.

12. The lenticular lens, according to claim 1,
wherein said lens elements have an elliptic shape and are defined in such a way that ridges thereof are aligned in parallel with each other, the longer axis direction of said lens elements according with the normal direction of a light emitting surface thereof, the cutting depth and the refractive index of said lens elements being given by:
$1.40 \leq \text{refractive index} \leq 1.6$,
$1.20 \leq \text{length of longer axis/length of shorter axis} \leq 2.00$, and
$0.1 \leq \text{cutting depth/length of longer axis} \leq 0.50$.

13. A surface light source, comprising:
a light guiding plate made of a light transmitting plate;
a linear light source arranged adjacent to at least one side edge of said light guiding plate;
a light isotopic diffusing layer layered on the front surface of said light guiding plate; and
a lenticular lens comprising: a light transmitting substrate having a first surface and a second surface opposite to said first surface; and a plurality of lens elements elongated on the first surface of said light transmitting substrate, having concave shaped cross sections, and defined in such a way that ridges thereof are aligned in parallel, wherein $30° \leq \theta_{10\%} \leq 100°$ and $R \leq 20\%$, where $\theta_{10\%}$ is a diffusing angle range with respect to normal of the first surface in the case that when light is entered from the second surface or first surface and transmitted from the first surface or second surface, the intensity of the light transmitted is equal to more than 10% of the intensity of the light transmitted in a peak direction of a main lobe; and R is the ratio of side lobes to main lobe, and wherein each of said lens elements has a triangular prism shape, the vertical angle of each of said lens elements being in the range from 95° to 110°,
wherein the front surface of said lenticular lens is defined on a diffused light emitting surface.

14. A liquid crystal display apparatus having a rear surface, comprising:
a transmission type liquid crystal display device; and
a surface light source, comprising:
a light transmitting substrate having a first surface and a second surface opposite to said first surface; and
a plurality of lens elements elongated on the first surface of said light transmitting substrate, having concave shaped cross sections, and defined in such a way that ridges thereof are aligned in parallel,
wherein $$30° \leq \theta_{10\%} \leq 100° \text{ and } R \leq 20\%,$$

where $\theta_{10\%}$ is a diffusing angle range with respect to normal of the first surface in the case that when light is entered from the second surface or first surface and transmitted from the first surface or second surface, the intensity of the light transmitted is equal to or more than 10% of the intensity of the light transmitted in a peak direction of a main lobe; and R is the ratio of side lobes to main lobe, and
wherein each of said lens elements has a triangular prism shape, the vertical angle of each of said lens elements being in the range from 95° to 110°, said surface light source being disposed on the rear surface of said liquid crystal display device.

15. A surface light source, comprising:
a light guiding member formed of a light transmitting plate;
a linear light source arranged adjacent to at least one side edge of said light guiding plate;
a light isotopic diffusing layer layered on the front surface of said light guiding plate; and
a lenticular lens, comprising:
a light transmitting substrate having a first surface and a second surface opposite to said first surface; and
a plurality of lens elements elongated on the first surface of said light transmitting substrate, having concave shaped cross sections, and defined in such a way that ridges thereof are aligned in parallel,
wherein $$30° \leq \theta_{10\%} \leq 100° \text{ and } R \leq 20\%,$$

where $\theta_{10\%}$ is a diffusing angle range with respect to normal of the first surface in the case that when light is entered from the second surface or first surface and transmitted from the first surface or second surface, the intensity of the light transmitted is equal to or more than 10% of the intensity of the light transmitted in a peak direction of a main lobe; and R is the ratio of side lobes to main lobe, wherein aid lens elements have concave shapes and are continuously formed in such a way that the shape of the main cross section which is cut perpendicular to the longer axis accords with a quadratic curve, a Rankine egg shape, or a curve expressed by a linear function, wherein the front surface of said lenticular lens is defined on a diffused light emitting surface.

16. A surface light source, comprising:
   at least one point light source;
   a lamp house adapted to cover said light source and having a surface with an opening; and
   a lenticular lens, comprising:
      a light transmitting substrate having a first surface and a second surface opposite to said first surface; and
      a plurality of lens elements elongated on the first surface of said light transmitting substrate, having concave shaped cross sections, and defined in such a way that ridges thereof are aligned in parallel,
   wherein $30° \leq \theta_{10\%} \leq 100°$ and $R \leq 20\%$, where $\theta_{10\%}$ is a diffusing angle range with respect to normal of the first surface in the case that when light is entered from the second surface or first surface and transmitted from the first surface or second surface, the intensity of the light transmitted is equal to or more than 10% of the intensity of the light transmitted in a peak direction of a main lobe; and R is the ratio of side lobes to main lobe, wherein aid lens elements have concave shapes and are continuously formed in such a way that the shape of the main cross section which is cut perpendicular to the longer axis accords with a quadratic curve, a Rankine egg shape, or a curve expressed by a linear function, said lenticular lens being adapted to cover said opening,
      wherein the front surface of said lenticular lens is defined on a diffused light emitting surface.

17. A liquid crystal display apparatus having a rear surface, comprising:
   a transmission type liquid crystal display device; and
   a surface light source comprising:
      a light guiding member formed of a light transmitting plate;
      a linear light source arranged adjacent to at least one side edge of said light guiding plate;
      a light isotopic diffusing layer layered on the front surface of said light guiding plate; and
      a lenticular lens, comprising:
         a light transmitting substrate having a first surface and a second surface opposite to said first surface; and
         a plurality of lens elements elongated on the first surface of said light transmitting substrate, having concave shaped cross sections, and defined in such a way that ridges thereof are aligned in parallel,
      wherein $30° \leq \theta_{10\%} \leq 100°$ and $R \leq 20\%$, where $\theta_{10\%}$ is a diffusing angle range with respect to normal of the first surface in the case that when light is entered from the second surface or first surface and transmitted from the first surface or second surface, the intensity of the light transmitted is equal to or more than 10% of the intensity of the light transmitted in a peak direction of a main lobe; and R is the ratio of side lobes to main lobe, wherein aid lens elements have concave shapes and are continuously formed in such a way that the shape of the main cross section which is cut perpendicular to the longer axis accords with a quadratic curve, a Rankine egg shape, or a curve expressed by a linear function,
         wherein the front surface of said lenticular lens is defined on a diffused light emitting surface.

18. A lens sheet having a mat surface whose surface roughness is up to 100 μm, and the mat surface is formed on the non-lens surface of a convex lenticular lens comprising:
   a light transmitting substrate having a first surface and a second surface opposite to said first surface; and
   a plurality of lens elements elongated on the first surface of said light transmitting substrate, having concave shaped cross sections, and defined in such a way that ridges thereof are aligned in parallel,
wherein $30° \leq \theta_{10\%} \leq 100°$ and $R \leq 20\%$, where $\theta_{10\%}$ is a diffusing angle range with respect to normal of the first surface in the case that when light is entered from the second surface or first surface and transmitted from the first surface or second surface, the intensity of the light transmitted is equal to or more than 10% of the intensity of the light transmitted in a peak direction of a main lobe; and R is the ratio of side lobes to main lobe,
   wherein said lens elements have an elliptic shape and are defined in such a way that ridges thereof are aligned in parallel with each other, the longer axis direction of said lens elements according with the normal direction of a light emitting surface thereof, the following relation being satisfied:

$1.1 \times n/(n^2-1)^{1/2} \geq $ length of longer axis/length of shorter axis $\geq 0.9 \times n/(n^2-1)^{1/2}$ where n is the refractive index of said lens element.

19. A surface light source comprising:
   a light guiding member made of a light transmitting plate;
   at least one linear light source arranged on at least one side edge of the light guiding member;
   at least one light reflecting layer disposed on the rear surface of the light guiding member; and
   a concave lenticular lens comprising:
      a light transmitting substrate having a first surface and a second surface opposite to said first surface; and
      a plurality of lens elements elongated on the first surface of said light transmitting substrate, having concave shaped cross sections, and defined in such a way that ridges thereof are aligned in parallel,
   wherein $30° \leq \theta_{10\%} \leq 100°$ and $R \leq 20\%$, where $\theta_{10\%}$ is a diffusing angle range with respect to normal of the first surface in the case that when light is entered from the second surface or first surface and transmitted from the first surface or second surface, the intensity of the light transmitted is equal to or more than 10% of the intensity of the light transmitted in a peak direction of a main lobe; and R is the ratio of side lobes to main lobe,
      wherein said lens elements have an elliptic shape and are defined in such a way that ridges thereof are aligned in parallel with each other, the longer axis direction of said lens elements according with the normal direction of a light emitting surface thereof, the following relation being satisfied:

$$1.1 \times n/(n^2-1)^{1/2} \geq \text{length of longer axis/length of shorter axis}$$

$$0.9 \times n/(n^2-1)^{1/2}$$

where n is the refractive index of said lens elements layered on a light emitting surface of the light guiding member.

20. The surface light source according to claim 19, wherein the light source is formed of a light transmitting plate having a smooth surface whose surface roughness is equal to or less than the wavelength of the light of a light source, the above-mentioned lenticular lens sheet has a fine mat surface whose surface roughness is equal to or larger than the wavelength of the light of the light source, and the fine mat surface is layered on the smooth surface of the light guiding member, whereby, a cavity with a depth of equal to or larger than the wavelength of the light of the light source is disposed at least partly between the light guiding member and the lens sheet.

21. The surface light source according to claim 19, wherein the light source has a light guiding member which is formed of a light transmitting plate having a smooth surface whose surface roughness is equal to or less than the wavelength of the light of a light source, a light diffusing layer is disposed between the rear surface of the above-mentioned lenticular lens sheet and the front surface of the light guiding member, and the light diffusing layer has fine mat surfaces whose surface roughness is equal to or larger than the wavelength of the light of the light source, whereby, two cavities whose depth is equal to or larger than the wavelength of the light of the light source are formed at least partly between the front surface of the light guiding member and the light diffusing layer and between the light diffusing layer and the rear surface of the lens sheet.

22. A display apparatus, comprising:

a the surface light source comprising:

a light guiding member made of a light transmitting plate;

at least one linear light source arranged on at least one side edge of the light guiding member;

at least one light reflecting layer disposed on the rear surface of the light guiding member; and a concave lenticular lens comprising:

a light transmitting substrate having a first surface and a second surface opposite to said first surface; and a plurality of lens elements elongated on the first surface of said light transmitting substrate, having concave shaped cross sections, and defined in such a way that ridges thereof are aligned in parallel, wherein $$30° \leq \theta_{10\%} \leq 100° \text{ and } R \leq 20\%,$$

where $\theta_{10\%}$ is a diffusing angle range with respect to normal of the first surface in the case that when light is entered from the second surface or first surface and transmitted from the first surface or second surface, the intensity of the light transmitted is equal to or more than 10% of the intensity of the light transmitted in a peak direction of a main lobe; and R is the ratio of side lobes to main lobe, wherein said lens elements have an elliptic shape and are defined in such a way that ridges thereof are aligned in parallel with each other, the longer axis direction of said lens elements according with the normal direction of a light emitting surface thereof, the following relation being satisfied:

$$1.1 \times n/(n^2-1)^{1/2} \geq \text{length of longer axis/length of shorter axis}$$

$$\geq 0.9 \times n/(n^2-1)^{1/2}$$

where n is the refractive index of said lens elements layered on a light emitting surface of the light guiding member; and a transmission type display device which is layered over the light emitting urface of the surface light source.

23. A surface light source, comprising:

at least one linear light source having a lower surface;

a lamp house that covers the lower surface and side surface of the light source and has an opening on the upper surface of the light source and an inner reflecting surface; and a lenticular lens comprising:

a light transmitting substrate having a first surface and a second surface opposite to said first surface; and a plurality of lens elements elongated on the first surface of said light transmitting substrate, having concave shaped cross sections, and defined in such a way that ridges thereof are aligned in parallel, wherein $$30° \leq \theta_{10\%} \leq 100° \text{ and } R \leq 20\%,$$

where $\theta_{10\%}$ is a diffusing angle range with respect to normal of the first surface in the case that when light is entered from the second surface or first surface and transmitted from the first surface or second surface, the intensity of the light transmitted is equal to or more than 10% of the intensity of the light transmitted in a peak direction of a main lobe; and R is the ratio of side lobes to main lobe, wherein said lens elements have an elliptic shape and are defined in such a way that ridges thereof are aligned in parallel with each other, the longer axis direction of said lens elements according with the normal direction of a light emitting surface thereof, the following relation being satisfied:

$$1.1 \times n/(n^2-1)^{1/2} \text{ a length of longer axis/length of shorter axis}$$

$$\geq 0.9 \times n/(n^2-1)^{1/2}$$

where n is the refractive index of said lens elements covering the opening of said lamp house.

24. A display apparatus, comprising:

a surface light source comprising:

at least one linear light source having a lower surface;

a lamp house that covers the lower surface and side surface of the light source and has an opening on the upper surface of the light source and an inner reflecting surface; and a lenticular lens comprising:

a light transmitting substrate having a first surface and a second surface opposite to said first surface; and a plurality of lens elements elongated on the first surface of said light transmitting substrate, having concave shaped cross sections, and defined in such a way that ridges thereof are aligned in parallel, wherein $$30° \leq \theta_{10\%} \leq 100° \text{ and } R \leq 20\%,$$

where $\theta_{10\%}$ is a diffusing angle range with respect to normal of the first surface in the case that when light is entered from the second surface or first surface and transmitted from the first surface or second surface, the intensity of the light transmitted is equal to or more than 10% of the intensity of the light transmitted in a peak direction of a main lobe; and R is the ratio of side lobes to main lobe, wherein said lens elements have an elliptic shape and are defined in such a way that ridges thereof are aligned in parallel with each other, the longer axis direction of said lens elements according with the normal direction of a light emitting surface thereof, the following relation being satisfied:

$$1.1 \times n/(n^2-1)^{1/2} \geq \text{length of longer axis/length of shorter axis}$$
$$\geq 0.9 \times n/(n^2-1)^{1/2}$$

where n is the refractive index of said lens elements covering the opening of said lamp house; and a transmission type display device that is layered over the light emitting surface of the surface light source.

25. A lens sheet, having a mat surface whose surface roughness is up to 100 μm, and the mat surface is formed on the non-lens surface of a convex lenticular lens comprising:

a light transmitting substrate having a first surface and a second surface opposite to said first surface; and a plurality of lens elements elongated on the first surface of said light transmitting substrate, having concave shaped cross sections, and defined in such a way that ridges thereof are aligned in parallel, wherein $$30° \leq \theta_{10\%} 100° \text{ and } R \leq 20\%,$$

where $\theta_{10\%}$ is a diffusing angle range with respect to normal of the first surface in the case that when light is entered from the second surface or first surface and transmitted from the first surface or second surface, the intensity of the light transmitted is equal to or more than 10% of the intensity of the light transmitted in a peak direction of a main lobe; and R is the ratio of side lobes to main lobe, wherein said lens elements have a hyperbolic shape and are defined in such a way that ridges thereof are aligned in parallel with each other, the longer axis direction of said lens elements according with the normal direction of a light emitting surface thereof, the following relation being satisfied:

$$1.1 \times n/(n^2-1)^{1/2} \geq \text{slope of asymptotic line}$$
$$\geq 0.9 \times n/(n^2-1)^{1/2}$$

where n is the refractive index of said lens elements.

26. A surface light source comprising:

a light guiding member made of a light transmitting plate;

at least one linear light source arranged on at least one side edge of the light guiding member;

at least one light reflecting layer disposed on the rear surface of the light guiding member; and a concave lenticular lens comprising:

a light transmitting substrate having a first surface and a second surface opposite to said first surface; and a plurality of lens elements elongated on the first surface of said light transmitting substrate, having concave shaped cross sections, and defined in such a way that ridges thereof are aligned in parallel, wherein $$30° \leq \theta_{10\%} 100° \text{ and } R \leq 20\%,$$

where $\theta_{10\%}$ is a diffusing angle range with respect to normal of the first surface in the case that when light is entered from the second surface or first surface and transmitted from the first surface or second surface, the intensity of the light transmitted is equal to or more than 10% of the intensity of the light transmitted in a peak direction of a main lobe; and R is the ratio of side lobes to main lobe, wherein said lens elements have a hyperbolic shape and are defined in such a way that ridges thereof are aligned in parallel with each other, the longer axis direction of said lens elements according with the normal direction of a light emitting surface thereof, the following relation being satisfied:

$$1.1 \times n/(n^2-1)^{1/2} \text{ a slope of asymptotic line}$$
$$\geq 0.9 \times n/(n^2-1)^{1/2}$$

where n is the refractive index of said lens elements layered on a light emitting surface of the light guiding member.

27. A display apparatus, comprising:

a surface light source comprising:

a light guiding member made of a light transmitting plate;

at least one linear light source arranged on at least one side edge of the light guiding member;

at least one light reflecting layer disposed on the rear surface of the light guiding member; and a concave lenticular lens comprising:

a light transmitting substrate having a first surface and a second surface opposite to said first surface; and a plurality of lens elements elongated on the first surface of said light transmitting substrate, having concave shaped cross sections, and defined in such a way that ridges thereof are aligned in parallel, wherein $$30° \leq \theta_{10\%} 100° \text{ and } R \leq 20\%,$$

where $\theta_{10\%}$ is a diffusing angle range with respect to normal of the first surface in the case that when light is entered from the second surface or first surface and transmitted from the first surface or second surface, the intensity of the light transmitted is equal to or more than 10% of the intensity of the light transmitted in a peak direction of a main lobe; and R is the ratio of side lobes to main lobe, wherein said lens elements have a hyperbolic shape and are defined in such a way that ridges thereof are aligned in parallel with each other, the longer axis direction of said lens elements according with the normal direction of a light emitting surface thereof, the following relation being satisfied:

$$1.1 \times n/(n^2-1)^{1/2} \geq \text{slope of asymptotic line}$$
$$\geq 0.9 \times n/(n^2-1)^{1/2}$$

where n is the refractive index of said lens elements layered on a light emitting surface of the light guiding member; and a transmission type display device that is layered over the light emitting surface of the surface light source.

28. A surface light source, comprising:

at least one linear or point light source;

a lamp house that covers the lower surface and side surface of the light source and has an opening on the upper surface of the light source and an inner reflecting surface; and a lenticular lens comprising:

a light transmitting substrate having a first surface and a second surface opposite to said first surface; and a plurality of lens elements elongated on the first surface of said light transmitting substrate, having concave shaped cross sections, and defined in such a way that ridges thereof are aligned in parallel, wherein $$30°≤θ_{10\%}100° \text{ and } R≤20\%,$$

where $θ_{10\%}$ is a diffusing angle range with respect to normal of the first surface in the case that when light is entered from the second surface or first surface and transmitted from the first surface or second surface, the intensity of the light transmitted is equal to or more than 10% of the intensity of the light transmitted in a peak direction of a main lobe; and R is the ratio of side lobes to main lobe, wherein said lens elements have a hyperbolic shape and are defined in such a way that ridges thereof are aligned in parallel with each other, the longer axis direction of said lens elements according with the normal direction of a light emitting surface thereof, the following relation being satisfied:

$$1.1 \times n/(n^2-1)^{1/2} ≥ \text{slope of asymptotic line}$$
$$≥ 0.9 \times n/(n^2-1)^{1/2}$$

where n is the refractive index of said lens elements covering the opening of said lamp house.

29. A display apparatus, comprising:
   a surface light source comprising:
   at least one linear or point light source;
   a lamp house that covers the lower surface and side surface of the light source and has an opening on the upper surface of the light source and an inner reflecting surface; and
   a lenticular lens comprising:
   a light transmitting substrate having a first surface and a second surface opposite to said first surface; and
   a plurality of lens elements elongated on the first surface of said light transmitting substrate, having concave shaped cross sections, and defined in such a way that ridges thereof are aligned in parallel,
   wherein $$30°≤θ_{10\%}100° \text{ and } R≤20\%,$$

where $θ_{10\%}$ is a diffusing angle range with respect to normal of the first surface in the case that when light is entered from the second surface or first surface and transmitted from the first surface or second surface, the intensity of the light transmitted is equal to or more than 10% of the intensity of the light transmitted in a peak direction of a main lobe; and R is the ratio of side lobes to main lobe, wherein said lens elements have a hyperbolic shape and are defined in such a way that ridges thereof are aligned in parallel with each other, the longer axis direction of said lens elements according with the normal direction of a light emitting surface thereof, the following relation being satisfied:

$$1.1 \times n/(n^2-1)^{1/2} ≥ \text{slope of asymptotic line}$$
$$≥ 0.9 \times n/(n^2-1)^{1/2}$$

where n is the refractive index of said lens elements covering the opening of said lamp house; and
   a transmission type display device that is layered over the light emitting surface of the surface light source.

30. A surface light source comprising:
   a light guiding member made of a light transmitting plate;
   at least one linear light source arranged on at least one side edge of the light guiding member;
   at least one light reflecting layer disposed on the rear surface of the light guiding member; and
   a concave lenticular lens comprising:
   a light transmitting substrate having a first surface and a second surface opposite to said first surface; and
   a plurality of lens elements elongated on the first surface of said light transmitting substrate, having concave shaped cross sections, and defined in such a way that ridges thereof are aligned in parallel,
   wherein $$30°≤θ_{10\%}100° \text{ and } R≤20\%,$$

where $θ_{10\%}$ is a diffusing angle range with respect to normal of the first surface in the case that when light is entered from the second surface or first surface and transmitted from the first surface or second surface, the intensity of the light transmitted is equal to or more than 10% of the intensity of the light transmitted in a peak direction of a main lobe; and R is the ratio of side lobes to main lobe, wherein said lens elements have an elliptic shape and are defined in such a way that ridges thereof are aligned in parallel with each other, the longer axis direction of said lens elements according with the normal direction of a light emitting surface thereof, the cutting depth and the refractive index of said lens elements being given by:

1.40 ≤ refractive index ≤ 1.6,
1.20 ≤ length of longer axis/length of shorter axis ≤ 2.00, and
0.1 ≤ cutting depth/length of longer axis ≤ 0.50 layered on a light emitting surface of the light guiding member.

31. The surface light source, according to claim 30, wherein a light diffusing sheet between the opposite surface of the lens surface of the lenticular lens and the light guiding member.

32. The surface light source, according to claim 31, wherein the surface light source has a random fine mat pattern at least on one surface of the light diffusing sheet, the surface roughness of the mat pattern is in the range from the wavelength of the light of the light source to 100 μm, and the surface roughness of the front surface of the light guiding plate is equal to or less than the wavelength of the light of the light source.

33. A display apparatus, comprising:
   a surface light source comprising:
   a light guiding member made of a light transmitting plate;
   at least one linear light source arranged on at least one side edge of the light guiding member;
   at least one light reflecting layer disposed on the rear surface of the light guiding member; and
   a concave lenticular lens comprising:
   a light transmitting substrate having a first surface and a second surface opposite to said first surface; and
   a plurality of lens elements elongated on the first surface of said light transmitting substrate, having concave shaped cross sections, and defined in such a way that ridges thereof are aligned in parallel,
   wherein $$30°θ_{10\%}100° \text{ and } R≤20\%,$$

where $θ_{10\%}$ is a diffusing angle range with respect to normal of the first surface in the case that when light is entered from the second surface or first surface and transmitted from the first surface or second surface, the intensity of the light transmitted is equal to or more than 10% of the intensity of the light transmitted in a peak direction of a main lobe; and R is the ratio of side lobes to main lobe, wherein said lens elements have an elliptic shape and are defined in such a way that ridges thereof are aligned in parallel with each other, the longer axis direction of said lens elements according with the normal direction of a light emitting surface thereof, the cutting depth and the refractive index of said lens elements being given by:

$1.40 \leq$ refractive index $\leq 1.6$, $1.20 \leq$ length of longer axis/length of shorter axis $\leq 2.00$, and $0.1 \leq$ cutting depth/length of longer axis $\leq 0.50$ layered on a light emitting surface of the light guiding member; and a transmission type display device that is layered over the light emitting surface of the surface light source.

34. A surface light source, comprising:

at least one linear light source having a lower surface;

a lamp house that covers the lower surface and side surface of the light source and has an opening on the upper surface of the light source and an inner reflecting surface; and a lenticular lens comprising:

a light transmitting substrate having a first surface and a second surface opposite to said first surface; and a plurality of lens elements elongated on the first surface of said light transmitting substrate, having concave shaped cross sections, and defined in such a way that ridges thereof are aligned in parallel, wherein $30° \leq \theta_{10\%} \leq 100°$ and $R \leq 20\%$, where $\theta_{10\%}$ is a diffusing angle range with respect to normal of the first surface in the case that when light is entered from the second surface or first surface and transmitted from the first surface or second surface, the intensity of the light transmitted is equal to or more than 10% of the intensity of the light transmitted in a peak direction of a main lobe; and R is the ratio of side lobes to main lobe, wherein said lens elements have an elliptic shape and are defined in such a way that ridges thereof are aligned in parallel with each other, the longer axis direction of said lens elements according with the normal direction of a light emitting surface thereof, the cutting depth and the refractive index of said lens elements being given by:

$1.40 \leq$ refractive index $\leq 1.6$, $1.20 \leq$ length of longer axis/length of shorter axis $\leq 2.00$, and $0.1 \leq$ cutting depth/length of longer axis $\leq 0.50$ covering the opening of said lamp house.

35. A lenticular lens, comprising:

a light transmitting substrate having a first surface and a second surface opposite to said first surface; and a plurality of lens elements elongated on the first surface of said light transmitting substrate, having convex shaped cross sections, and defined in such a way that ridges thereof are aligned an parallel, wherein $30° \leq \theta_{10\%} \leq 100°$ and $R \leq 20\%$, where $\theta_{10\%}$ is a diffusing angle range with respect to normal of the first surface in the case that when light is entered from the second surface or first surface and transmitted from the first surface or second surface, the intensity of the light transmitted is equal to or more than 10% of the intensity of the light transmitted in a peak direction of a main lobe; and R is the ratio of side lobes to main lobe.

36. A surface light source comprising:

a light guiding plate made of a rectangular parallelpiped cavity;

a linear light source arranged adjacent to at least one side edge of said light guiding plate;

a light isotopic diffusing layer layered on the front surface of said light guiding plate; and a lenticular lens comprising:

a light transmitting substrate having a first surface and a second surface opposite to said first surface; and a plurality of lens elements elongated on the first surface of said light transmitting substrate, having concave shaped cross sections, and defined in such a way that ridges thereof are aligned in parallel, wherein $30° \leq \theta_{10\%} \leq 100°$ and $R \leq 20\%$, where $\theta_{10\%}$ is a diffusing angle range with respect to normal of the first surface in the case that when light is entered from the second surface or first surface and transmitted from the first surface or second surface, the intensity o the light transmitted is equal to or more than 10% of the intensity of the light transmitted in a peak direction of a main lobe; and R is the ratio of side lobes to main lobe wherein each of said lens elements has a triangular prism shape, the vertical angle of each of said lens elements being in the range from 95° to 110°, wherein the front surface of said lenticular lens is defined on a diffused light emitting surface.

37. A surface light source comprising:

a light guiding member formed of a rectangular parallelpiped cavity;

a linear light source arranged adjacent to at least one side edge of said light guiding plate;

a light isotopic diffusing layer layered on the first surface of said light guiding plate; and a lenticular lens, comprising:

a light transmitting substrate having a first surface and a second surface opposite to said first surface; and a plurality of lens elements elongated on the first surface of said light transmitting substrate, having concave shaped cross sections, and defined in such a way that ridges thereof are aligned in parallel, wherein $30° \leq \theta_{10\%} \leq 100°$ and $R \leq 20\%$, where $\theta_{10\%}$ is a diffusing angle range with respect to normal of the first surface in the case that when light is entered from the second surface or first surface and transmitted from the first surface or second surface, the intensity of the light transmitted is equal to or more than 10% of the intensity of the light transmitted in a peak direction of a main lobe; and R is the ratio of side lobes to main lobe, wherein aid lens elements have concave shapes and are continuously formed in such a way that the shape of the main cross section which is cut perpendicular to the longer axis accords with a quadratic curve, a Rankine egg shape, or a curve expressed by a linear function,
wherein the first surface of said lenticular lens is defined on a diffused light emitting surface.

38. A surface light source, comprising:
- at least one linear light source;
- a lamp house adapted to cover said light source and having a surface with an opening; and
- a lenticular lens, comprising:
  - a light transmitting substrate having a first surface and a second surface opposite to said first surface; and
  - a plurality of lens elements elongated on the first surface of said light transmitting substrate, having concave shaped cross sections, and defined in such a way that ridges thereof are aligned in parallel, wherein $$30° \leq \theta_{10\%} \leq 100° \text{ and } R \leq 20\%,$$

where $\theta_{10\%}$ is a diffusing angle range with respect to normal of the first surface in the case that when light is entered from the second surface or first surface and transmitted from the first surface or second surface, the intensity of the light transmitted is equal to or more than 10% of the intensity of the light transmitted in a peak direction of a main lobe; and R is the ratio of side lobes to main lobe, wherein aid lens elements have concave shapes and are continuously formed in such a way that the shape of the main cross section which is cut perpendicular to the longer axis accords with a quadratic curve, a Rankine egg shape, or a curve expressed by a linear function, said lenticular lens being adapted to cover said opening,
  wherein the first surface of said lenticular lens is defined on a diffused light emitting surface.

39. A lens sheet, having a mat surface whose surface roughness is up to 100 μm, and the mat surface is formed on the non-lens surface of a concave lenticular lens comprising:
- a light transmitting substrate having a first surface and a second surface opposite to said first surface; and
- a plurality of lens elements elongated on the first surface of said light transmitting substrate, having concave shaped cross sections, and defined in such a way that ridges thereof are aligned in parallel, wherein $$30° \leq \theta_{10\%} \leq 100° \text{ and } R \leq 20\%,$$

where $\theta_{10\%}$ is a diffusing angle range with respect to normal of the first surface in the case that when light is entered from the second surface or first surface and transmitted from the first surface or second surface, the intensity of the light transmitted is equal to or more than 10% of the intensity of the light transmitted in a peak direction of a main lobe; and R is the ratio of side lobes to main lobe,
  wherein said lens elements have an elliptic shape and are defined in such a way that ridges thereof are aligned in parallel with each other, the longer axis direction of said lens elements according with the normal direction of a light emitting surface thereof, the following relation being satisfied:

$$1.1 \times n/(n^2-1)^{1/2} \geq length\ of\ longer\ axis/length\ of\ shorter\ axis$$

$$\geq 0.9 \times n/(n^2-1)^{1/2}$$

where n is the refractive index of said lens elements.

40. A lens sheet, having a mat surface whose surface roughness is up to 100 μm, and the mat surface is formed on the non-lens surface of a concave lenticular lens comprising:
- a light transmitting substrate having a first surface and a second surface opposite to said first surface; and
- a plurality of lens elements elongated on the first surface of said light transmitting substrate, having concave shaped cross sections, and defined in such a way that ridges thereof are aligned in parallel, wherein $$30° \leq \theta_{10\%} 100° \text{ and } R \leq 20\%,$$

where $\theta_{10\%}$ is a diffusing angle range with respect to normal of the first surface in the case that when light is entered from the second surface or first surface and transmitted from the first surface or second surface, the intensity of the light transmitted is equal to or more than 10% of the intensity of the light transmitted in a peak direction of a main lobe; and R is the ratio of side lobes to main lobe,
  wherein said lens elements have a hyperbolic shape and are defined in such a way that ridges thereof are aligned in parallel with each other, the longer axis direction of said lens elements according with the normal direction of a light emitting surface thereof, the following relation being satisfied:

$$1.1 \times n/(n^2-1)^{1/2} \geq slope\ of\ asymptotic\ line$$

$$\geq 0.9 \times n/(n^2-1)^{1/2}$$

where n is the refractive index of said lens elements.

41. A surface light source comprising:
- a light guiding member made of a rectangular parallelpiped cavity;
- at least one linear light source arranged on at least one side edge of the light guiding member;
- at least one light reflecting layer disposed on the rear surface of the light guiding member; and
- a concave lenticular lens comprising:
  - a light transmitting substrate having a first surface and a second surface opposite to said first surface; and
  - a plurality of lens elements elongated on the first surface of said light transmitting substrate, having concave shaped cross sections, and defined in such a way that ridges thereof are aligned in parallel, wherein $$30° \leq \theta_{10\%} \leq 100° \text{ and } R \leq 20\%,$$

where $\theta_{10\%}$ is a diffusing angle range with respect to normal of the first surface in the case that when light is entered from the second surface or first surface and transmitted from the first surface or second surface, the intensity of the light transmitted is equal to or more than 10% of the intensity of the light transmitted in a peak direction of a main lobe; and R is the ratio of side lobes to main lobe,
  wherein said lens elements have an elliptic shape and are defined in such a way that ridges thereof are aligned in parallel with each other, the longer axis direction of said lens elements according with the normal direction of a light emitting surface thereof, the following relation being satisfied:

$$1.1 \times n/(n^2-1)^{1/2} \geq length\ of\ longer\ axis/length\ of\ shorter\ axis$$

$$\geq 0.9 \times n/(n^2-1)^{1/2}$$

where n is the refractive index of said lens elements layered on a light emitting surface of the light guiding member.

42. A surface light source comprising:

a light guiding member made of a light transmitting plate;

at least one point light source arranged on at least one side edge of the light guiding member;

at least one light reflecting layer disposed on the rear surface of the light guiding member; and a concave lenticular lens comprising:

a light transmitting substrate having a first surface and a second surface opposite to said first surface; and a plurality of lens elements elongated on the first surface of said light transmitting substrate, having concave shaped cross sections, and defined in such a way that ridges thereof are aligned in parallel, wherein $$30° \leq \theta_{10\%} \leq 100° \text{ and } R \leq 20\%,$$

where $\theta_{10\%}$ is a diffusing angle range with respect to normal of the first surface in the case that when light is entered from the second surface or first surface and transmitted from the first surface or second surface, the intensity of the light transmitted is equal to or more than 10% of the intensity of the light transmitted in a peak direction of a main lobe; and R is the ratio of side lobes to main lobe, wherein said lens elements have an elliptic shape and are defined in such a way that ridges thereof are aligned in parallel with each other, the longer axis direction of said lens elements according with the normal direction of a light emitting surface thereof, the following relation being satisfied:

$$1.1 \times n/(n^2-1)^{1/2} \geq \text{length of longer axis/length of shorter axis}$$
$$\geq 0.9 \times n/(n^2-1)^{1/2}$$

where n is the refractive index of said lens elements layered on a light emitting surface of the light guiding member.

43. A surface light source comprising:

a light guiding member made of a rectangular parallelepiped cavity;

at least one point light source arranged on at least one side edge of the light guiding member;

at least one light reflecting layer disposed on the rear surface of the light guiding member; and a concave lenticular lens comprising:

a light transmitting substrate having a first surface and a second surface opposite to said first surface; and a plurality of lens elements elongated on the first surface of said light transmitting substrate, having concave shaped cross sections, and defined in such a way that ridges thereof are aligned in parallel, wherein $$30° \leq \theta_{10\%} \leq 100° \text{ and } R \leq 20\%,$$

where $\theta_{10\%}$ is a diffusing angle range with respect to normal of the first surface in the case that when light is entered from the second surface or first surface and transmitted from the first surface or second surface, the intensity of the light transmitted is equal to or more than 10% of the intensity of the light transmitted in a peak direction of a main lobe; and R is the ratio of side lobes to main lobe, wherein said lens elements have an elliptic shape and are defined in such a way that ridges thereof are aligned in parallel with each other, the longer axis direction of said lens elements according with the normal direction of a light emitting surface thereof, the following relation being satisfied:

$$1.1 \times n/(n^2-1)^{1/2} \geq \text{length of longer axis/length of shorter axis}$$
$$\geq 0.9 \times n/(n^2-1)^{1/2}$$

where n is the refractive index of said lens elements layered on a light emitting surface of the light guiding member.

44. A surface light source comprising:

a light guiding member made of a light transmitting plate;

at least one linear light source arranged on at least one side edge of the light guiding member;

at least one light reflecting layer disposed on the rear surface of the light guiding member; and a convex lenticular lens comprising:

a light transmitting substrate having a first surface and a second surface opposite to said first surface; and a plurality of lens elements elongated on the first surface of said light transmitting substrate, having concave shaped cross sections, and defined in such a way that ridges thereof are aligned in parallel, wherein $$30° \leq \theta_{10\%} \leq 100° \text{ and } R \leq 20\%,$$

where $\theta_{10\%}$ is a diffusing angle range with respect to normal of the first surface in the case that when light is entered from the second surface or first surface and transmitted from the first surface or second surface, the intensity of the light transmitted is equal to or more than 10% of the intensity of the light transmitted in a peak direction of a main lobe; and R is the ratio of side lobes to main lobe, wherein said lens elements have an elliptic shape and are defined in such a way that ridges thereof are aligned in parallel with each other, the longer axis direction of said lens elements according with the normal direction of a light emitting surface thereof, the following relation being satisfied:

$$1.1 \times n/(n^2-1)^{1/2} \geq \text{length of longer axis/length of shorter axis}$$
$$\geq 0.9 \times n/(n^2-1)^{1/2}$$

where n is the refractive index of said lens elements layered on a light emitting surface of the light guiding member.

45. A surface light source comprising:

a light guiding member made of a light transmitting plate;

at least one point light source arranged on at least one side of the light guiding member;

at least one light reflecting layer disposed on the rear surface of the light guiding member; and a convex lenticular lens comprising:

a light transmitting substrate having a first surface and a second surface opposite to said first surface; and a plurality of lens elements elongated on the first surface of said light transmitting substrate, having concave shaped cross sections, and defined in such a way that ridges thereof are aligned in parallel, wherein $$30° \leq \theta_{10\%} \leq 100° \text{ and } R \leq 20\%,$$

where $\theta_{10\%}$ is a diffusing angle range with respect to normal of the first surface in the case that when light is entered from the second surface or first surface and transmitted from the first surface or second surface, the intensity of the light transmitted is equal to or more than 10% of the intensity of the light transmitted in a peak direction of a main lobe; and R is the ratio of side lobes to main lobe, wherein said lens elements have an elliptic shape and are defined in such a way that ridges thereof are aligned in parallel with each other, the longer axis direction of said lens elements according with the normal direction of a light emitting surface thereof, the following relation being satisfied:

$$1.1 \times n/(n^2-1)^{1/2} \geq \text{length of longer axis/length of shorter axis}$$
$$\geq 0.9 \times n/(n^2-1)^{1/2}$$

where n is the refractive index of said lens elements layered on a light emitting surface of the light guiding member.

46. A surface light source comprising:

a light guiding member made of a rectangular parallelpiped cavity;

at least one linear light source arranged on at least one side edge of the light guiding member;

at least one light reflecting layer disposed on the rear surface of the light guiding member; and a convex lenticular lens comprising:

a light transmitting substrate having a first surface and a second surface opposite to said first surface; and a plurality of lens elements elongated on the first surface of said light transmitting substrate, having concave shaped cross sections, and defined in such a way that ridges thereof are aligned in parallel, wherein $$30° \leq \theta_{10\%} \leq 100° \text{ and } R \leq 20\%,$$

where $\theta_{10\%}$ is a diffusing angle range with respect to normal of the first surface in the case that when light is entered from the second surface or first surface and transmitted from the first surface or second surface, the intensity of the light transmitted is equal to or more than 10% of the intensity of the light transmitted in a peak direction of a main lobe; and R is the ratio of side lobes to main lobe, wherein said lens elements have an elliptic shape and are defined in such a way that ridges thereof are aligned in parallel with each other, the longer axis direction of said lens elements according with the normal direction of a light emitting surface thereof, the following relation being satisfied:

$$1.1 \times n/(n^2-1)^{1/2} \geq \text{length of longer axis/length of shorter axis}$$
$$\geq 0.9 \times n/(n^2-1)^{1/2}$$

where n is the refractive index of said lens elements layered on a light emitting surface of the light guiding member.

47. A surface light source comprising:

a light guiding member made of a rectangular parallelpiped cavity;

at least one point light source arranged on at least one side edge of the light guiding member;

at least one light reflecting layer disposed on the rear surface of the light guiding member; and a convex lenticular lens comprising:

a light transmitting substrate having a first surface and a second surface opposite to said first surface; and a plurality of lens elements elongated on the first surface of said light transmitting substrate, having concave shaped cross sections, and defined in such a way that ridges thereof are aligned in parallel, wherein $$30° \leq \theta_{10\%} \leq 100° \text{ and } R \leq 20\%,$$

where $\theta_{10\%}$ is a diffusing angle range with respect to normal of the first surface in the case that when light is entered from the second surface or first surface and transmitted from the first surface or second surface, the intensity of the light transmitted is equal to or more than 10% of the intensity of the light transmitted in a peak direction of a main lobe; and R is the ratio of side lobes to main lobe, wherein said lens elements have an elliptic shape and are defined in such a way that ridges thereof are aligned in parallel with each other, the longer axis direction of said lens elements according with the normal direction of a light emitting surface thereof, the following relation being satisfied:

$$1.1 \times n/(n^2-1)^{1/2} \geq \text{length of longer axis/length of shorter axis}$$
$$\geq 0.9 \times n/(n^2-1)^{1/2}$$

where n is the refractive index of said lens elements layered on a light emitting surface of the light guiding member.

48. A surface light source comprising:

a light guiding member made of a rectangular parallelpiped cavity;

at least one linear light source arranged on at least one side edge of the light guiding member;

at least one light reflecting layer disposed on the rear surface of the light guiding member; and a concave lenticular lens comprising:

a light transmitting substrate having a first surface and a second surface opposite to said first surface; and a plurality of lens elements elongated on the first surface of said light transmitting substrate, having concave shaped cross sections, and defined in such a way that ridges thereof are aligned in parallel, wherein $$30° \leq \theta_{10\%} 100° \text{ and } R \leq 20\%,$$

where $\theta_{10\%}$ is a diffusing angle range with respect to normal of the first surface in the case that when light is entered from the second surface or first surface and transmitted from the first surface or second surface, the intensity of the light transmitted is equal to or more than 10% of the intensity of the light transmitted in a peak direction of a main lobe; and R is the ratio of side lobes to main lobe, wherein said lens elements have a hyperbolic shape and are defined in such a way that ridges thereof are aligned in parallel with each other, the longer axis direction of said lens elements according with the normal direction of a light emitting surface thereof, the following relation being satisfied:

$$1.1 \times n/(n^2-1)^{1/2} \geq \text{slope of asymptotic line}$$
$$\geq 0.9 \times n/(n^2-1)^{1/2}$$

where n is the refractive index of said lens elements layered on a light emitting surface of the light guiding member.

49. A surface light source comprising:

a light guiding member made of a light transmitting plate;

at least one point light source arranged on at least one side edge of the light guiding member;

at least one light reflecting layer disposed on the rear surface of the light guiding member; and a concave lenticular lens comprising:

a light transmitting substrate having a first surface and a second surface opposite to said first surface; and a plurality of lens elements elongated on the first surface of said light transmitting substrate, having concave shaped cross sections, and defined in such a way that ridges thereof are aligned in parallel, wherein $$30° \leq \theta_{10\%} 100° \text{ and } R \leq 20\%,$$

where $\theta_{10\%}$ is a diffusing angle range with respect to normal of the first surface in the case that when light is entered from the second surface or first surface and transmitted from the first surface or second surface, the intensity of the light transmitted is equal to or more than 10% of the intensity of the light transmitted in a peak direction of a main lobe; and R is the ratio of side lobes to main lobe, wherein said lens elements have a hyperbolic shape and are defined in such a way that ridges thereof are aligned in parallel with each other, the longer axis direction of said lens elements according with the normal direction of a light emitting surface thereof, the following relation being satisfied:

$$1.1 \times n/(n^2-1)^{1/2} \geq \text{slope of asymptotic line}$$

$$\geq 0.9 \times n/(n^2-1)^{1/2}$$

where n is the refractive index of said lens elements layered on a light emitting surface of the light guiding member.

50. A surface light source comprising:

a light guiding member made of a light transmitting plate;

at least one point light source arranged on at least one side edge of the light guiding member;

at least one light reflecting layer disposed on the rear surface of the light guiding member; and a concave lenticular lens comprising:

a light transmitting substrate having a first surface and a second surface opposite to said first surface; and a plurality of lens elements elongated on the first surface of said light transmitting substrate, having concave shaped cross sections, and defined in such a way that ridges thereof are aligned in parallel, wherein $$30° \leq \theta_{10\%} 100° \text{ and } R \leq 20\%,$$

where $\theta_{10\%}$ is a diffusing angle range with respect to normal of the first surface in the case that when light is entered from the second surface or first surface and transmitted from the first surface or second surface, the intensity of the light transmitted is equal to or more than 10% of the intensity of the light transmitted in a peak direction of a main lobe; and R is the ratio of side lobes to main lobe, wherein said lens elements have a hyperbolic shape and are defined in such a way that ridges thereof are aligned in parallel with each other, the longer axis direction of said lens elements according with the normal direction of a light emitting surface thereof, the following relation being satisfied:

$$1.1 \times n/(n^2-1)^{1/2} \geq \text{slope of asymptotic line}$$

$$\geq 0.9 \times n/(n^2-1)^{1/2}$$

where n is the refractive index of said lens elements layered on a light emitting surface of the light guiding member.

51. A surface light source comprising:

a light guiding member made of a rectangular parallelpiped cavity;

at least one point light source arranged on at least one side edge of the light guiding member;

at least one light reflecting layer disposed on the rear surface of the light guiding member; and a concave lenticular lens comprising:

a light transmitting substrate having a first surface and a second surface opposite to said first surface; and a plurality of lens elements elongated on the first surface of said light transmitting substrate, having concave shaped cross sections, and defined in such a way that ridges thereof are aligned in parallel, wherein $$30° \leq \theta_{10\%} 100° \text{ and } R \leq 20\%,$$

where $\theta_{10\%}$ is a diffusing angle range with respect to normal of the first surface in the case that when light is entered from the second surface or first surface and transmitted from the first surface or second surface, the intensity of the light transmitted is equal to or more than 10% of the intensity of the light transmitted in a peak direction of a main lobe; and R is the ratio of side lobes to main lobe, wherein said lens elements have a hyperbolic shape and are defined in such a way that ridges thereof are aligned in parallel with each other, the longer axis direction of said lens elements according with the normal direction of a light emitting surface thereof, the following relation being satisfied:

$$1.1 \times n/(n^2-1)^{1/2} \geq \text{slope of asymptotic line}$$

$$\geq 0.9 \times n/(n^2-1)^{1/2}$$

where n is the refractive index of said lens elements layered on a light emitting surface of the light guiding member.

52. A surface light source comprising:

a light guiding member made of a light transmitting plate;

at least one linear light source arranged on at least one side edge of the light guiding member;

at least one light reflecting layer disposed on the rear surface of the light guiding member; and a convex lenticular lens comprising:

a light transmitting substrate having a first surface and a second surface opposite to said first surface; and a plurality of lens elements elongated on the first surface of said light transmitting substrate, having concave shaped cross sections, and defined in such a way that ridges thereof are aligned in parallel, wherein $$30° \leq \theta_{10\%} 100° \text{ and } R \leq 20\%,$$

where $\theta_{10\%}$ is a diffusing angle range with respect to normal of the first surface in the case that when light is entered from the second surface or first surface and transmitted from the first surface or second surface, the intensity of the light transmitted is equal to or more than 10% of the intensity of the light transmitted in a peak direction of a main lobe; and R is the ratio of side lobes to main lobe, wherein said lens elements have a hyperbolic shape and are defined in such a way that ridges thereof are aligned in parallel with each other, the longer axis direction of said lens elements according with the normal direction of a light emitting surface thereof, the following relation being satisfied:

$1.1 \times n/(n^2-1)^{1/2} \geq$ slope of asymptotic line $\geq 0.9 \times n/(n^2-1)^{1/2}$ where n is the refractive index of said lens elements layered on a light emitting surface of the light guiding member.

53. A surface light source comprising:
   a light guiding member made of a rectangular parallelpiped cavity;
   at least one linear light source arranged on at least one side edge of the light guiding member;
   at least one light reflecting layer disposed on the rear surface of the light guiding member; and
   a convex lenticular lens comprising:
   a light transmitting substrate having a first surface and a second surface opposite to said first surface; and
   a plurality of lens elements elongated on the first surface of said light transmitting substrate, having concave shaped cross sections, and defined in such a way that ridges thereof are aligned in parallel,
   wherein $30° \leq \theta_{10\%} 100°$ and $R \leq 20\%$, where $\theta_{10\%}$ is a diffusing angle range with respect to normal of the first surface in the case that when light is entered from the second surface or first surface and transmitted from the first surface or second surface, the intensity of the light transmitted is equal to or more than 10% of the intensity of the light transmitted in a peak direction of a main lobe; and R is the ratio of side lobes to main lobe,
   wherein said lens elements have a hyperbolic shape and are defined in such a way that ridges thereof are aligned in parallel with each other, the longer axis direction of said lens elements according with the normal direction of a light emitting surface thereof, the following relation being satisfied:

$1.1 \times n/(n^2-1)^{1/2} \geq$ slope of asymptotic line $\geq 0.9 \times n/(n^2-1)^{1/2}$ where n is the refractive index of said lens elements layered on a light emitting surface of the light guiding member.

54. A surface light source comprising:
   a light guiding member made of a light transmitting plate;
   at least one point light source arranged on at least one side edge of the light guiding member;
   at least one light reflecting layer disposed on the rear surface of the light guiding member; and
   a convex lenticular lens comprising:
   a light transmitting substrate having a first surface and a second surface opposite to said first surface; and
   a plurality of lens elements elongated on the first surface of said light transmitting substrate, having concave shaped cross sections, and defined in such a way that ridges thereof are aligned in parallel,
   wherein $30° \leq \theta_{10\%} 100°$ and $R \leq 20\%$, where $\theta_{10\%}$ is a diffusing angle range with respect to normal of the first surface in the case that when light is entered from the second surface or first surface and transmitted from the first surface or second surface, the intensity of the light transmitted is equal to or more than 10% of the intensity of the light transmitted in a peak direction of a main lobe; and R is the ratio of side lobes to main lobe,
   wherein said lens elements have a have a hyperbolic shape and are defined in such a way that ridges thereof are aligned in parallel with each other, the longer axis direction of said lens elements according with the normal direction of a light emitting surface thereof, the following relation being satisfied:

$1.1 \times n/(n^2-1)^{1/2} \geq$ slope of asymptotic line $\geq 0.9 \times n/(n^2-1)^{1/2}$ where n is the refractive index of said lens elements layered on a light emitting surface of the light guiding member.

55. A surface light source comprising:
   a light guiding member made of a light transmitting plate;
   at least one point light source arranged on at least one side edge of the light guiding member;
   at least one light reflecting layer disposed on the rear surface of the light guiding member; and
   a concave lenticular lens comprising:
   a light transmitting substrate having a first surface and a second surface opposite to said first surface; and
   a plurality of lens elements elongated on the first surface of said light transmitting substrate, having concave shaped cross sections, and defined in such a way that ridges thereof are aligned in parallel,
   wherein $30° \leq \theta_{10\%} 100°$ and $R \leq 20\%$, where $\theta_{10\%}$ is a diffusing angle range with respect to normal of the first surface in the case that when light is entered from the second surface or first surface and transmitted from the first surface or second surface, the intensity of the light transmitted is equal to or more than 10% of the intensity of the light transmitted in a peak direction of a main lobe; and R is the ratio of side lobes to main lobe,
   wherein said lens elements have an elliptic shape and are defined in such a way that ridges thereof are aligned in parallel with each other, the longer axis direction of said lens elements according with the normal direction of a light emitting surface thereof, the cutting depth and the refractive index of said lens elements being given by:

$1.40 \leq$ refractive index $\leq 1.6$, $1.20 \leq$ length of longer axis/length of shorter axis $\leq 2.00$, and $0.1 \leq$ cutting depth/length of longer axis $\leq 0.50$ layered on a light emitting surface of the light guiding member.

56. A surface light source comprising:
   a light guiding member made of a light transmitting plate;
   at least one linear light source arranged on at least one side edge of the light guiding member;
   at least one light reflecting layer disposed on the rear surface of the light guiding member; and
   a convex lenticular lens comprising:
   a light transmitting substrate having a first surface and a second surface opposite to said first surface; and
   a plurality of lens elements elongated on the first surface of said light transmitting substrate, having concave shaped cross sections, and defined in such a way that ridges thereof are aligned in parallel,
   wherein $30° \leq \theta_{10\%} 100°$ and $R \leq 20\%$, where $\theta_{10\%}$ is a diffusing angle range with respect to normal of the first surface in the case that when light is entered from the second surface or first surface and transmitted from the first surface or second surface, the intensity of the light transmitted is equal to or more than 10% of the intensity of the light transmitted in a peak direction of a main lobe; and R is the ratio of side lobes to main lobe, wherein said lens elements have an elliptic shape and are defined in such a way that ridges thereof are aligned in parallel with each other, the longer axis direction of said lens elements according with the normal direction of a light emitting surface thereof, the cutting depth and the refractive index of said lens elements being given by:

1.40≦refractive index≦1.6, 1.20≦length of longer axis/length of shorter axis≦2.00, and 0.1≦cutting depth/length of longer axis≦0.50 layered on a light emitting surface of the light guiding member.

57. A surface light source comprising:

a light guiding member made of a rectangular parallelpiped cavity;

at least one linear light source arranged on at least one side edge of the light guiding member;

at least one light reflecting layer disposed on the rear surface of the light guiding member; and a convex lenticular lens comprising:

a light transmitting substrate having a first surface and a second surface opposite to said first surface; and a plurality of lens elements elongated on the first surface of said light transmitting substrate, having concave shaped cross sections, and defined in such a way that ridges thereof are aligned in parallel, wherein $30°≦\theta_{10\%}100°$ and $R≦20\%$, where $\theta_{10\%}$ is a diffusing angle range with respect to normal of the first surface in the case that when light is entered from the second surface or first surface and transmitted from the first surface or second surface, the intensity of the light transmitted is equal to or more than 10% of the intensity of the light transmitted in a peak direction of a main lobe; and R is the ratio of side lobes to main lobe, wherein said lens elements have an elliptic shape and are defined in such a way that ridges thereof are aligned in parallel with each other, the longer axis direction of said lens elements according with the normal direction of a light emitting surface thereof, the cutting depth and the refractive index of said lens elements being given by:

1.40≦refractive index≦1.6, layered on a light emitting surface of the light guiding member.

58. A surface light source comprising:

a light guiding member made of a rectangular parallelpiped cavity;

at least one point light source arranged on at least one side edge of the light guiding member;

at least one light reflecting layer disposed on the rear surface of the light guiding member; and a convex lenticular lens comprising:

a light transmitting substrate having a first surface and a second surface opposite to said first surface; and a plurality of lens elements elongated on the first surface of said light transmitting substrate, having concave shaped cross sections, and defined in such a way that ridges thereof are aligned in parallel, wherein $30°≦\theta_{10\%}100°$ and $R≦20\%$, where $\theta_{10\%}$ is a diffusing angle range with respect to normal of the first surface in the case that when light is entered from the second surface or first surface and transmitted from the first surface or second surface, the intensity of the light transmitted is equal to or more than 10% of the intensity of the light transmitted in a peak direction of a main lobe; and R is the ratio of side lobes to main lobe, wherein said lens elements have an elliptic shape and are defined in such a way that ridges thereof are aligned in parallel with each other, the longer axis direction of said lens elements according with the normal direction of a light emitting surface thereof, the cutting depth and the refractive index of said lens elements being given by:

1.40≦refractive index≦1.6, 1.20≦length of longer axis/length of shorter axis≦2.00, and 0.1≦cutting depth/length of longer axis≦0.50 layered on a light emitting surface of the light guiding member.

59. A surface light source comprising:

a light guiding member made of a light transmitting plate;

at least one point light source arranged on at least one side edge of the light guiding member;

at least one light reflecting layer disposed on the rear surface of the light guiding member; and a convex lenticular lens comprising:

a light transmitting substrate having a first surface and a second surface opposite to said first surface; and a plurality of lens elements elongated on the first surface of said light transmitting substrate, having concave shaped cross sections, and defined in such a way that ridges thereof are aligned in parallel, wherein $30°≦\theta_{10\%}100°$ and $R≦20\%$, where $\theta_{10\%}$ is a diffusing angle range with respect to normal of the first surface in the case that when light is entered from the second surface or first surface and transmitted from the first surface or second surface, the intensity of the light transmitted is equal to or more than 10% of the intensity of the light transmitted in a peak direction of a main lobe; and R is the ratio of side lobes to main lobe, wherein said lens elements have an elliptic shape and are defined in such a way that ridges thereof are aligned in parallel with each other, the longer axis direction of said lens elements according with the normal direction of a light emitting surface thereof, the cutting depth and the refractive index of said lens elements being given by:

1.40≦refractive index≦1.6, 1.20≦length of longer axis/length of shorter axis≦2.00, and 0.1≦cutting depth/length of longer axis≦0.50 layered on a light emitting surface of the light guiding member.

60. A surface light source comprising:

a light guiding member made of a rectangular parallelpiped cavity;

at least one linear light source arranged on at least one side edge of the light guiding member;

at least one light reflecting layer disposed on the rear surface of the light guiding member; and a concave lenticular lens comprising:

a light transmitting substrate having a first surface and a second surface opposite to said first surface; and a plurality of lens elements elongated on the first surface of said light transmitting substrate, having concave shaped cross sections, and defined in such a way that ridges thereof are aligned in parallel, wherein $$30° \leq \theta_{10\%} 100° \text{ and } R \leq 20\%$$

where $\theta_{10\%}$ is a diffusing angle range with respect to normal of the first surface in the case that when light is entered from the second surface or first surface and transmitted from the first surface or second surface, the intensity of the light transmitted is equal to or more than 10% of the intensity of the light transmitted in a peak direction of a main lobe; and R is the ratio of side lobes to main lobe, wherein said lens elements have an elliptic shape and are defined in such a way that ridges thereof are aligned in parallel with each other, the longer axis direction of said lens elements according with the normal direction of a light emitting surface thereof, the cutting depth and the refractive index of said lens elements being given by:

$1.40 \leq$ refractive index $\leq 1.6$, $1.20 \leq$ length of longer axis/length of shorter axis $\leq 2.00$, and $0.1 \leq$ cutting depth/length of longer axis $\leq 0.50$ layered on a light emitting surface of the light guiding member.

61. A surface light source comprising:

at least one point light source having a lower surface;

a lamp house that covers the lower surface and side surface of the light source and has an opening on the upper surface of the light source and an inner reflecting surface; and a lenticular lens comprising:

a light transmitting substrate having a first surface and a second surface opposite to said first surface; and a plurality of lens elements elongated on the first surface of said light transmitting substrate, having concave shaped cross sections, and defined in such a way that ridges thereof are aligned in parallel, wherein $$30° \leq \theta_{10\%} \leq 100° \text{ and } R \leq 20\%,$$

where $\theta_{10\%}$ is a diffusing angle range with respect to normal of the first surface in the case that when light is entered from the second surface or first surface and transmitted from the first surface or second surface, the intensity of the light transmitted is equal to or more than 10% of the intensity of the light transmitted in a peak direction of a main lobe; and R is the ratio of side lobes to main lobe, wherein said lens elements have an elliptic shape and are defined in such a way that ridges thereof are aligned in parallel with each other, the longer axis direction of said lens elements according with the normal direction of a light emitting surface thereof, the following relation being satisfied:

$$1.1 \times n/(n^2-1)^{1/2} \geq \text{length of longer axis/length of shorter axis}$$

$$\geq 0.9 \times n/(n^2-1)^{1/2}$$

where n is the refractive index of said lens elements covering the opening of said lamp house.

62. A surface light source, comprising:

at least one point light source having a lower surface;

a lamp house that covers the lower surface and side surface of the light source and has an opening on the upper surface of the light source and an inner reflecting surface; and a lenticular lens comprising:

a light transmitting substrate having a first surface and a second surface opposite to said first surface; and a plurality of lens elements elongated on the first surface of said light transmitting substrate having concave shaped cross sections, and defined in such a way that ridges thereof are aligned in parallel, wherein $$30° \leq \theta_{10\%} 100° \text{ and } R \leq 20\%,$$

where $\theta_{10\%}$ is a diffusing angle range with respect to normal of the first surface in the case that when light is entered from the second surface or first surface and transmitted from the first surface or second surface, the intensity of the light transmitted is equal to or more than 10% of the intensity of the light transmitted in a peak direction of a main lobe; and R is the ratio of side lobes to main lobe, wherein said lens elements have an elliptic shape and are defined in such a way that ridges thereof are aligned in parallel with each other, the longer axis direction of said lens elements according with the normal direction of a light emitting surface thereof, the cutting depth and the refractive index of said lens elements being given by:

$1.40 \leq$ refractive index $\leq 1.6$, $1.20 \leq$ length of longer axis/length of shorter axis $\leq 2.00$, and $0.1 \leq$ cutting depth/length of longer axis $\leq 0.50$ covering the opening of said lamp house.

* * * * *